United States Patent
Inoue et al.

(10) Patent No.: US 8,767,156 B2
(45) Date of Patent: *****Jul. 1, 2014

(54) PRODUCTION METHOD OF LIQUID CRYSTAL DISPLAY DEVICE WITH HALFTONE OVERLAPPING MASKING AND LIQUID CRYSTAL DISPLAY DEVICE

(75) Inventors: Iichiro Inoue, Tenri (JP); Hiroyuki Hakoi, Nara (JP); Shinichi Terashita, Kyoto (JP); Koichi Miyachi, Kyoto (JP)

(73) Assignee: Sharp Kabushiki Kaisha, Osaka-shi, Osaka (JP)

(*) Notice: Subject to any disclaimer, the term of this patent is extended or adjusted under 35 U.S.C. 154(b) by 408 days.

This patent is subject to a terminal disclaimer.

(21) Appl. No.: 13/197,027

(22) Filed: Aug. 3, 2011

(65) Prior Publication Data

US 2011/0311918 A1    Dec. 22, 2011

Related U.S. Application Data

(60) Continuation of application No. 12/854,972, filed on Aug. 12, 2010, now Pat. No. 8,054,431, which is a division of application No. 12/160,352, filed as application No. PCT/JP2007/051192 on Jan. 25, 2007, now Pat. No. 7,872,718.

(30) Foreign Application Priority Data

Jan. 26, 2006  (JP) ................. 2006-017755

(51) Int. Cl.
*G02F 1/1337* (2006.01)

(52) U.S. Cl.
USPC ........... 349/129; 349/123; 349/124; 349/125; 349/126; 349/127; 349/128; 349/130; 349/131; 349/132

(58) Field of Classification Search
CPC ............ G02F 1/1337; G02F 1/133711; G02F 1/133753; G02F 1/133723; G02F 1/133742; G02F 1/133784; G02F 1/133761; G02F 1/133773
USPC .................................... 349/123–132
See application file for complete search history.

(56) References Cited

U.S. PATENT DOCUMENTS

| | | | |
|---|---|---|---|
| 5,617,211 A * | 4/1997 | Nara et al. ............... | 356/401 |
| 5,663,784 A * | 9/1997 | Tanimoto ................. | 355/68 |
| 5,744,268 A | 4/1998 | Nakao | |
| 5,811,208 A | 9/1998 | Yokoyama et al. | |
| 6,335,130 B1 | 1/2002 | Chen et al. | |
| 6,793,785 B2 | 9/2004 | Teng et al. | |
| 6,800,510 B2 | 10/2004 | Peng et al. | |
| 6,867,823 B2 | 3/2005 | Hong et al. | |
| 7,072,017 B1 | 7/2006 | Yoo et al. | |
| 7,872,718 B2 | 1/2011 | Inoue et al. | |
| 2001/0020992 A1 | 9/2001 | Takeda et al. | |
| 2002/0093618 A1 | 7/2002 | Wu et al. | |
| 2005/0105028 A1 | 5/2005 | Tung et al. | |
| 2006/0103799 A1 | 5/2006 | Ikeda et al. | |
| 2010/0309418 A1* | 12/2010 | Ahn et al. ............... | 349/129 |
| 2011/0037686 A1 | 2/2011 | Inoue et al. | |
| 2011/0134380 A1 | 6/2011 | Inoue et al. | |

FOREIGN PATENT DOCUMENTS

| | | |
|---|---|---|
| JP | 10-104630 A | 4/1998 |
| JP | 2000-66235 | 3/2000 |
| JP | 2001-215516 A | 8/2001 |
| JP | 2001-272667 | 10/2001 |
| JP | 2001-281669 | 10/2001 |
| JP | 2002-031804 A | 1/2002 |
| JP | 2002-350858 | 12/2002 |
| JP | 2004-163857 A | 6/2004 |

OTHER PUBLICATIONS

Notice of Allowance mailed May 6, 2011 in U.S. Appl. No. 12/854,972.
Restriction Requirement mailed Jul. 11, 2011 in U.S. Appl. No. 12/854,981.
U.S. Office Action mailed Jun. 2, 2011 in U.S. Appl. No. 12/960,014.
JP Office Action and English translation thereof mailed Apr. 6, 2010 in JP Application 2010-047075.

Kimura, M. et al., "Photo-Rubbing Method: A Single-Exposure Method to Stable Liquid-Crystal Pretilt Angle on Photo-Alignment Films", IDW '04, pp. 35-38, (2004).
International Search Report for PCT/JP2007/051192, mailed Feb. 27, 2007.
Notice of Allowance mailed Sep. 8, 2010 in U.S. Appl. No. 12/160,352.
U.S. Appl. No. 12/960,069, filed Dec. 3, 2010, entitled Production Method of Liquid Crystal Display Device and Liquid Crystal Display Device.
U.S. Office Action mailed Nov. 9, 2011 in U.S. Appl. No. 12/960,069.
U.S. Final Office Action mailed Oct. 7, 2011 in U.S. Appl. No. 12/960,014.
U.S. Notice of Allowance mailed Aug. 30, 2011 in U.S. Appl. No. 12/854,972.
Notice of Allowance mailed Feb. 3, 2012 in U.S. Appl. No. 12/960,014.
Notice of Allowance mailed Feb. 17, 2012 in U.S. Appl. No. 12/960,069.
Notice of Allowance issued in U.S. Appl. No. 13/197,043 dated Oct. 30, 2013.

* cited by examiner

*Primary Examiner* — Hoan C Nguyen
(74) *Attorney, Agent, or Firm* — Nixon & Vanderhye, P.C.

(57) ABSTRACT

To provide a production method of a liquid crystal display device and a liquid crystal display device, in which generation of a joint line on a display screen is suppressed and yield can be improved even if a substrate is subjected to an alignment treatment by completing exposure for the substrate through several exposures in a liquid crystal display device including pixels each having two or more domains. The present invention is a production method of a production method of a liquid crystal display device, the liquid crystal display device including: a pair of opposed substrates; a liquid crystal layer formed between the pair of opposed substrates; and an alignment film arranged on a liquid crystal layer side surface of at least one of the pair of opposed substrates, and the liquid crystal display device having two or more regions which differ in alignment azimuth in a pixel, wherein the production method comprises an exposure step of exposing the alignment film in such a way that a substrate plane is divided into two or more exposure regions through a photomask in each exposure region, and in the exposure step, exposure is performed in such a way that adjacent two exposure regions have an overlapping exposure region where the adjacent two exposure regions partly overlap with each other, and the photomask has a halftone part corresponding to the overlapping exposure region.

3 Claims, 31 Drawing Sheets

Fig.12
(a)
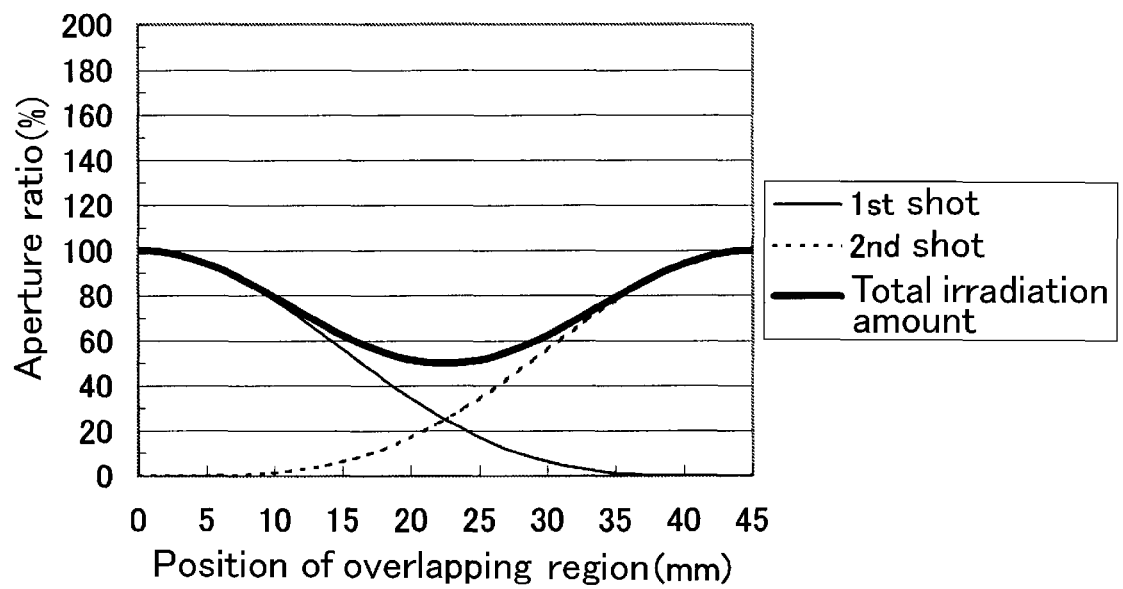
(b)
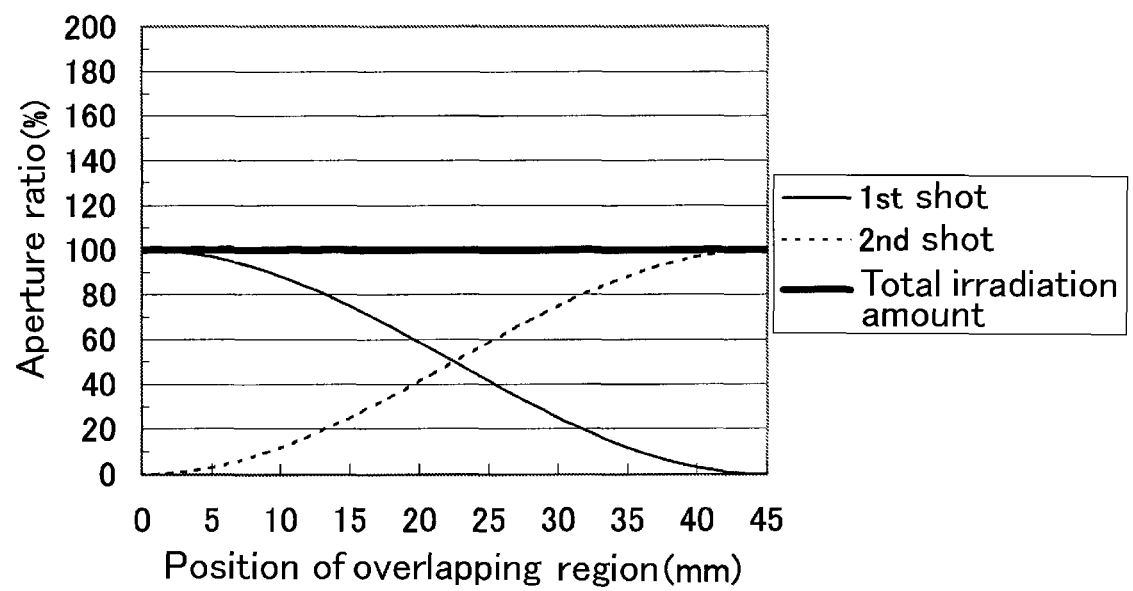

Fig.13
(a)
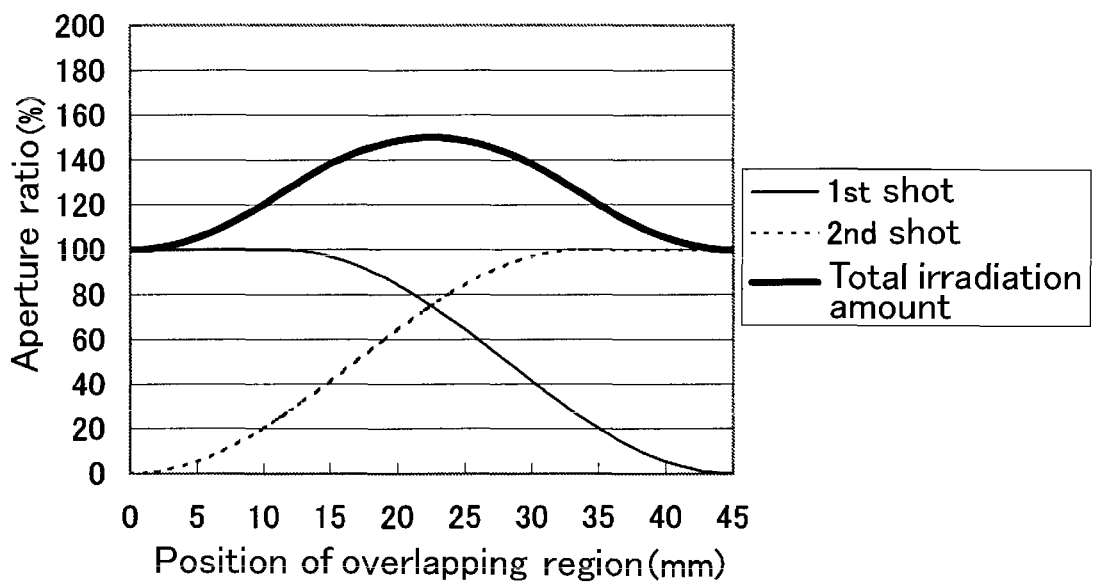
(b)
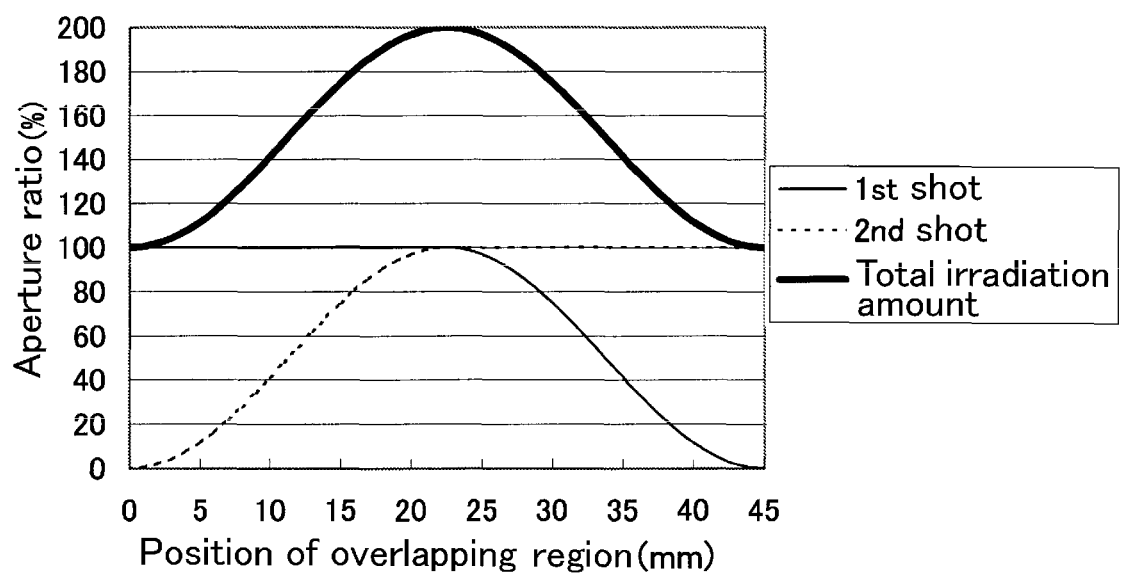

Fig.21
(a)
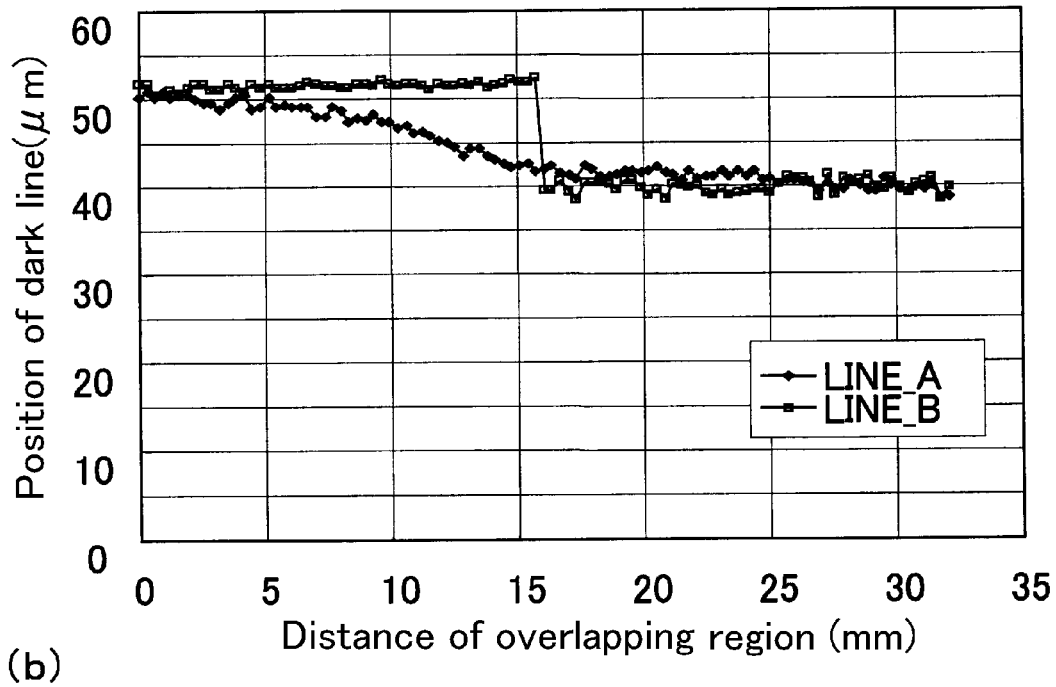
(b)
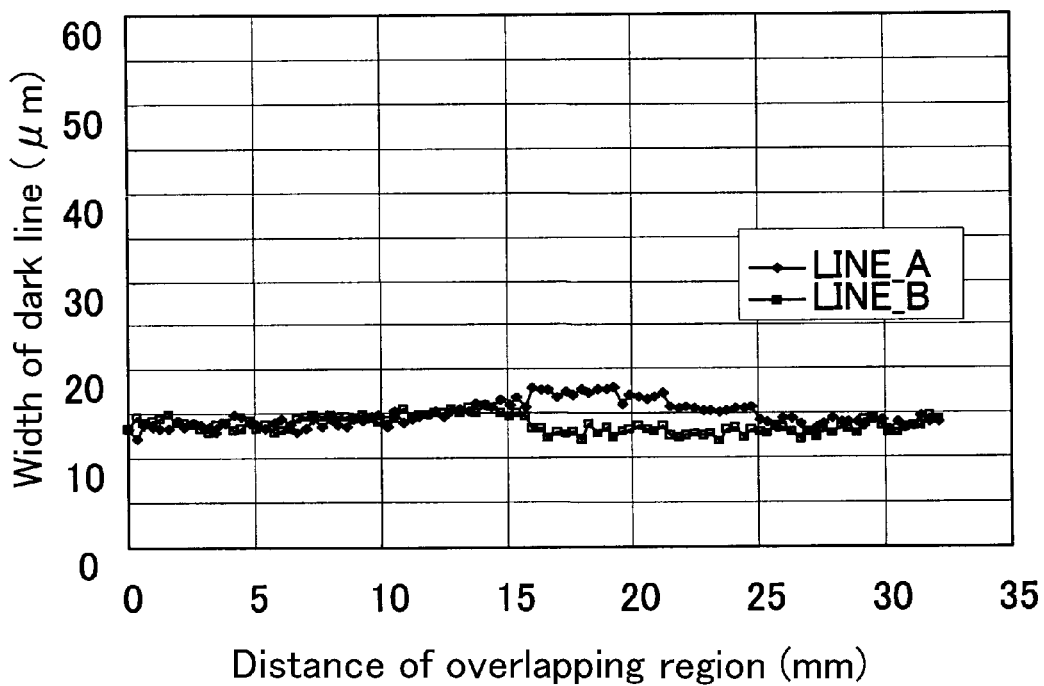

Fig. 26

PRODUCTION METHOD OF LIQUID CRYSTAL DISPLAY DEVICE WITH HALFTONE OVERLAPPING MASKING AND LIQUID CRYSTAL DISPLAY DEVICE

TECHNICAL FIELD

This application is a continuation of U.S. patent application Ser. No. 12/854,972 filed Aug. 12, 2010, now U.S. Pat. No. 8,054,431, which is a divisional of U.S. patent application Ser. No. 12/160,352 filed Jul. 9, 2008, now U.S. Pat. No. 7,872,718, which is the U.S. national phase of International Application No. PCT/JP 2007/051192, filed 25 Jan. 2007, which designated the U.S. and claims priority to Japan Application No. 2006-017755 filed 26 Jan. 2006, the entire contents of each of which are hereby incorporated by reference.

The present invention relates to a method for producing a liquid crystal display device and a liquid crystal display device. More specifically, the present invention relates to a method for producing a matrix liquid crystal display device and a matrix liquid crystal display device, in which high display qualities can be obtained by forming two or more domains in a pixel.

BACKGROUND ART

A liquid crystal display device has been widely used in a TV, a monitor for personal computers, and the like, because it is a display device with low power consumption and it can be reduced in weight and thickness. However, according to the liquid crystal display device, light polarization is generally controlled by a tilt angle of a liquid molecule in accordance with an applied voltage, and therefore the light transmittance depends on a viewing angle. Therefore, in the liquid crystal display device, a contrast ratio is reduced and gradation reversal at the time of intermediate scale display, and the like, are caused, depending on the viewing angle. Accordingly, such a common liquid crystal display device has room for improvement in that the viewing angle characteristics are insufficient.

An alignment division technique in which alignment and tilt directions of liquid crystal molecules are divided into two or more regions in one pixel has been developed. According to this technique, if a voltage is applied to a liquid crystal layer, the liquid crystal molecules are tilted in different directions in the pixel, thereby improving the viewing angle characteristics of the liquid crystal display device. The respective regions which differ in the alignment azimuth of the liquid crystal molecules are each referred to as a domain. The alignment division is also referred to as multi-domain.

With regard to the liquid crystal mode where the alignment division is performed, examples of horizontal alignment mode include multi-domain twist nematic (TN) mode, multi-domain electrically controlled birefringence (ECB) mode, and multi-domain optically compensated birefringence (OCB) mode. In addition, multi-domain vertical alignment (MVA) mode, patterned vertical alignment (PVA) mode, and the like are mentioned as a vertical alignment mode. Various modifications have been made to further improve the viewing angle in the liquid crystal display devices in various modes.

A rubbing method, a photo alignment method, and the like, may be mentioned as such an alignment division method. With regard to the rubbing method, an alignment division method of separating a rubbing region from a non-rubbing region by patterning a resist has been proposed. However, according to such a rubbing method, an alignment film surface is provided with an alignment treatment by being rubbed with a cloth wound on a roller, which causes the following defects: damage on switching elements by a fiber of the cloth, dusts such as rubbed scraps, or static electricity; characteristic shift; and characteristic deterioration. In such a point, the rubbing method still has room for improvement.

In contrast, the photo alignment method is an alignment method in which a photo alignment film is used as a material for the alignment film, and the photo alignment film is irradiated with a light beam such as UV, thereby being provided with an alignment regulating force. Accordingly, the alignment film can be provided with the alignment treatment in a contactless manner. Therefore, generation of soils, dusts, and the like during the alignment treatment can be suppressed. In addition, use of a photomask at the time of exposure makes it possible to irradiate the alignment film with a light beam under conditions which vary depending on a region in the alignment film surface. As a result, domains having a desired design can be easily formed.

As a conventional alignment division method using the photo alignment method, the following method may be mentioned if one pixel is divided into two domains. A method in which a half region of the pixel is subjected with the first exposure using a photomask including a transmissive part and a shielding part corresponding to each pixel, and then the photomask is shifted by about a half-pitch, and then the rest region of the pixel is subjected to the second exposure under conditions different from those in the first exposure. According to such a photo alignment method, each pixel can be easily divided into two or more domains using the photomask. For example, the Patent Document 1 discloses a technology of VAECB (vertical alignment ECB) mode in which an alignment treatment is performed by the photo alignment method.

In addition, an increase in size, particularly in the liquid crystal display device, has rapidly proceeded recently. Liquid crystal TVs in 40 to 60-inch model have rapidly developed, although plasma TVs conventionally accounted for the greatest share of the devices in such a size. However, it is very difficult to perform the alignment division in such a 60-inch liquid crystal display device by the above-mentioned conventional photo alignment method. The reason is given below. An exposure device which can be installed in a factory is limited, and therefore it is realistically impossible to install an exposure device capable of completing exposure for the 60-inch substrate by one exposure. That is why it is impossible to complete exposure for the entire surface of the 60-inch substrate by one exposure. Accordingly, the exposure for the substrate needs to be completed through several exposures, when a large liquid crystal display device is subjected to the alignment division. Further, also if the alignment division treatment is performed for a relatively small liquid crystal display device in 20-inch model by the photo alignment method, the exposure for the substrate might need to be completed through several exposures in the case where the size of the exposure device needs to be decreased as much as possible. However, if the exposure for the substrate is completed through several exposures and thereby a liquid crystal display device is prepared, a joint line between the exposure regions is clearly observed on the display screen.

Accordingly, if the liquid crystal display device is subjected to the alignment division by completing the exposure for the substrate through several exposures, there is still room for improvement in that generation of the joint line on the display screen is suppressed and the yield is improved.

Patent Document 1

Japanese Kokai Publication No. 2001-281669

DISCLOSURE OF INVENTION

The present invention has been made in view of the above-mentioned state of the art. The present invention provides a production method of a liquid crystal display device and a liquid crystal display device, in which generation of the joint line on the display screen is suppressed and the yield can be improved even if a substrate is subjected to the alignment division through several exposures in a liquid crystal display device which includes two or more domains in each pixel.

The present inventors made various investigations on a production method of a liquid crystal display device, in which the joint line is not observed on the display screen even if the substrate is subjected to the alignment division through several exposures. The inventors noted an embodiment of the exposure which is performed several times for the substrate. The inventors found the following: even if irradiation conditions are different between a center region and a peripheral region in the same exposure region, this difference is continuously changed in the same plane and it is hardly observed by human eyes. However, it is substantially impossible to irradiate the respective regions for which the exposure is separately performed on the substrate, under completely the same conditions, even if the exposure is performed by an exposure device with the highest accuracy and using a photomask having a pattern with the highest accuracy. Even if the difference in the irradiation conditions between adjacent two exposure regions is small, the joint line is observed by human eyes because of the adjacent discontinuous conditions.

The present inventors made further investigations and found the followings: as the reason why the joint line is generated, a difference in irradiation amount between adjacent two exposure regions and a difference in proximity gap that is a distance between the mask and the substrate may be mentioned, and if polarized UV irradiation is performed, a difference in the polarization axis, is mentioned, for example. However, the main reason why the joint line is observed is a difference in alignment accuracy of a photomask between adjacent two exposure regions. That is, even if the photomask is aligned with the highest accuracy as much as possible on the exposure device, misalignment of about ±several micrometers is inevitable at the current technical level. Further, even if the misalignment is within ±several micrometers, the joint line is surely observed by human eyes at the boundary between the adjacent two exposure regions.

Then, the inventors found that due to generation of this photomask misalignment, a position and a width of a dark line generated at the boundary between regions which differ in alignment azimuth in the pixel, that is, between domains, are discontinuously changed between the right and left sides of the joint line, and as a result, the joint line is observed. Further, the inventors found that the position and the width of the dark line near the joint line can be continuously changed if the exposure for the substrate is completed through several exposures in such a way that adjacent two exposure regions partly overlap with each other using a photomask having a halftone part which corresponds to the overlapping exposure region. As a result, the present inventors found that a production method of a liquid crystal display device and a liquid crystal display device, in which the joint line is not observed on the display screen even if the substrate is subjected to the alignment division treatment by completing the exposure for the substrate through several exposures. The above-mentioned problems have been admirably solved, leading to completion of the present invention.

That is, the present invention is a production method of a liquid crystal display device, the liquid crystal display device including: a pair of opposed substrates; a liquid crystal layer formed between the pair of opposed substrates; and an alignment film arranged on a liquid crystal layer side surface of at least one of the pair of opposed substrates, and the liquid crystal display device having two or more regions which differ in alignment azimuth in a pixel, wherein the production method includes an exposure step of exposing the alignment film in such a way that a substrate plane is divided into two or more exposure regions through a photomask in each exposure region, and in the exposure step, exposure is performed in such a way that adjacent two exposure regions have an overlapping exposure region where the adjacent two exposure regions partly overlap with each other, and the photomask has a halftone part corresponding to the overlapping exposure region.

The present invention also relates to a liquid crystal display device including a pair of opposed substrates, a liquid crystal layer formed between the pair of opposed substrates, and an alignment film arranged on a liquid crystal layer side surface of at least one of the pair of opposed substrates, and the liquid crystal display device having two or more regions which differ in alignment azimuth in a pixel, wherein a position and a width of a dark line generated between the two or more regions which differ in alignment azimuth is continuously changed between adjacent two pixels.

The production method of the liquid crystal display device of the present invention is mentioned in more detail below.

The production method of the liquid crystal display device according to the present invention includes an exposure step in which the alignment film is exposed in such a way that a substrate plane is divided into two or more exposure regions through a photomask in each of the two or more exposure regions. Thus, the exposure for the substrate is completed through several exposures, and therefore even in a large liquid crystal display device, the alignment division treatment can be performed for the entire substrate using an exposure device in a normal size. The embodiment of the division of the exposure region is not especially limited and it may be appropriately determined. Examples thereof include an embodiment in which the substrate is bisected, an embodiment in which it is divided into three in a stripe pattern, a form in which it is divided into four in a matrix pattern.

The above-mentioned alignment film is subjected to the alignment treatment by being exposed. Generally, the above-mentioned alignment film is a photo alignment film formed of a material capable of changing an alignment azimuth of liquid crystals depending on a photo-irradiation direction or a moving direction of a photo-irradiated region. The photo alignment film may exhibit an alignment regulating force by the photo-irradiation. In the present description, the "alignment azimuth" means an azimuth shown by projecting a tilt direction of the liquid crystal molecule included in the liquid crystal layer onto the substrate surface.

The above-mentioned photomask includes a transmissive part which transmits a light beam and a shielding part which shields a light beam. The transmissive part is not especially limited as long as it transmits a light beam. The transmissive part may be formed using a transparent resin and the like, but preferably it is an opening where nothing is formed. A photomask prepared by forming a pattern of a metal film such as a chromium film on a transparent substrate such as glass is preferable as the photomask. The pattern of the photomask can be appropriately determined corresponding to a desired domain shape. It is particularly preferable that the photomask has a repeated pattern consisting of a transmissive part and a shielding part. According to this, the alignment treatment can be generally performed with efficiency, for pixels arrayed in a matrix pattern. The repeated pattern is not especially limited, and a stripe pattern and a dot pattern are preferable.

According to the exposure step in the present invention, the exposure is performed in such a way that the adjacent two exposure regions partly overlap with each other. That is, the production method of the liquid crystal display device of the present invention includes an exposure step in which the alignment film is exposed in such a way that the substrate plane is divided into two or more exposure regions and the adjacent two exposure regions partly overlap with each other, through the photomask in each of the two or more exposure regions. Accordingly, in the present invention, generally, a part or the entire of the alignment film in the pixel near the joint line is exposed twice or more through two or more photomasks (hereinafter, also referred to as an "overlapping exposure"). The area of the overlapping exposure region (hereinafter, also referred to as an "overlapping region") is not especially limited. However, the position and the width of the dark line between the adjacent two exposure regions can be more smoothly connected if the area is as large as possible. However, if the overlapping region is too large, a larger photomask is needed, and therefore the exposure device needs to be larger. Accordingly, in order to suppress generation of the joint line and downsize the exposure device, it is preferable that the area of the overlapping region is small enough for the joint line to be invisible. More specifically, the width of the overlapping region is preferably about 10 to 80 mm, and more preferably about 30 to 60 mm, and still more preferably about 40 to 50 mm. The total irradiation amount in the overlapping exposure region (in the region which is exposed twice through a plurality of photomasks) (hereinafter, also referred to as "total irradiation amount") is preferably 50 to 200% and more preferably 70 to 150% relative to 100% of the irradiation amount in the non-overlapping exposure region, that is, the irradiation amount in the general region where the alignment film is exposed once through one photomask. If the total irradiation amount is less than 50%, the total irradiation amount near the center of the overlapping region is insufficient and the alignment film is not provided with a sufficient alignment regulating force. As a result, only such a position is observed as an uneven position. If the total irradiation amount is more than 200%, electrical characteristics might be deteriorated in the overlapping region when a material with high sensitivity is used as the material for the alignment film. More specifically, residual DC, an image sticking phenomenon and the like might be generated, or a voltage holding ratio might be reduced.

The exposure method in the above-mentioned exposure step is not especially limited, but simultaneous exposure and scanning exposure are preferred. That is, it is preferable that the exposure step is performed while at least one of the substrate and a light source is moved (scanning exposure) or that the exposure step is performed with the substrate and a light source being fixed (simultaneous exposure). The scanning exposure method is not especially limited as long as the exposure is performed while a position where a light beam is irradiated on the substrate surface is moved. It is also called scanning exposure. As a specific embodiment of the scanning exposure, an embodiment in which while a light source and/or a substrate are/is moved, the substrate is irradiated with a light beam from the light source. The scanning exposure is excellent in stability e.g., in an irradiation light amount in the substrate plane, in comparison to the simultaneous exposure in which a light source and a region to be exposed are fixed and the region to be exposed is simultaneously exposed. Therefore, according to the scanning exposure, variation in characteristics of the alignment film, such as alignment azimuth and pretilt angle, can be effectively suppressed. Further, a small exposure device is enough if the scanning exposure is employed. Therefore, device costs can be reduced. Also as the photomask, a small one is enough. Therefore, the accuracy of the mask itself can be increased. If the light source is moved in the scanning exposure, the light source and the photomask are generally integrally moved. The pretilt angle means an angle formed by the alignment film surface and a longitudinal direction of the liquid crystal molecule near the alignment film when no voltage is applied to the liquid crystal layer (at OFF-state, during non-voltage application). In the scanning exposure, if panels which differ in a pitch of the transmissive part are arranged in the scanning direction, the mask needs to be exchanged in accordance with the panels. However, according to the simultaneous exposure, the different panels can be exposed at one time using a photomask which is previously provided with a plurality of panel patterns. The simultaneous exposure is also called one-shot exposure.

If the above-mentioned scanning exposure is performed, it is preferable that the pattern on the substrate is scanned by a camera for image detection and the like, and simultaneously, the moving direction of the substrate and/or the light source is controlled. As a result, if the substrate is distorted, the scanning exposure with high accuracy can be performed along the pixel array. The scanned pattern on the substrate is not especially limited, but a pattern which is periodically or continuously formed in the scanning direction is preferred. Among these, a bus line, a black matrix (BM) and the like, which are arranged on the substrate, are preferable.

In the present invention, it is preferable that in the above-mentioned exposure step, UV is made incident to a normal line of the substrate plane from an oblique direction, although depending on a material for the alignment film to be exposed. As a result, the liquid crystal layer can be easily provided with a preferably pretilt angle in each liquid crystal mode, and thereby a response speed of the liquid crystal molecules can be improved. However, the light beam needs not to be made incident to the substrate plane from an oblique direction, and it may be made incident to the substrate plane from a substantially vertical direction if appearance of the pretilt angle depends on the moving direction of the photo-irradiated region, as in the photo alignment method disclosed in "Photo-Rubbing Method: A Single-Exposure Method to Stable Liquid-Crystal Pretilt Angle on Photo-Alignment Film", M. Kimura and three et al, IDW'04: proceedings of the 11th International Display Workshops, IDW'04 Publication committee, 2004, and LCT2-1, p. 35-38.

It is preferable that the UV is polarized UV. If the alignment film is irradiated with anisotropic UV, anisotropic rearrangement or chemical reaction of molecules in the alignment film can be easily induced. Accordingly, the alignment azimuth of the liquid molecules near the alignment film can be more uniformly controlled. The wavelength range of the UV can be appropriately determined depending on a material for the exposed alignment film.

The photomask in the present invention has a halftone part which corresponds to the overlapping exposure region. That is, the above-mentioned photomask has a halftone part in a region corresponding to the overlapping exposure region. According to this, the joint line can be effectively suppressed from being observed. As a result, the yield of the liquid crystal display device which is subjected to the alignment treatment by completing the exposure for the substrate through several exposures can be improved. The reason why the joint line becomes invisible is mentioned below. Accordingly, the halftone part is preferably arranged on the end side (periphery side), more preferably at the end (periphery) in the region where the transmissive part is formed of the photomask. In the present description, the halftone part means a part where a transmissive part having an aperture ratio smaller than that of a transmissive part in the region other than the halftone part (other than the overlapping exposure region) is arranged. The aperture ratio means a proportion (percentage) of an area of the respective transmissive parts in the halftone part relative to an average area of the transmissive parts in the region other than the halftone part. As mentioned herein, the photomask used in the present invention includes a halftone part at apart or the entire of the part corresponding to the overlapping exposure region (overlapping region).

As an embodiment of the above-mentioned halftone part, an embodiment in which the halftone part includes transmissive parts with various aperture ratios and the transmissive parts are arranged in descending order of the aperture ratios toward an end of the photomask is preferable. In the present description, more specifically, the end of the photomask means an end of the photomask, which is positioned on the side opposed to the region corresponding to the region (general exposure region) other than the overlapping exposure region. As a result, the position and the width of the dark line between adjacent two exposure regions can be more smoothly connected. With regard to the change in the aperture ratio in the halftone part, (1) an embodiment in which a change in the aperture ratios is expressed as a linear function and an embodiment (2) in which a change in the aperture ratios is expressed as a trigonometric function. That is, it is preferable that in the halftone part, a change in the aperture ratios is expressed as a linear function. Further, it is preferable that in the halftone part, a change in the aperture ratios is expressed as a trigonometric function. According to the embodiment (1), generation of the discontinuous step can be suppressed in the halftone part. According to the embodiment (2), generation of the discontinuous step is suppressed, and additionally, a differential coefficient of the change in the aperture ratio is substantially zero between both ends of the halftone part. Therefore, the position and the width of the dark line between the overlapping region and the other regions can be more smoothly connected. From such a viewpoint, the embodiment in which the aperture ratio is changed in accordance with a linear function or the embodiment in which the aperture ratio is changed in accordance with a trigonometric function is preferable as the embodiment in which the aperture ratio in the halftone part is changed.

Preferable embodiments of the transmissive part in the halftone part include an embodiment (A) in which the transmissive parts have various lengths, and the transmissive parts are arranged in descending order of the lengths toward an end of the photomask, an embodiment (B) in which the transmissive parts have various widths, and the transmissive parts are arranged in descending order of the widths toward an end of the photomask, an embodiment (C) in which the transmissive parts include a transmissive part having a shape which is axial symmetry to a center line which bisects a width of a transmissive part-arranged region, and an embodiment (D) in which the transmissive parts include a transmissive part having a step shape. That is, it is preferable that in the halftone part, the transmissive parts have various lengths, and the transmissive parts are arranged in descending order of the lengths toward an end of the photomask; it is preferable that in the halftone part, the transmissive parts have various widths, and the transmissive parts are arranged in descending order of the widths toward an end of the photomask; it is preferable that in the halftone part, the transmissive parts include a transmissive part having a shape which is axial symmetry to a center line which bisects a width of a transmissive part-arranged region; and it is preferable that in the halftone part, the transmissive parts include a transmissive part having a step shape. The photomask having the embodiment (A) is preferable as a mask for the scanning exposure. If such a photomask is used, the total irradiation amount in the overlapping region can be easily controlled. The photomask having the embodiment (B) is preferable as a mask for the simultaneous exposure and the scanning exposure. If such a photomask is used, the position and the width of the dark line can be continuously connected between the right and left sides of the joint line more effectively. The length of the transmissive part generally means, in a slit pattern, a length in the long-side direction, or in a dot pattern, a length in the scanning direction of the scanning exposure. In the slit pattern, the length of the transmissive part may be a length in the longitudinal direction. Further, the width of the transmissive part generally means, in a slit pattern, a length in the short-side direction, or in a dot pattern, a length in the direction substantially vertical to the scanning direction of the scanning exposure. In the slit pattern, the width of the transmissive part may be a length in the direction substantially perpendicular to the longitudinal direction. According to the embodiment (C), the position and the width of the dark line can be continuously connected between the right and left sides of the joint line more effectively. The transmissive part-arranged region means a region where the transmissive part is formed in the case where the aperture ratio in the transmissive part is not decreased in the halftone part. That is, it means a region where the transmissive part is formed if it is assumed that the halftone part also has an arrangement pattern of the transmissive part, which the photomask in the region other than the halftone part has. The width of the transmissive part-arranged region is a length of the transmissive part-arranged region in the same direction as the direction of the width of the transmissive part. Further, in this embodiment, the transmissive part may not necessarily have a shape which is strictly axial symmetry to the center line which strictly bisects the width of the transmissive part-arranged region. The transmissive part may have a shape which is substantially axial symmetry to the center line which substantially bisects the width of the transmissive part-arranged region. The photomask in accordance with the embodiment (D) is preferably used as a mask for scanning exposure. If such a photomask is used, a shift from 100% of the total irradiation amount in the overlapping region can be suppressed to be a relatively small.

Further, according to the above-mentioned embodiment (B) in the above-mentioned photomask, an embodiment (B-1) in which in the photomask, a distance between center position of two adjacent transmissive parts is uniform and an embodiment (B-2) in which in the halftone part, the transmissive parts include a transmissive part which is divided from the center of a transmissive part-arranged region to both sides, are preferable. According to the embodiment (B-1), in the substantially entire photomask, the distance between the center positions of two adjacent transmissive parts is not changed. Therefore, the position of the exposure region in the halftone part is more continuously changed, and the position and the width of the dark line can be continuously changed on the right and left sides of the joint line. According to the photomask in the above-mentioned embodiment (B-1), the distance between the center positions of two adjacent transmissive parts is not necessarily strictly uniform, and it may be substantially uniform. Thus, the above-mentioned embodiment (B-1) may be an embodiment in which in the halftone part, the center of the transmissive part is substantially the same as the center of the transmissive part-arranged region. That is, the above-mentioned photomask may have an embodiment in which in the halftone part, the center of the transmissive part is substantially the same as the center of the transmissive part-arranged region. According to the embodiment (B-2), the transmissive part in the halftone part becomes thinner and it is divided from the center to both sides. If such a photomask is used together with the photomask in accordance with the embodiment (B-1), an area in the overlapping exposure region can be suppressed to be small. Therefore, deterioration of electrical characteristics, specifically, generation of residual DC and an image sticking phenomenon, and the like, reduction in voltage holding ratio, and the like, can be effectively suppressed. In accordance with the above-mentioned embodiment (B-2), the halftone part more preferably has an embodiment in which the transmissive part is substantially equally divided from the center of the transmissive part-arranged region to the both sides. The above-mentioned embodiments (A), (B), (C), (D), (B-1), and (B-2) may be appropriately applied to the photomask in combination, if needed. The respective preferable embodiments in the above-mentioned production method of the liquid crystal display device of the present invention may be appropriately used in combination.

Other various conditions of the exposure in the present invention, such as kind of the light source, the exposure amount, and the size of the photomask may be appropriately determined depending on conditions for forming the alignment film such as a desired alignment azimuth and a pretilt angle.

The reason why the joint line is observed and the reason why the joint line becomes invisible according to the present invention if the substrate is subjected to the alignment treatment by completing the exposure for the substrate through several exposures are mentioned below.

First, the reason why the joint line is observed is mentioned. If the mask is misaligned when the exposure for the substrate is completed through several exposures, the position of the dark line becomes different between adjacent two exposure regions, which results in difference in domain area ratio between the exposure regions. Accordingly, the optical characteristics are varied among the exposure regions. Therefore, particularly if the display screen is observed in an oblique direction, the luminance is discontinuously changed between the exposure regions. As a result, the boundary between the exposure regions is observed as the joint line. If the width of the dark line is different between adjacent two exposure regions, the luminance of the domain is different between the exposure regions. Therefore, as in the case where the position of the dark line is different, the luminance is discontinuously changed between the exposure regions. As a result, the boundary between the exposure regions is clearly observed as the joint line.

Then, the reason why the joint line becomes invisible is mentioned. In the halftone part of the photomask, if the aperture ratio is continuously changed, for example, by gradually thinning the transmissive part, the position of the end of the transmissive part, that is, the position where the dark line is formed is gradually changed. Further, if the scanning exposure is performed using a photomask in which the aperture ratio is continuously changed, for example, by gradually decreasing the transmissive part in the halftone part, the total irradiation amount in the overlapping region is gradually changed, and therefore, the position where the dark line is formed is gradually changed. Accordingly, in the overlapping region, the domain area ratio and the luminance between the exposure regions are continuously changed. Therefore, the joint line becomes invisible. If the width of the dark line is different between the exposure regions, as in the case where the position of the dark line is different, the width of the dark line is gradually changed in the overlapping region if the photomask having the halftone part is used. Therefore, the joint line becomes invisible. Thus, according to the production method of the liquid crystal display device of the present invention, even if the masks are misaligned in opposite directions between the right and left sides of the joint line, the discontinuous dark lines at the joint line can be connected due to use of the halftone part. Therefore, the joint line becomes hardly visible. Accordingly, according to the production method of the present invention, even a very large liquid crystal display device in 60-inch model can be produced with high yield.

In the present description, the dark line has a low luminance and it is generated on the display screen because the alignment azimuth and the polarization axis direction of the polarizer are substantially the same or substantially perpendicular to each other. Such a dark line is different from a region where light from a backlight is shielded by a shielding body such as a bus line and a black matrix. The liquid crystal molecules between different domains are tilted in different directions, although, during the voltage is applied, the liquid crystal molecules are tilted in the same direction in the respective domains in the multi-domain pixel. Further, the liquid crystal molecule has a continuous elastic body. Between the different domains, the liquid crystal molecules are aligned to continuously connect the liquid crystal molecules tilted in different directions to each other. Accordingly, between different domains where four-domain alignment is provided, the alignment azimuth of the liquid crystal molecules is substantially the same as or substantially perpendicular to the polarization axis direction of the polarizer generally included in the liquid crystal display device when the liquid crystal display device is viewed in front. For the polarized light which transmits the region where the liquid crystal molecules are aligned in the direction substantially the same as or substantially perpendicular to the polarization axis direction of this polarizer, the retardation attributed to the liquid crystal molecules is not generated. Accordingly, in this region, after transmitting a lower polarizer arranged on the backlight side, the polarized light is not influenced by the liquid crystal layer, and then cut by an upper polarizer arranged on the display screen side. As a result, the region where the liquid crystal molecules are aligned in the direction substantially the same as or substantially perpendicular to the polarization axis direction of the polarizer is observed as a dark line with a low luminance (corresponding to the dark line in the present description).

As long as the production method of the liquid crystal display device of the present invention essentially includes the above-mentioned exposure step, other steps are not especially limited.

The liquid crystal display device produced by the present invention includes a pair of opposed substrates; a liquid crystal layer formed between the pair of opposed substrates; and an alignment film arranged on a liquid crystal layer side surface of at least one of the pair of opposed substrates, and the liquid crystal display device has two or more regions which differ in alignment azimuth in a pixel. With regard to the configuration of the liquid crystal display device produced by the present invention, as long as the liquid crystal display device essentially includes common components such a multi-domain matrix liquid crystal display device has, other components are not especially limited. In the present description, the two or more regions which differ in alignment azimuth mean a plurality of regions where the liquid crystal molecules included in the liquid crystal layer are tilted in different directions when a voltage not lower than a specific threshold or a voltage lower than a specific threshold is applied to the liquid crystal layer (during a voltage application) or when no voltage is applied to the liquid crystal layer (during non-voltage application). That is, it means a so-called domain. Thus, the two or more regions which differ in alignment azimuth preferably are a plurality of regions where the liquid crystal molecules included in the liquid crystal layer are tilted in different directions when a voltage applied to the liquid crystal layer is changed.

Either one of the above-mentioned pair of opposed substrates is preferably a TFT array substrate where thin film transistors (hereinafter, also referred to as a "TFT") as a switching element and pixel electrodes are arranged in a matrix pattern. The other substrate of the above-mentioned pair of opposed substrates is a color filter substrate (hereinafter, also referred to as a "CF substrate") including color filters and common electrodes. Thus, the liquid crystal display device produced by the present invention is preferably an active matrix liquid crystal display device, but it may be a passive matrix liquid crystal display device. If the passive matrix liquid crystal display device is produced by the present invention, a substrate including signal electrodes (column electrodes) which are arranged in a stripe pattern and a substrate including scanning electrodes (row electrodes) which are arranged in a stripe pattern to be perpendicular to the signal electrodes are used in combination, as the first and second substrates. In the present description, in an active matrix liquid crystal display device, the pixel is determined by a pixel electrode and a common electrode facing the pixel electrode. Further, in a passive matrix liquid crystal element, the pixel is determined by an intersection of the signal electrodes and the scanning electrodes, arranged in a stripe pattern.

According to the production method of the liquid crystal display device in the present invention, the pattern of the photomask is appropriately determined. Therefore, the liquid crystal display device produced by the present invention is not especially limited as long as it is in a liquid crystal mode in which two or more domains are formed. The liquid crystal display device in the present invention may have any multi-domain liquid crystal mode, for example, horizontal alignment modes, such as multi-domain TN mode, multi-domain STN (Super Twisted Nematic) mode, multi-domain ECB mode, and multi-domain OCB mode, and vertical alignment modes such as MVA mode and PVA mode. Among these, the multi-domain TN mode and the multi-domain VATN mode are preferable as the liquid crystal mode of the liquid crystal display device produced by the present invention. If a liquid crystal display device in the horizontal alignment mode is produced, it is preferable that the above-mentioned liquid crystal layer includes liquid crystal molecules with positive dielectric anisotropy. If a liquid crystal display device in the vertical alignment mode is produced, it is preferable that the above-mentioned liquid crystal layer includes liquid crystal molecules with negative dielectric anisotropy.

As mentioned above, the present invention is also a production method of the liquid crystal display device including two or more regions which differ in alignment azimuth in a pixel, wherein the method includes the step of exposing the alignment film arranged on the substrate surface through the photomask having the halftone part.

Further, the present invention is also a production method of a liquid crystal display device including two or more regions which differ in alignment azimuth in a pixel, wherein the method includes: the first exposure step of exposing the first exposure region of an alignment film through the first photomask having the first halftone part; and the second exposure step of positioning the second photomask having the second halftone part in such a way that the second halftone part is arranged corresponding to the region which have been exposed through the first halftone part, and then exposing the second exposure region which partly overlaps with the first exposure region of the alignment film through the second photomask.

Further, the present invention is a production method of a liquid crystal display device, the liquid crystal display device including: a pair of opposed substrates; a liquid crystal layer formed between the pair of opposed substrates; and an alignment film arranged on a liquid crystal layer side surface of at least one of the pair of opposed substrates, and the liquid crystal display device having two or more regions which differ in alignment azimuth in a pixel, wherein the production method includes the first exposure step of forming the first exposure region by exposing the alignment film through the first photomask including a plurality of transmissive parts in the shielding region and the second exposure step of forming the second exposure region by exposing the region partly overlapping with the first exposure region of the alignment film through the second photomask including a plurality of transmissive parts in the shielding region, and the first and second photomasks each include a halftone part in a region corresponding to the exposure region where the first exposure region and the second exposure region overlap with each other (overlapping region), and in the second exposure step, at least part of the alignment film in the pixel, which has been exposed through the halftone part of the first photomask in the first exposure step, is exposed through the second photomask.

The liquid crystal display device of the present invention is mentioned in more detail below.

The liquid crystal display device of the present invention includes a pair of opposed substrates; a liquid crystal layer formed between the pair of opposed substrates; and an alignment film arranged on a liquid crystal layer side surface of at least one of the pair of opposed substrates, and the liquid crystal display device has two or more regions which differ in alignment azimuth in a pixel. Accordingly, the liquid crystal display device of the present invention is preferably used in a multi-domain matrix liquid crystal display device. Further, such a liquid crystal display device has excellent viewing angle characteristics.

In the liquid crystal display device of the present invention, the position and the width of the dark line generated between the regions (domains) which differ in alignment azimuth are continuously changed between adjacent two pixels. It is preferable that the above-mentioned dark line shows such a relationship in the entire display screen. In the liquid crystal display device where the alignment division is identically provided, the position and the width of the dark line generally generated between the domains appear to be the same among the pixels. However, if the alignment division treatment is performed, the position and width of the dark line are generally varied among the pixels because of limit of the accuracy of the treatment device, difference in the treatment conditions, and the like. In contrast, according to the liquid crystal display device of the present invention, even if the position and the width of the dark line are different between the pixels, the position and the width of the dark line are continuously changed between adjacent two pixels, and therefore the luminance is continuously changed. As a result, the joint line on the display screen becomes invisible. The method for producing the liquid crystal display device of the present invention is not especially limited. However, the above-mentioned production method of the liquid crystal display device according to the present invention can be preferably used because the position and the width of the dark line are continuously changed. In the present description, the position of the dark line means a position where the luminance shows the minimum value between different domains in the liquid crystal alignment region except for a shielding body region (a region where the shielding body is arranged) in the liquid crystal display panel plane, for example, a region on a bus line or a black matrix. The width of the dark line means a distance between two points each showing the maximum luminance of 90% in the luminance cross-sectional curve in the direction substantially vertical to the dark line. The position and the width of the dark line can be measured in the following manner, for example. A liquid crystal display panel is placed under a polarization microscope including polarizers arranged in a Cross-Nicol state and a picture of each pixel in the panel is taken. Then, image processing is provided for each of the taken images.

In the present invention, if the position and the width of the dark line are continuously changed in adjacent two pixels it is preferable that in adjacent two pixels, the changing amount of the position is less than 5 µm and the changing amount of the width is 3 µm or less. It is more preferable that the changing amount of the position is 2 µm or less and the changing amount of the width is 3 µm or less. In this case, the luminance is more continuously changed in the liquid crystal display device of the present invention. Therefore, the joint line on the display screen can be more effectively suppressed from being observed.

Similarly to the substrates mentioned in the production method of the liquid crystal display device, a TFT array substrate and a CF substrate are preferable as the above-mentioned pair of opposed substrates, if the liquid crystal display device of the present invention is an active matrix liquid crystal display device. Further, if the liquid crystal display device of the present invention is a passive matrix liquid crystal display device, a substrate including signal electrodes and a substrate including scanning electrodes are generally used in combination.

In the present invention, the above-mentioned alignment film is not especially limited as long as it exhibits an alignment regulating force. A resin film for which alignment treatment is provided by rubbing, ion beam irradiation or plasma irradiation; a photo alignment film for which alignment treatment is provided by photo-irradiation; an inorganic substances such as obliquely deposited SiO, may be mentioned. Among these, it is preferable that the alignment film is a photo alignment film. According to this, the liquid crystal display device of the present invention can be easily produced using the above-mentioned production method of the liquid crystal display device of the present invention. The material for the above-mentioned photo alignment film is not especially limited as long as it is a material which generates an alignment regulating force by photo-irradiation and which changes the alignment azimuth depending on the photo-irradiating direction or the moving direction of the photo-irradiated region. A resin including a photosensitive group, and the like, may be mentioned. Among these, a material which causes at least one reaction or alignment, by photo-irradiation, selected from the group consisting of crosslinking reaction (including dimerization reaction), isomerization reaction, and photo realignment is preferable. That is, it is preferable that the photo alignment film causes at least one reaction or alignment, by photo-irradiation, selected from the group consisting of crosslinking reaction, isomerization reaction and photo realignment. According to this, the variation in pretilt angle can be effectively suppressed in comparison to a photolysis photo alignment film material. The light beam used in the photo-irradiation is not especially limited, and polarized UV is preferable. The alignment film material which causes crosslinking reaction (including dimerization reaction), isomerization method, photo realignment, and the like is not especially limited, but polyimide containing a photosensitive group such as a 4-chalcone group (the following formula (1)), a 4'-chalcone group (the following formula (2)), a coumarin group (the following formula (3)), and a cinnamoyl group (the following formula (4)) is preferable. A cinnamate group ($C_6H_5$—CH=CH—COO—) in which an oxygen atom is further bonded to a carbonyl group in the cinnamoyl group represented by the following formula (4) has an advantage in that it can be easily synthesized. Accordingly, polyimide containing a cinnamate group is more preferable as the material for the photo alignment film. Further, if the alignment treatment is performed by ion beam irradiation or plasma irradiation, a metal mask is preferably used as the mask, for example.

[Chemical 1]

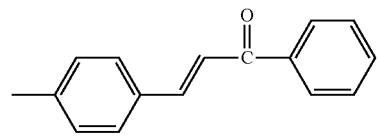

(1)

[Chemical 2]

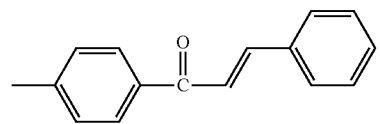

(2)

[Chemical 3]

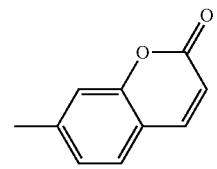

(3)

[Chemical 4]

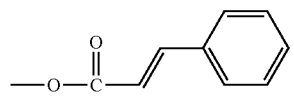

(4)

The above-mentioned liquid crystal layer includes liquid crystal molecules. The liquid crystal molecules are not especially limited. The liquid crystal layer may contain a plurality of liquid crystal materials. It is preferable that the liquid crystal mode is a horizontal alignment mode or a vertical alignment mode. That is, in the present invention, it is preferable that the liquid crystal layer includes liquid crystal molecules with positive dielectric anisotropy; the alignment film is arranged on a liquid crystal layer side surface of both of the pair of opposed substrates, and the alignment film aligns the liquid crystal molecules substantially horizontally to a surface of the alignment film when a voltage lower than a threshold is applied. Further, it is preferable that the liquid crystal layer includes liquid crystal molecules with negative dielectric anisotropy; the alignment film is arranged on a liquid crystal layer side surface of both of the pair of opposed substrates, and the alignment film aligns the liquid crystal molecules substantially vertically to a surface of the alignment film when a voltage lower than a threshold is applied.

In the above-mentioned liquid crystal display device in the horizontal alignment mode or the vertical alignment mode, the number of the domain may be appropriately determined. It is preferable that two or more and four or less of domains are formed. That is, in the above-mentioned liquid crystal display device in the horizontal alignment mode or the vertical alignment mode, it is preferable that two or more and four or less of regions (domains) which differ in alignment azimuth are formed in one pixel. It is more preferable that four regions which differ in alignment azimuth are formed in one pixel. According to this, the production steps can be suppressed from being complicated, and simultaneously a liquid crystal display device excellent in viewing angle characteristics can be produced. If two domains are formed, on the display screen, for example, the viewing angle in either one of the vertical and horizontal directions can be improved, but the viewing angle characteristics in the other direction can not be improved. In contrast, if four domains are formed, the viewing angle in both of the vertical and horizontal directions can be improved. Simultaneously, the viewing angle characteristics in both directions can be uniform. That is, the viewing angle characteristics excellent in symmetry can be produced. Therefore, a liquid crystal display device free from the viewing angle dependence can be produced. In the four-domain alignment division, the arrangement of the four domains is not especially limited. A matrix pattern, a stripe pattern such as a horizontal stripe pattern may be mentioned, for example. Four or more domains may be formed, but the production process becomes complicated and it takes longer to perform the alignment treatment. Further, it has been known that the viewing angle characteristics are not so different practically between the four-domain alignment division and five or more-domain alignment division.

In the present invention, it is preferable that the liquid crystal mode is a multi-domain TN mode or a multi-domain VAIN mode. That is, in the above-mentioned liquid crystal display device in the horizontal alignment mode or the vertical alignment mode, it is preferable that an alignment azimuth of the liquid crystal molecules near the alignment film arranged on one substrate is substantially perpendicular to an alignment azimuth of the liquid crystal molecules near the alignment film arranged on the other substrate when the pair of opposed substrates are viewed in plane. According to this, the viewing angle can be improved in the liquid crystal display device of the present invention. The VAIN (Vertical Alignment Twisted Nematic) mode is a mode in which the liquid crystal molecules are vertically aligned and form a twist structure by using vertical alignment films whose alignment treatment directions are perpendicular to each other on the substrates. It is preferable that the alignment azimuths of the liquid crystal molecules near the alignment film surface are the same as the alignment control azimuths (alignment control direction) on the alignment film surfaces.

The liquid crystal display device may or may not contain other components as long as it essentially includes such components. The configuration of the liquid crystal display device of the present invention is not especially limited. For example, a part or the entire dark line may be covered with a shielding body (shielding member) such as a BM. A part of the dark line may be covered with the shielding member as long as the position and the width of the dark line in the part not covered with the shielding body are continuously connected. In the case where the dark line is perfectly shielded with the shielding body in each pixel of the liquid crystal display device, the same operation and effects as in the liquid crystal display device of the present invention can be exhibited if the position and the width of the shielding body are continuously and smoothly connected. Thus, the liquid crystal display device of the present invention may be a liquid crystal display device including a pair of opposed substrates, a liquid crystal layer formed between the pair of opposed substrates, and an alignment film arranged on a liquid crystal layer side surface of at least one of the pair of opposed substrates, and the liquid crystal display device having two or more regions which differ in alignment azimuth in a pixel, wherein the shielding body is arranged between the two or more regions which differ in alignment azimuth, and a position and a width of the shielding body are continuously changed between adjacent two pixels. If the dark line is perfectly shielded with the shielding body, it is preferable that the shielding body has a width larger than a width of the dark line in order for the dark line not to be across the display region (pixel opening). The preferable embodiments in the above-mentioned liquid crystal display device of the present invention can be appropriately applied to such a shielding body-including liquid crystal display device according to the present invention.

Effect of the Invention

According to the production method of the liquid crystal display device of the present invention, generation of the joint line on the display screen is suppressed and the yield can be improved even if the substrate is subjected to the alignment treatment by completing the exposure for the substrate through several exposures in a liquid crystal display device including pixels each having two or more domains. Accordingly, even a large liquid crystal display device in 60-inch model can be stably produced, and the exposure device can be downsized. According to the liquid crystal display device of the present invention, the position and the width of the dark line are continuously changed. Therefore, generation of the joint line on the display screen can be suppressed.

BEST MODES FOR CARRYING OUT THE INVENTION

The present invention is mentioned in more detail below with reference to Embodiments using drawings, but not limited to only these Embodiments.

Embodiment 1

With regard to a liquid crystal display device in accordance with Embodiment 1 of the present invention, 1. Configuration of liquid crystal display device, 2. Exposure method, 3. Screen joint shot process, 4. Photomask pattern, and 5. Verification test for sample panel are mentioned below.

1. Configuration of Liquid Crystal Display Device

The configuration of the liquid crystal display device in accordance with Embodiment 1 of the present invention is mentioned, first. The liquid crystal mode of the liquid crystal display device in accordance with the present Embodiment is in four-domain VATN mode.

FIG. 2(*a*) is a cross-sectional view showing a configuration of one pixel in the liquid crystal display device in accordance with Embodiment 1. As shown in FIG. 2(a), a liquid crystal display device 101 includes a pair of opposed substrates, i.e., the first substrate 1 (for example, a TFT array substrate) and the second substrate 2 (for example, a CF substrate), and a liquid crystal layer 3 disposed between the first substrate 1 and the second substrate 2. On the liquid crystal layer 3 side surface of the first substrate 1, a transparent electrode 4a for applying a driving voltage to the liquid crystal layer 3 and a vertical alignment film 5a on the transparent electrode 4a are formed. Similarly, also on the liquid crystal layer 3 side surface of the second substrate 2, a transparent electrode 4b for applying a driving voltage to the liquid crystal layer 3 and a vertical alignment film 5b on the transparent electrode 4b are formed. Further, on each of the first substrate 1 and the second substrate 2, a retarder 25 and a polarizer 24 are formed in this order from the substrate side. The retarder 25 may not be arranged, but preferably, it is arranged in order to improve the viewing angle of the liquid crystal display device. The retarder 25 may be arranged on only one substrate. Thus, the liquid crystal display device 101 includes a so-called liquid crystal display panel. In the present Embodiment, the polarizer on the first substrate 1 side is referred to as a lower polarizer 24b and the polarizer on the second substrate 2 side is referred to as an upper polarizer 24a. The liquid crystal layer 3 includes a nematic liquid crystal material with negative dielectric anisotropy (negative nematic liquid crystal material). The liquid crystal layer 3 is arranged between a vertical alignment film 5a formed on the liquid crystal layer 3 side surface of the first substrate 1 and a vertical alignment film 5b formed on the liquid crystal layer 3 side surface of the second substrate 2. Liquid crystal molecules 3a in the liquid crystal layer 3 are aligned substantially vertically to the surfaces of the vertical alignment films 5a and 5b when no driving voltage is applied to the liquid crystal layer 3 (during non-voltage application). In fact, the liquid crystal molecules 3a are aligned to be slightly tilted at about a several angle (pretilt angle) of 0.1° to the surfaces of the vertical alignment films 5a and 5b. When a driving voltage is applied in the direction vertical to the liquid crystal layer 3 surface and the driving voltage is increased to a threshold or more, the liquid crystal molecules 3a are tilted in a certain direction in accordance with this predetermined pretilt angle. When a sufficient driving voltage is applied, the liquid crystal molecules 3a in the liquid crystal layer 3 are aligned substantially parallel to the surfaces of the first substrate 1 and the second substrate 2. The direction toward which the liquid crystal molecules 3a are tilted is determined by the alignment control direction (alignment azimuth) on the vertical alignment film 5a surface on the first substrate 1 and the alignment control direction (alignment azimuth) on the vertical alignment film 5b surface on the second substrate 2. In the liquid crystal display device 101 in accordance with the present Embodiment, the alignment azimuths on the surfaces of these vertical alignment films 5a and 5b can be determined by subjecting only a desired part in each pixel to UV treatment from a direction oblique to the substrate surface using a photomask having a transmissive part which is designed to correspond to the pixel size and the pixel pitch.

FIG. 2(b) is a top view schematically showing the followings in one pixel: directions of the UV irradiation treatment provided for the vertical alignment film surfaces formed on the surfaces of the TFT array substrate that is the first substrate and the CF substrate that is the second substrate; a pretilt angle direction toward which the liquid crystal molecules on the alignment surfaces are finally tilted and an alignment azimuth of the liquid crystal molecules when a voltage not lower than a threshold is applied; a polarization axis direction P of the upper polarizer 24a; and a polarization axis direction Q of the lower polarizer 24b. In FIG. 2(b), the liquid crystal molecule 3a particularly represents a tilt azimuth of a liquid crystal molecule near the middle layer (near the center of the cell) in the liquid crystal layer 3. The dotted arrow shows the direction of the UV irradiation provided for the TFT array substrate that is the first substrate. The solid arrow shows the direction of the UV irradiation provided for the CF substrate that is the second substrate. In FIG. 2(b), the pixel 6 is divided into eight regions, but the liquid crystal molecules are aligned in four alignment azimuths. Therefore, the liquid crystal display device in the present Embodiment is a four-domain liquid crystal display device. As shown in FIG. 2(b), according to the liquid crystal display device 101 in the present Embodiment, the liquid crystal molecules 3a are twist-aligned at 90 degrees during voltage application, and they are aligned in different tilt directions (specifically, the tilt angles are different by substantially 90°) in accordance with the four domains. That is, the liquid crystal display device 101 in the present Embodiment has a four-domain VATN mode as a liquid crystal mode. The liquid crystal display device 101 in the present Embodiment includes orthogonal polarizers in which the polarization axis direction P of the upper polarizer and the polarization axis direction Q of the lower polarizer are perpendicular to each other when the substrates are viewed in plane. Accordingly, when a voltage is applied, light incident from the lower polarizer 24b is polarized in the polarization axis direction P and then rotated by 90° along the twist of the liquid crystal molecules 3a in the liquid crystal layer 3, and then turned into polarization light in the polarization axis direction Q to be emitted from the upper polarizer 24a. In the present description, the polarization axis means an absorption axis. The polarization axis direction P of the upper polarizer 24a and the polarization axis direction Q of the lower polarizer 24b are not especially limited to the above-mentioned directions, and may be appropriately determined. It is preferable that when the substrates are viewed in plane, an angle made by the polarization axis direction P of the upper polarizer 24 and the polarization axis direction Q of the lower polarizer 24b is 90°. That is, it is preferable that the Cross-Nicol relationship is satisfied.

In the liquid crystal display device 101 in the present Embodiment, the tilt angles of the liquid crystal molecules 3a in the respective domains make a substantially 90° with each other if the substrates are viewed in plane when a voltage is applied, as mentioned above. Accordingly, at the boundary between different domains, the liquid crystal molecules 3a are aligned in such a way that the liquid crystal molecules 3a tilted in different directions are continuously connected, that is, the substantially 90° is bisected. As shown in FIG. 2(b), the direction toward which the liquid crystal molecules 3a near the middle layer of the liquid crystal layer 3 is different from the polarization axis direction P of the upper polarizer 24a and the polarization axis direction Q of the lower polarizer 24b by substantially 45°. As a result, the alignment azimuth of the liquid crystal molecules at the boundary between different domains is substantially the same as or substantially perpendicular to the polarization axis direction P of the upper polarizer 24a or the polarization axis direction Q of the lower polarizer 24b. Accordingly, at the boundary between different domains, the retardation attributed to the liquid crystal molecules 3a is not provided for the polarized light. That is, after transmitting the lower polarizer 24b, the polarized light is not influenced by the liquid crystal layer 3. Therefore, the polarized light which has transmitted the lower polarizer 24b can not transmit the upper polarizer 24a. Therefore, a dark line with a low luminance is generated at the boundary between different domains.

The four-domain VATN mode has an advantage in terms of the alignment division that the number of the device and the time taken for the alignment treatment (tact time) can be reduced because two irradiations are performed for one side of each substrate, that is, totally, four irradiations are performed for the substrates, thereby forming four domains where the liquid crystal molecules 3a are aligned in different azimuths in the pixel. To divide the pixel into four domains is a preferable embodiment in order to improve the viewing angle of the liquid crystal display device. If the pixel is divided into two domains, the viewing angle in either one of the vertical or horizontal directions can be improved, but the viewing angle characteristics in the other direction can not be improved. However, if the pixel is divided into four domains, the viewing angle in both of the vertical and horizontal directions can be improved. Simultaneously, the viewing angle characteristics in both directions can be uniform. That is, the viewing angle characteristics excellent in symmetry can be obtained. Therefore, a liquid crystal display device free from the viewing angle dependence can be produced. Five or more domains may be formed, which is not preferable because the processes become complicated and the treatment time becomes longer. Further, it has been known that the viewing angle characteristics are not so different practically between four domains and five or more domains.

According to the present Embodiment, the vertical alignment liquid crystal display device is mentioned. However, the present Embodiment may be similarly applied to a horizontal alignment liquid crystal display device. In a horizontal alignment liquid crystal display device, the liquid crystal layer 3 includes a nematic liquid crystal material with positive dielectric anisotropy (positive nematic liquid crystal material). Further, the liquid crystal layer 3 is arranged between a horizontal alignment film 7a formed on the liquid crystal layer 3 side of the first substrate 1 and a horizontal alignment film 7b formed on the liquid crystal layer 3 side of the second substrate 2, instead of the vertical alignment films 5a and 5b shown in FIG. 2(a).

2. Exposure Method

An exposure method used when the four-domain VATN liquid crystal display device in the present Embodiment is produced is mentioned with reference to FIGS. 3 and 4. First, a photomask 200a is aligned and fixed at a desired position of the TFT array substrate by scanning an alignment marker formed on the substrate. The photomask includes transmissive parts and shielding parts formed in a stripe pattern. Each width of the transmissive part and the shielding part is half the pixel pitch. There is a distance (proximity gap 8) between the photomask 200a and the TFT array substrate 1, as shown in FIG. 4(d). This distance is formed to prevent a photomask from sagging under its own weight and contacting the substrate surface when the photomask is large. As shown in FIGS. 3(a) and 4(a), the substrate is irradiated with polarized UV from an oblique direction along the direction A. Hereinafter, this irradiation is referred to as A shot. FIG. 4(c) is a perspective view schematically showing an oblique irradiation direction of polarized UV 9. On the TFT array substrate and the CF substrate, as shown in FIG. 4(d), an alignment film material (photo alignment film material) which reacts with the polarized UV, thereby tilting liquid crystal molecules 3a near the alignment films (not shown) at a pretilt angle 10 in the UV irradiation direction is arranged. After the A shot, as shown in FIG. 4(a), for example, the photomask 200a is parallel-moved in the x direction by a ½ pitch of the pixel pitch Px. Then, the substrate is irradiated with polarized UV along the B direction. Hereinafter, this irradiation is referred to as B shot. Then, as shown in FIGS. 3(b) and 4(b), a photomask 200b for the CF substrate is similarly aligned and the A shot is provided for the substrate. After the A shot, for example, the photomask 200b is parallel-moved in the y direction perpendicular to the x direction by a ¼ pitch of the pixel pitch Py. Then, the B shot is provided for the substrate. Then, the cell is prepared in common procedures and then the liquid crystal material is injected to complete the panel. Then, as shown in FIG. 2(b), a four-domain liquid crystal display panel in which the liquid crystal molecules are aligned in four alignment azimuths when a voltage not lower than a threshold is applied, can be produced. Finally, module-producing steps including a driver-loading step, a back light-fixing step, and the like are performed to complete the liquid crystal display device in the present Embodiment.

According to the present Embodiment, when the exposure is performed to divide the pixel into four domains, the photomask 200a in which a stripe pattern having a ½ pitch of the pixel pitch in the x direction is formed is used to expose the TFT array substrate and the photomask 200b in which a stripe pattern having a ¼ pitch of the pixel pitch in the y direction is used for the CF substrate. However, the patterns are not limited thereto and may be appropriately determined depending on the layout or size of the pixel, resolution of the panel, and the like. Further, in the present Embodiment, the four domains are arranged in a matrix pattern, but the pattern is not especially limited. The four domains may be arranged in a stripe pattern such as a horizontal stripe pattern, and others. It is preferable that each boundary between the domains is arranged in the direction substantially parallel to the boundary between the pixels, as in the present Embodiment.

Materials usable in the present Embodiment and conditions of production processes applicable for the present Embodiment are mentioned below. The materials and the conditions usable in the present Embodiment are not especially limited to those mentioned below. In the present Embodiment, polarized light may not necessarily be used, and non-polarized light (extinction ratio=1:1) may be used. It may be appropriately determined depending on the material for the alignment film, production processes, and the like.

Liquid crystal material: $\Delta n$(birefringence)=0.06 to 0.14, $\Delta \in$ (dielectric anisotropy)=−2.0 to −8.0, Tni (nematic-anisotropic phase transition temperature)=60 to 110°

Pretilt angle: 85 to 89.9°

Cell thickness: 2 to 5 μm

Irradiation amount: 0.01 to 5 J/cm$^2$

Proximity gap: 10 to 250 μm

Light source: a low pressure mercury lamp, a high pressure mercury lamp, a heavy hydrogen lamp, a metal halide lamp, an argon resonance lamp, a xenon lamp, an excimer laser.

Extinction ratio of polarized UV (polarization degree): 1:1 to 60:1

Direction of UV irradiation: a direction at 0 to 60° relative to the normal direction of the substrate surface 3. Screen Joint Shot Process The method of dividing the pixel into four domains is mentioned above. If the substrate is small, as shown in FIG. 4, the exposure treatment is completed after two irradiations (the A and B shots) for the TFT array substrate and two irradiations (the A and B shots) for the CF substrate, i.e., totally, four irradiations. However, if the substrate is large, for example, if a substrate is used in a current large liquid crystal TV in 60 or larger-inch model, the entire region of such a large substrate can not be exposed in one shot. Accordingly, in such a case, a process of completing the exposure for the substrate in several shots (divisional shot process, screen joint shot process) is essentially needed. The screen joint shot process is mentioned with reference to FIG. 1 that is a conceptual view showing the screen joint shot process in the present Embodiment.

As shown in the left figure of FIG. 1(a), the left side of the alignment film 5 on a large substrate 13 that is the first or second substrate is irradiated with polarized UV 9 twice (the A shot and the B shot). Hereinafter, these shots are referred to as the 1st shot. Successively, as shown in the right figure of FIG. 1(a), the substrate, or the light source and the photomask is/are parallel-moved, and the alignment is fixed. Then, the right side of the alignment film 5 on the large substrate 13 is irradiated with the polarized UV 9 twice (the A and B shots). Hereinafter, these shots are referred to as the 2nd shot. At this time, only a specific region near the screen joint part of the large substrate 13 is redundantly exposed (overlapping exposure) using the photomask 200. That is, as shown in FIG. 1(b), the large substrate 13 is exposed twice in the region where the exposure is redundantly performed (overlapping region 11). The photomask 200 basically has a stripe pattern for dividing each pixel into four domains, for example, a pattern including transmissive parts S and shielding parts L each having a width of ½ or ¼ of the pixel pitch, as shown in FIG. 4. As shown in FIG. 1(c), the photomask 200 has a halftone part 12 in the overlapping region 11. In this halftone part 12, the transmissive part (S) in a stripe pattern has a specific halftone pattern (graduation pattern), and an aperture ratio of the transmissive part (S) is gradually changed. The way of forming the halftone pattern is mentioned below in more detail. It is preferable that the halftone pattern is formed as smoothly as possible, so as not to generate a discontinuous step.

In the present Embodiment, using the photomask 200 having the halftone part, the screen joint shot process in which the overlapping exposure is performed is performed. If the screen joint shot is performed using the photomask without the halftone part, the boundary of the joint (joint line) is clearly observed regardless whether or not the overlapping exposure is performed. The reason of this is mentioned below. It is impossible to irradiate the regions in the vertical direction or the regions in the horizontal direction, which are exposed in different shots under completely the same conditions even if the accuracy of the device, the photomask, the alignment, and the like is minimized as much as possible. Further, even if the difference in the irradiation conditions between the regions exposed in different shots is small, the discontinuous conditions are adjacent between the regions exposed in different shots. If the center part and the peripheral part in the same exposure region are exposed under different irradiation conditions, this difference is often continuously changed in the same exposure region, and therefore the joint line is hardly observed. Thus, the main object of the present invention is to provide a production method of a liquid crystal display device and a liquid crystal display device, in which generation of the joint line, as the main problem in the screen joint shot, is effectively suppressed.

FIG. 1 shows the case where two shots, i.e., the 1st and 2nd shots, are performed for each substrate. However, the number of times of the screen joint shot (the number of joints) is not limited to two. If the number of joints is increased, the mask, the light source, and the device can be downsized, but the joint line is increased. Therefore, the joint line becomes observed, which often results in defects. If the number of joints is suppressed to the minimum, the mask, the light source, and the device, each in a huge size, are needed. Therefore, problems such as increase in space for the device in a factory, increase in costs of the device, uneven pattern of the huge mask, are caused. Accordingly, it is preferable that the number of joints is appropriately determined depending on the size of the substrate, the layout of the factory, and the like. Table 1 shows a difference between the above-mentioned shots performed for dividing the pixel into four domains (the A and B shots) and the screen joint shot (the respective shots such as the 1st shot and the 2nd shot).

TABLE 1

|  | Each screen joint shot (1st, 2nd, . . . ) | |
| --- | --- | --- |
| TFT array substrate | A shot | B shot |
| CF substrate | A shot | B shot |

The present Embodiment essentially needs the screen joint shot process because, as shown in FIG. 5, a region 14 (thick line part) exposed in one shot is smaller than the contour of the large substrate 13 (narrow line part). The number of times of the exposure for the TFT array substrate is totally four, because two shots, i.e., the A and B shot, are performed in each of the 1st shot and the 2nd shot to divide each pixel into four domains. Similarly in the CF substrate, the number of times of the exposure is totally four because two shots, i.e., the A and B shots, are performed in each of the 1st shot and the 2nd shot to divide each pixel into four domains. Accordingly, the total number of times of the exposure for one panel is eight.

The photomask 200 used in the present Embodiment is slightly larger than the half of the substrate, and it has halftone parts 12 on opposed two regions on the both sides, respectively, as shown in FIG. 6. FIG. 6(a) is a top view schematically showing the 1st and 2nd shots for the TFT array substrate 1 and an enlarged schematic view showing a pattern of the halftone part 12. FIG. 6(b) is a top view schematically showing the 1st and 2nd shots for the CF substrate 2 and an enlarged schematic view showing a pattern of the halftone part 12. As shown in FIG. 6, if the screen joint shot process is performed, a liquid crystal display device in which the joint line is not observed can be produced. In this case, only one of the two halftone parts 12 formed in the photomask 200 is arranged near the joint line and the other one is arranged outside the substrate. The aperture ratio of the halftone part 12 is changed in a linear pattern in every three pixels (every RGB unit). With regard to the pattern of the halftone part 12, a pattern in which the width of the slit pattern is gradually decreased toward the end of the photomask is used for the TFT array substrate 1 and the CF substrate 2, as shown in the enlarged schematic views in FIG. 6. Further, as shown in FIG. 7, if the screen joint shot is performed using a photomask 200 which is half the substrate and has no halftone part, the center line of the substrate is clearly observed as the joint line regardless of whether or not the overlapping exposure is performed. Thus, it is found that the overlapping exposure needs to be performed using the photomask having the halftone part in the screen joint shot process.

4. Photomask Pattern

A preferable way of forming the pattern of the halftone part in the photomask is mentioned in more detail below with reference to FIGS. 8 to 10 and 27. FIG. 8 shows a photomask pattern without the halftone part, which is used when the substrate is not redundantly exposed. FIG. 9 shows a photomask pattern with the halftone part, which is used when the substrate is redundantly exposed. FIG. 10 shows another photomask pattern with the halftone part, which is used when the substrate is redundantly exposed. FIG. 27 shows another pattern with the halftone part, which is used when the substrate is redundantly exposed. The photomasks having the patterns shown in FIGS. 9, 10, and 27 are those of the present invention. The photomask having the pattern in FIG. 8 is a comparative photomask in which the joint line will be observed.

First, the case where the substrate is not redundantly exposed using the photomask without the halftone part is mentioned with reference to FIG. 8. FIG. 8(*a*) shows patterns of the respective photomasks and the arrangement thereof. FIG. 8(*b*) shows a region to be exposed when the exposure is performed using the photomasks shown in FIG. 8(*a*). FIG. 8(*a*) shows an arrangement of the photomasks when they are accurately positioned without misalignment. The upper two lines show the A shot (A in the drawings) and the B shot (B in the drawings) in the 1st shot (the 1st in the drawings). The lower two lines show the A shot (A in the drawings) and the B shot (B in the drawings) in the 2nd shot (the 2nd in the drawings). In FIG. 8(*b*), the upper line shows a region which is actually exposed when the photomasks are accurately positioned. The upper two lines in this upper line shows an exposure region in the A shot and an exposure region in the B shot in the 1st shot. The lower two lines in this upper line shows an exposure region in the A shot and an exposure region in the B shot in the 2nd shot. The exposure region in the A shot is shown with an oblique line and the exposure region in the B shot is shown with a lattice pattern. Thus, if the photomasks are accurately positioned and the exposure for the right and the exposure for the left are identically performed under the same conditions, the position and the width at the boundary between the A shot and the B shot, that is, the position and the width of the dark line, are completely the same between the right and left region of the joint line and therefore, the joint line is not observed. However, it is impossible to irradiate the right and left regions of the joint line under completely the same conditions, in fact. Therefore, if these photomasks are used, the joint line is observed.

The case where the photomasks in FIG. 8 are misaligned is mentioned. According to the alignment accuracy of the device, misalignment within ±several micrometers is inevitable when a large substrate and a large mask are used. The lower line in FIG. 8(*b*) shows exposure regions when the photomasks are misaligned. The arrow shows a position where the dark line is generated. Specifically, the lower line in FIG. 8(*b*) shows a case where the photomask is misaligned to the right by about 5 µm in the 1st shot, and the photomask is misaligned to the left by about 5 µm in the 2nd shot, for example. The dark line generated in the vertical direction in one pixel is generated at the boundary between the A shot and the B shot. Therefore, the position of the dark line is shifted to the right by about 5 µm on the left side of the joint line and the position of the dark line is shifted to the left by about 5 µm on the right side of the joint line. As a result, the position of the dark line is rapidly changed between the right and left sides of the joint line. Therefore, particularly if the screen is observed from an oblique direction, a difference in luminance is clearly observed between the right and left sides of the joint, and the joint line is observed. The reason why the difference in luminance between the right and left sides of the joint line is generated is mentioned below. The present inventors found that it is because an area ratio of the four domains in one pixel is different between the right and left sides of the joint line. As the reason why the joint line is observed, other reasons may be mentioned in addition to the misalignment of the photomask. The present inventors found that this misalignment due to error of the alignment accuracy is the main reason. Therefore, the main object of the present inventors is to design a photomask pattern which can connect the position and the width of the dark line continuously and smoothly between the right and left sides of the joint line even if the photomask is misaligned.

FIG. 9 shows a photomask pattern which the present inventors though as a preferable one after repeated trial and error. This photomask has a halftone part shown in FIG. 9 in the overlapping region near the joint line. In the halftone part, the transmissive parts S are arranged in descending order of the widths toward the end of the photomask. The aperture ratio in each transmissive part is shown above the each line, in FIG. 9(*a*). In this halftone part, the transmissive parts S include a transmissive part having a shape which is axial symmetry to a center line which bisects a width of a transmissive part-arranged region is arranged. Further, according to this halftone part, the transmissive parts S are arranged with a substantially uniform distance between adjacent two of them. Further, the aperture ratio in the transmissive part is changed at a rate as small as possible also between the values shown in FIG. 9. The aperture ratio is changed in accordance with a linear function. In the halftone part, the width of the transmissive part S is decreased by 1 µm from the right and left sides, i.e., totally 2 µm. The aperture ratio in the transmissive part S in the halftone part is continuously changed up to 0% (perfect shielding). The reason why the width of the transmissive part S is decreased by about 1 µm from each end is because the minimum lithography line width of the photomask is substantially 1 µm, generally. The reason why it was expected that to change the aperture ratio in the transmissive part S would be effective for eliminating the joint line is mentioned below. Similarly in the lower line in FIG. 8(*b*), the lower line in FIG. 9(*b*) shows a case where in the exposures, the photomask is misaligned to the right by about 5 µm in the 1st shot, and the photomask is misaligned to the left by about 5 µm in the 2nd shot. The actually exposed region in the A shot is shown with an oblique line and that in the B shot is shown with a lattice pattern. In this case, the position of the dark line in the most left pixel is shifted to the right by about 5 µm and the position of the dark line in the most right pixel is shifted to the left by about 5 µm. If the pixels are observed from left to right, the region which is exposed in the B shot in the 2nd shot becomes closer to the dark line (generated at the boundary between the A shot and the B shot in the 1st shot) gradually. Further, in the fourth pixel from the left in FIG. 9(*b*), the left end of the region which is exposed in the B shot in the 2nd shot just correspond to the dark line (generated at the boundary between the A shot and the B shot in the 1st shot). Further, if the pixels are further observed in the right direction, the left end of the region which is exposed in the B shot in the 2nd shot is across the boundary between the A shot and the B shot in the 1st shot. On the right side of the center in the overlapping region, the exposure region exceeds to the left by about 5 µm. The present inventors found after various investigations that if the photo alignment film is irradiated in opposed two directions, the direction of the latter irradiation is given priority, and therefore the liquid crystal molecules are aligned in the latter irradiation direction. Accordingly, in the right direction of the center of the overlapping region, the 2nd shot is given priority and therefore, the dark line generated in the vertical direction in the pixel is generated at the boundary between the A shot and the B shot. Therefore, it can be expected from FIG. 9(*b*) that the position of the dark line generated in the vertical direction is shifted to the left by about 5 µm. As a result, in the pixels from the most left to the fourth from the left, the position of the dark line is shifted to the right by about 5 µm. In the pixels from the sixth from the left to the most right, the position of the dark line is shifted to the left by about 5 µm. In the fifth pixel from the left, the dark line is generated at the boundary between the A shot and the B shot in the 2nd shot, and the position of the dark line is shifted to the left. However, the width of the transmissive part S in the 2nd shot is decreased, and therefore the shift of the position of the dark line is not as large as 5 μm. Accordingly, the screen joint shot is performed using the photomask shown in FIG. 9, and thereby the position of the dark line can be continuously connected between the right and left sides of the joint line.

FIG. 10 shows another photomask pattern which is expected to be a preferable one. This photomask also has a halftone part in the overlapping region near the joint line, as shown in FIG. 10. However, in the halftone part of the photomask for the 1st shot, the transmissive part S is divided from the center to both sides, that is, it is divided into two having an equal width from the center of the transmissive part-arranged region to the right and left sides, and the width of the transmissive part S is gradually decreased. As a result, as in the photomask in FIG. 9, the position of the dark line can be continuously connected between the right and left sides of the joint line. Further, if the overlapping exposure region (the region to be exposed twice) is more reduced (the region which corresponds to the maximum difference of the position between the 1st and 2nd shots is exposed twice), the maximum irradiation amount can be reduced. The maximum irradiation amount is the maximum total value of the aperture ratio in the transmissive part in the photomask for the 1st shot and the aperture ratio in the transmissive part in the photomask for the 2nd shot corresponding to the transmissive part in the photomask for the 1st shot. Specifically, according to the photomask shown in FIG. 10, in the pixels from the fourth to the seventh from the left, a total aperture ratio in the transmissive part of the photomask in the 1st shot and in the transmissive part of the photomask in the 2nd shot is 140% in each pixel. According to the photomask shown in FIG. 10, the maximum irradiation amount can be reduced to 140%. Similarly in FIG. 9, the aperture ratio in each transmissive part is shown above the each line, in FIG. 10(*a*). Further, the aperture ratio in the transmissive part is changed at a rate as small as possible also between the values shown in FIG. 10. The aperture ratio is changed in accordance with a linear function. In the halftone part of the photomask used for the 1st shot, the width of the transmissive part S is gradually decreased toward the end of the photomask by 1 μm that is the minimum lithography line from the center to the right and left sides, i.e., totally 2 μm. The aperture ratio in the transmissive part S in the halftone part is continuously changed up to 0% (perfect shielding). That is, in the halftone part of the photomask in the 1st shot, each transmissive part S is divided from the center of the transmissive part-arranged region to the right and left sides, and the width of the divided transmissive part is gradually decreased toward the end of the photomask by 1 μm from the center side of the transmissive part-arranged region. In the halftone part of the photomask in the 2nd shot, the width of the transmissive part S is gradually decreased toward the end of the photomask by 1 μm from the right and left ends, similarly in FIG. 9.

FIG. 27 shows another photomask pattern which is expected to be a preferable one. As shown in FIG. 27, this photomask has a pattern in which the length of the transmissive part is gradually decreased in the region at the end of the halftone part, in addition to the same pattern as in FIG. 10. According to this, the aperture ratio at the end of the halftone part can be more smoothly changed. Therefore, similarly to the photomasks in FIGS. 9 and 10, the position of the dark line can be more continuously connected between the right and left sides of the joint line. Near the end of the halftone part, the overlapping exposure region (the region to be exposed twice) can be further reduced. Similarly to FIGS. 9 and 10, the aperture ratio in each transmissive part is shown above the each line, in FIG. 27(*a*). Further, the aperture ratio in the transmissive part is changed at a rate as small as possible also between the values shown in FIG. 27. The aperture ratio is changed in accordance with a linear function in the region where the length of the transmissive part is not decreased, and the aperture ratio is changed by ½ times in accordance with an exponential function in the region where the length of the transmissive part is decreased. In the region where the length of the transmissive part is decreased, the length of the transmissive part may be changed in accordance with a trigonometric function. The halftone pattern in the region where the length of the transmissive part is not decreased is formed in the same manner as in the photomask in FIG. 10.

The aperture ratio in the transmissive part in the halftone part of the photomask in FIGS. 9 and 10 may be changed in accordance with a trigonometric function. According to this, the differential coefficient of change in the aperture ratio at both ends of the halftone part can be substantially zero, and the position of the dark line can be more smoothly connected in comparison to the linear function. As a result, defects attributed to that the joint line is observed can be more suppressed from being observed. The used trigonometric function is not especially limited, but, for example, the formulae (1) to (4) mentioned in Embodiment 2 are preferable.

5. Verification Experiment of Sample Panel

Then, a panel is actually produced as a sample using the photomasks having the patterns shown in FIG. 9 and subjected to a verification experiment. The results are shown below. FIGS. 14(*a*) and 15(*a*) are top views schematically showing appearances of photomasks 300, 301, 302, and 303 used in this verification experiment. FIG. 14(*a*) shows photomasks 300 and 301 for the TFT array substrate. FIG. 15(*a*) shows photomasks 302 and 303 for the CF substrate. In this verification experiment, a substrate in 7-inch model is subjected to an experiment for the screen joint shot. As shown in FIGS. 14(*a*) and 15(*a*), the left side of the substrate is exposed in the 1st shot and the right side of the substrate is exposed in the 2nd shot. The upper line (LINE_A) is a mask part having an overlapping region 11 and a halftone part 12 in accordance with the present Embodiment. The lower line (LINE_B) is a comparative mask part having neither the overlapping region 11 nor the halftone part 12. In the region other than the shielding region 21, the stripe pattern for dividing the pixel into four domains, as shown in FIG. 4, is basically formed. The masks for exposing the TFT array substrate 300 and 301 each include transmissive parts S and shielding parts L which are formed in a vertical strip pattern. Each of the transmissive parts S and the shielding parts L has a ½ width of the pixel pitch. The masks for exposing the CF substrate 302 and 303 each include transmissive parts S and shielding parts L which are formed in a horizontal strip pattern. Each of the transmissive parts S and the shielding parts L has a ¼ width of the pixel pitch. In the halftone part 12 of the photomasks 300 and 301, the transmissive part S in the vertical direction does not have a ½ width of the pixel pitch, and the halftone (graduation) is formed, in accordance with the pattern shown in FIG. 9, i.e., by gradually decreasing the width of the transmissive part S. In the halftone part of the photomasks 302 and 303, the transmissive part S in the horizontal direction does not have a ¼ width of the pixel pitch and the halftone (graduation) is formed, in accordance with the pattern shown in FIG. 6(*b*), by gradually decreasing the width of the transmissive part S. Each pixel in the panel in 7-inch model used in this verification experiment has a length of 362.5 μm and a width of 107

μm. In the transmissive part S in the halftone part of the photomasks 300 and 301, as shown in FIGS. 14(b) and 15(b), the aperture ratio is the same in every three pixels (unit of RGB), that is, within a 321 μm pitch. That is, the aperture ratio of the transmissive part S is changed in every three pixels (one unit of RGB). In the halftone part, the shielding parts S are lithographed in such a way that the width of the shielding part S is decreased from the both sides by 1.07 μm that is the minimum grid width. If the shielding parts S are lithographed in such a manner, as a result, the aperture ratio in the shielding part S in the half tone part can be changed by 2%. In this verification experiment, the aperture ratio in the shielding part S in the halftone part of the photomasks 300 and 301 is changed in accordance with a linear function. As a result, the aperture ratio can be changed very smoothly. In the transmissive part S in the halftone part of the photomasks 302 and 303, the aperture ratio is the same in every pixel unit, that is, within a 362.5 μm pitch. That is, the aperture ratio of the transmissive part S is changed in every three pixels (one unit of RGB). In the halftone part, the shielding parts S are formed in such a way that the width of the shielding part S is decreased from the both sides by 1.8215 μm that is the minimum grid width. If the shielding parts S are formed in such a manner, as a result, the aperture ratio in the shielding part S in the halftone part can be changed by 2%. In the present verification experiment, the aperture ratio in the shielding part S in the halftone part in the photomasks 302 and 303 is changed in accordance with a linear function. As a result, the aperture ratio can be changed very smoothly.

The changing rate of the aperture ratio in the light shielding part S in the halftone part is at most 2% or so, at present, in the pixel size of the 7-inch panel used in this verification experiment. The changing rate is not especially limited to 2% and may be appropriately determined. However, in order to produce the liquid crystal display device relatively inexpensively, the mask needs to be lithographed using a relatively common device as lithography equipment. In this case, the mask is lithographed by a process with accuracy lower than that in an ultra-micro machining photolithography process of a semiconductor process. Therefore, the minimum line width which can be lithographed is naturally limited. This minimum line width is substantially 1 μm, generally. It is difficult to lithograph the mask with a line width in sub-micro size and further produce the mask inexpensively. Therefore, the present inventors made various investigations on whether the joint line can be eliminated at a changing rate of 2% obtained when the line width of the mask is the minimum line width of about 1 μm, with the view of costs on the mask in mass production of the panel. FIG. 26 shows an aperture ratio in each position of the halftone part in the photomasks 300, 301, 302 and 303. In FIG. 26, the HT part shows the halftone part.

The LINE_A is a line where the halftone part in accordance with the embodiments in FIGS. 6 and 9, which the present inventors though as an optimal pattern, is formed. The LINE_B is a line arranged in order to prove that the joint line of the photomask is observed if the photomask has no halftone part shown in FIG. 8. Materials used for producing the liquid crystal display panel and conditions of the production process may be appropriately determined from those mentioned above. In this verification experiment, the following materials and the conditions are employed as a liquid crystal material, a pretilt angle, a cell thickness, and a proximity gap and a UV light source.

Liquid crystal material: MLC6609 (trade name, product of Merck Ltd., Japan.), $\Delta n=0.077$, $\Delta\varepsilon=-3.7$, $Tni=80°$ C.
Pretilt angle: 89.0°
Cell thickness: 3.5 μm
Proximity gap: 150 μm
Light source: polarized UV of a low pressure mercury lamp
The used wavelength range is 260 nm or more.
Extinction ratio of polarized UV (polarization degree): 9:1

The prepared panel was once subjected to an annealing treatment at a temperature higher than the Tni point of the liquid crystal material for 30 minutes. Then, the temperature was decreased to a normal temperature. Under this state, the panel was placed between polarizers in a Cross-Nicol state and then observed on a light table. As a result, light leakage was not observed at all, which proved that the liquid crystal molecules were aligned almost vertically to the normal line direction of the substrate. Then, a rectangular wave voltage of 30 Hz was applied to the panel, and thereby the screen during voltage application was observed. The panel and the polarizers were arranged in such away that the UV irradiation azimuth relative to the upper and lower substrates was the same as the absorption axis azimuths of the polarizers formed on the respective substrates when the panel was viewed in plane, and then the observation was performed.

FIG. 16 shows measurement results of V (applied voltage)–T (transmittance) characteristics of the panel used in this verification experiment. In FIG. 16, the vertical axis shows a transmittance (%) at each voltage relative to 100 of an intensity of transmissive light when a voltage of 7 V is applied. In this panel, the liquid crystal molecules started to rise (started to be tilted) at about 2.5 V, and thereby the transmittance started to increase. When the panel was observed at about a voltage slightly higher than 2.5 V that is a threshold, the joint line on the screen could be clearly observed in the region which was exposed through the LINE_B having no halftone part. As the voltage was increased, the liquid crystal molecules were further tilted and the transmittance was increased. As a result, bright display was obtained on the right and left sides of the joint line. At this time, the joint line was still observed in the LINE_B region. However, it was not so clearly observed in comparison to the joint line which was observed within a range of the voltages slightly higher than the threshold voltage. Then, the panel was observed when a voltage of 2.84 V was applied. The voltage of 2.84 V is within the voltage range where the joint line was most clearly observed. The voltage of 2.84 V corresponds to 96 grading value in this panel and the transmittance at 2.84 V corresponds to about 12% if white display at 7V is defined as 255 grading value. In contrast, in the region which was exposed through LINE_A (hereinafter, also referred to as "LINE_A region") having a pattern which was expected to be an optimal pattern, the joint line like that observed in the LINE_B region was not observed at all. It could be proven that, in the actually produced panel, the joint can be completely eliminated if the photo alignment films are exposed using the photomasks having the pattern in accordance with the present Embodiment.

The present inventors considered the reason why the joint line observed in the LINE_B region was generated. As a result, it is proven that the joint line is observed mainly because of a difference in alignment accuracy of the mask between the right and left sides of the joint line, although it is also caused because of the difference in the exposure conditions between the right and left sides such as irradiation amount, polarization axis direction, proximity gap, and extinction ratio. It was practically difficult to completely accurately position the mask for the 1st shot (shot for the left region) and the mask for the 2nd shot (shot for the right region). It can be expected that as the substrate becomes larger, the accuracy of the practical exposure device is reduced. Further, it was proven that the actual value (range of error) in the alignment accuracy of the mask is ±2 µm to ±6 µm or so. Further, it was proven that the joint line is observed because of the following reasons. That is, if the mask misalignment occurs on the right and left sides of the joint line, an area ratio of the four domains in the pixel becomes different. For example, as shown in FIG. 17, the case where the mask is misaligned to the right in the 1st shot and the mask is misaligned to the left in the 2nd shot for the TFT array substrate and under such a state, the substrate is irradiated, is mentioned. In such a case, the optical characteristics in the front direction are not theoretically influenced. However, if the panel is observed from an oblique direction, the four domains which differ in an area ratio (the domains L1 to L4 in the region on the left side of the joint line and the domains R1 to R4 in the region on the right side of the joint line) are averaged to be observed. Accordingly, the optical characteristics are largely different between the right and left sides of the joint line. This seems to be the main reason why the joint line is observed.

Therefore, the masks were purposely misaligned previously as shown in FIG. 17 and under such a state, the substrate was irradiated, thereby producing a panel. Specifically, as shown in FIG. 17, the mask for the 1st shot was misaligned to the right by 6 µm and the TFT substrate is irradiated. The mask for the 2nd shot was misaligned to the left by 6 µm and the TFT substrate was irradiated. In such a manner, the panel was prepared. For simplification, the mask which was used for irradiating the CF substrate was not misaligned. In this case, the A shot and the B shot in the 1st shot are shifted to the right by 6 µm. The A shot and the B shot in the 2nd shot are shifted to the left by 6 µm.

Table 2 shows the results obtained by visually observing the panel including the TFT substrate which was exposed under the state the masks were misaligned. As mentioned above, the panel was observed at 2.84 V (96 grading value) and 30 Hz. As shown in FIG. 18, the overlapping region 11, the right region of the joint line 18, which is positioned on the right side of the joint line 20, and the left region of the joint line 19, which is positioned on the left side of the joint line 20, were each observed in the upper, lower, left, right, upper left, and lower right directions. In the right region of the joint line 18, a region $R_A$ positioned in the LINE_A region and a region $R_B$ positioned in the LINE_B region were observed. In the left region of the joint line 19, a region $L_A$ positioned in the LINE_A region and a region $L_B$ positioned in the LINE_B region were observed. In the LINE_B region, the luminance was discontinuously observed between the right and left regions of the joint line when the region was observed in a direction slightly tilted from the front direction, and the joint line was clearly observed. Particularly, when the panel was observed in the upper direction, the region $L_B$ on the left side of the joint line was observed more brightly than the region $R_B$ on the right side of the joint line. When the panel was observed in the lower direction, the region $R_B$ was observed more brightly than the region $L_B$. As a result, the brightness was discontinuously connected between the regions $L_B$ and $R_B$, and the joint line was clearly observed. In contrast, in the LINE_A region which was exposed using the halftone pattern in accordance with the present Embodiment, the joint line was not observed, and the screen was smoothly connected from the left to the right or from the right to the left of the joint line. Further, when the panel was observed in the upper direction, the region $L_A$ was observed more brightly than the region $R_A$. When the panel was observed in the lower direction, the region $R_A$ was observed more brightly than the region $L_A$. However, the luminance between the regions $R_A$ and $L_A$ was continuously observed and the joint line was not observed. Between the regions $L_A$ and $L_B$, and between the regions $R_A$ and $R_B$, the luminance was not different.

TABLE 2

| | Visual observation result (particularly how the joint line was observed) |
|---|---|
| LINE_A | The joint line was not observed. The joint line was observed to be smoothly connected between the right and left sides of the joint line. When observed in the upper direction and the upper left direction, the $L_A$ region was observed to be brighter than the $R_A$ region. When observed in the lower direction and the lower right direction, the $R_A$ region was observed to be brighter than the $L_A$ region. However, the luminance was observed to be continuously connected between the $L_A$ and $R_A$ regions and the joint line was observed. |
| LINE_B | The luminance was observed to be discontinuously changed between the right and left sides of the joint line, and the joint line was clearly observed. When observed in the upper direction and the upper left direction, the $L_B$ region was observed to be brighter than the $R_B$ region. When observed in the lower direction and the lower right direction, the $R_B$ region was observed to be brighter than the $L_B$ region. The luminance was observed to be discontinuously connected between the $L_B$ and $R_B$ regions, and the joint line was clearly observed. |
| Remarks column | How the joint line was observed was not different between the LA and LB regions, and between the RA and RB regions. |

In the liquid crystal display device in accordance with the present Embodiment, even if the masks were misaligned to the opposed sides between the right and left sides of the joint line when the screen joint shot process was performed, the discontinuous luminance near the joint line on the screen could be changed into the continuous luminance by exposing the substrate using the photomask having the halftone part. As a result, the joint line could be eliminated. Thus, the present inventors could provide a production method of a liquid crystal display device and a liquid crystal display device, preferably used in the screen joint shot for a large substrate. As mentioned above, the main reason why the joint line is generated is the misalignment of the mask. Further, the joint line was not so caused by the difference in the exposure conditions between the right and left sides of the joint line, such as an irradiation amount, a polarization axis direction of UV, proximity gap, and extinction ratio. The present inventors verified that even if the exposure step was performed under the state where all of these exposure conditions other than the misalignment of the mask were different between the right and left sides of the joint line, the occurrence frequency of the joint line resulting from these differences was smaller than the occurrence frequency of the joint line resulting from the misalignment of the mask. It was also shown that even if the exposure step was performed under the state where the all of the exposure conditions other than the misalignment of the mask were different between the right and left sides of the joint line, the joint line could be completely eliminated by adopting the screen joint shot process in accordance with the present Embodiment, as in the case where the mask was misaligned.

Thus, the effects of the liquid crystal display device in accordance with the present Embodiment were visually observed, measured, and theoretically examined and verified. Finally, the elimination of the joint line in the liquid crystal display device in accordance with the present Embodiment is shown by the data on the position and width of the dark line in the pixel. FIG. 19 is a picture showing a region $L_A$ (region $L_E$) in a pixel 26 and a picture showing a region $R_A$ (region $R_B$) in a pixel 27 in the panel used in the above-mentioned verification experiment. In the region $L_A$ (region $L_B$), the mask is previously misaligned to the right and the substrate is exposed. Therefore, the dark line generated in the vertical direction is shifted to the right. In the region $R_A$ (region $R_B$), the mask is previously misaligned to the left and the substrate is exposed. Therefore, the dark line generated in the vertical line is shifted to the left. According to the present verification test, the position of the dark line is defined as a position where the minimum luminance is shown in the dark line part as shown in FIG. 20, if the BM edge on the left side in the horizontal direction (on the A1 to A2 line in FIG. 19) is defined as a starting point. That is, the distance from the BM edge on the left side in the horizontal direction (in the A1 to A2 line direction in FIG. 19) to the part where the minimum luminance is shown) is defined as the position of the dark line. The width of the dark line in this verification experiment is defined as the length between the positions where the luminance which accounts for 90% relative to the maximum luminance in the horizontal direction (on the A1 to A2 line in FIG. 19) as shown in the luminance cross-section curve in FIG. 20. The panel was placed under a polarization microscope including polarizers arranged in a Cross-Nicol state and a picture of each pixel was taken. Then, image process was provided for each of the taken images. In such a manner, the position and the width of the dark line were measured. The results are shown in FIG. 21. FIGS. 21(*a*) and 21(*b*) show the measurement results of the position and width of the dark line in A1-A2 line in FIG. 19. As seen in FIG. 21(*a*), in the LINE_B region, the position of the dark line was sharply changed between the right and left sides of the joint line, but in the LINE_A region, the position of the dark line was smoothly changed between the right and left sides of the joint line. Further, the width of the dark line was discontinuously changed near the joint line in LINE_B region, not so sharply as the position of the dark line was. However, in the LINE_A region, the width of the dark line was smoothly and continuously changed although the width was slightly increased in the center of the overlapping region.

Then, the substrate was exposed under the state where a proximity gap was previously different between the right and left sides of the joint line and thus a panel was prepared in order to further verify that the joint exposure method using the photomask in accordance with the present Embodiment is also effective when the width of the dark line is discontinuously changed between the right and left sides of the joint line. If the proximity gap is different, a dispersion degree of light which transmits the photomasks is different and as a result, the width of the dark line is different. As the proximity gap is decreased, the exposure is performed under the state where the substrate is closer to the photomasks. Therefore, the dark line has a smaller width. The conditions for the panel preparation other than the proximity gap were the same as in the verification experiment for the sample panel. Using the same photomask as in the above-mentioned verification experiment, the panel was produced and the position and the width of the dark line were measured. In this verification experiment, the TFT array substrate and the CF substrates were irradiated under the state where the photomasks were not misaligned. However, the TFT array substrate was irradiated under the following conditions: the proximity gap of 50 μm in the shot for the region $L_A$ (region $L_B$); and the proximity gap of 250 μm in the shot for the region $R_A$ (region $R_A$). As in FIG. 21, the measurement results of the position and width of the dark line are shown in FIGS. 28(*a*) and 28(*b*). As seen in FIG. 28(*b*), the width of the dark line was sharply changed between the right and left sides of the joint line, in the LINE_B region. However, in the LINE_A region, the width of the dark line was smoothly changed between the right and left sides of the joint line. Further, the position of the dark line was discontinuously changed near the joint line in LINE_B region, not so sharply as the width of the dark line was. However, in the LINE_A region, the position of the dark line was smoothly and continuously changed.

The reason why the joint line is observed is because the position and width of the dark line are discontinuously changed between the right and left sides of the joint line. However, as in the liquid crystal display device in accordance with the present Embodiment, if the overlapping exposure is performed using the photomask having an optimal half tone pattern, the position and width of the dark line can be continuously changed between the right and left sides of the joint line. As a result, a screen joint shot which is preferable as a production process capable of producing a large liquid crystal TV in which the joint line is not observed even if the screen is observed in oblique directions can be provided. Accordingly, the present invention has very large effects.

The relationship between the visual recognition of the joint line and a changing amount of the position and width of the dark line is mentioned with reference to Tables 3 and 4. Table 3 shows the maximum changing amount (maximum difference value) of the position of the dark line between adjacent two pixels and results of the visual observation, in the panel obtained in the verification experiment. Specifically, the maximum changing amount of the position of the dark line was determined by calculating an absolute value of a difference between adjacent values based on the values showing the position of the dark line shown in FIGS. 21(*a*) and 28(*a*). Table 4 shows the changing amount (maximum difference value) of the width of the dark line between adjacent two pixels and results of the visual observation, in the panel obtained in the verification experiment. Specifically, the maximum changing amount of the width of the dark line was determined by calculating an absolute value of a difference between adjacent values based on the values showing the width of the dark line shown in FIGS. 21(*b*) and 28(*b*). With regard to the position of the dark line, the maximum difference value between values showing the position of the dark line in the LINE_A region in FIG. 21(*a*) is 1.511 μm. In this case, the joint line was not observed at all. In the LINE_B region in FIG. 21(*b*), the maximum difference value of the position of the dark line is 12.95 μm. In this case, the joint line was clearly observed. In the LINE_A region in FIG. 28(*a*), the maximum difference value of the position of the dark line is 1.522 μm. In this case, the joint line was not observed at all. In the LINE_B region in FIG. 28(*b*), the maximum difference value of the position of the dark line is 4.348 μm. In this case, the joint line was hardly observed. Then, with regard to the width of the dark line, the maximum difference value of the width of the dark line in the LINE_A region in FIG. 21(*a*) is 2.158 μm. In this case, the joint line was not observed at all. In the LINE_B region in FIG. 21(*b*), the maximum difference value of the width of the dark line is 1.727 μm. In this case, the joint line was not observed at all. In the LINE_A region in FIG. 28(*a*), the maximum difference value of the width of the dark line is 2.826 μm. In this case, the joint line was not observed at all. In the LINE_B region in FIG. 28(*b*), the maximum difference value of the width of the dark line is 7.826 μm. In this case, the joint line was observed. These results show that in order for the joint line to become invisible, that is, in order to continuously change the position and width of the dark line between adjacent two pixels, it is preferable the changing amount of the position of the dark line between adjacent two pixels is less than 5 µm and the change amount of the width is 3 µm or less. Further, it is more preferable that the changing amount of the position is 2 µm or less and the changing amount of the width is 3 µm or less.

TABLE 3

|  |  | The maximum value of difference in dark line position between adjacent two pixels (µm) | Visual observation result |
|---|---|---|---|
| FIG. 21 (a) | LINE_A | 1.511 | Joint line was not observed at all |
|  | LINE_B | 12.95 | Joint line was clearly observed |
| FIG. 28 (a) | LINE_A | 1.522 | Joint line was not observed at all |
|  | LINE_B | 4.348 | Joint line was hardly observed |

TABLE 4

|  |  | The maximum value of difference in dark line width between adjacent two pixels (µm) | Visual observation result |
|---|---|---|---|
| FIG. 21 (a) | LINE_A | 2.158 | Joint line was not observed at all |
|  | LINE_B | 1.727 | Joint line was not observed at all |
| FIG. 28 (a) | LINE_A | 2.826 | Joint line was not observed at all |
|  | LINE_B | 7.826 | Joint line was observed |

The liquid crystal display device having a configuration in which the dark lines in the vertical and horizontal directions are entirely observed in the pixel is mentioned above, but the liquid crystal display device may have a configuration in which the dark lines are partly shielded by a shielding body such as a BM. In such a case, the position and width of the dark lines which are not shielded by the shielding body are continuously connected. If the dark lines in the vertical and horizontal directions are completely shielded by the shielding body such as BM in all of the pixels in the liquid crystal display device, the same operation and effects as in the liquid crystal display device in accordance with the present Embodiment can be exhibited as long as the position and the width of the shielding body are continuously and smoothly changed. If the dark lines are completely shielded by the shielding body, it is preferable that the shielding body has a width larger than the width of the dark line such that the dark line does not enter the display region (pixel opening).

Embodiment 2

A liquid crystal display device in accordance with Embodiment 2 of the present invention is mentioned below.

FIG. 22 is a schematic view showing a screen joint shot process in accordance with the present Embodiment. As shown in FIG. 22 (a), this process adopts scanning exposure in which the light source 15 and the photomask 200 are integrally moved or the substrate 16 is moved with the light source 15 and the photomask 200 being fixed. FIG. 22 (a) shows the latter case where the substrate is moved. The substrate 16 is a TFT array substrate. The photomask 200 is equipped with a camera for image detection 17 at its side. The camera scans the bus line 22 on the substrate 16, the BM, and the like, and in accordance with the scanning, the substrate 16 can be moved. This screen joint shot process has an advantage that the exposure device can be downsized; costs on the exposure device are reduced; a photomask having high accuracy can be used because a small one is sufficient. The scanning exposure is excellent in stability of the irradiation amount in the substrate plane. Therefore, a variation in characteristics of the alignment film such as an alignment azimuth and a pretilt angle can be effectively suppressed. However, the number of the portion where the screen is jointed is increased, and therefore defects caused by the recognition of the joint line are generated, resulting in a reduction in yield.

FIG. 23 is a top view schematically showing the screen joint shot process in the present Embodiment when the exposure is performed while the light source and the photomask are integrally moved with the substrate being fixed. According to the present Embodiment, the photomask 200 has an overlapping region and the overlapping region has a halftone part 12 (gradation pattern). The moving rate of the light source and the photomask may be appropriately determined, and may be 6 cm/sec, for example. The irradiation for the TFT array substrate 1 is mentioned, first. As shown in FIG. 23(a), the photomask 200 is moved to a specific position for which the 1st shot is provided. While a combination of the light source and the photomask (hereinafter, referred to as a head) is moved in the +y direction, the A shot is performed. While the head is moved, the A shot is performed up to the upper end of the TFT array substrate 1. The photomask 200 is moved in the +x direction by ½ of the pixel pitch in the x direction. Then, while the head is moved in the −y direction, the B shot is performed. Then, the head is moved in the −x direction to the position for which the 2nd shot is provided. While the head is moved in the +y direction, the A shot is performed. While the head is moved, the A shot is performed up to the upper end of the TFT array substrate 1. The photomask 200 is moved in the +x direction by ½ of the pixel pitch in the x direction. Then, while the head is moved in the −y direction, the B shot is performed. Then, a series of this scanning exposure is repeated until completion of the exposure for the entire substrate region. Also for the CF substrate 2, the exposure is performed in the same manner, as shown in FIG. 23(b). Then, the cell is prepared in common procedures and then the liquid crystal material is injected to complete the panel. As shown in FIG. 22(b), when a voltage not lower than a threshold is applied, the four-domain alignment division in which the liquid crystal molecules 3a are aligned in four azimuths can be provided. That is, if the panel is viewed in plane during voltage application, the liquid crystal molecules 3a positioned near the middle layer of the liquid crystal layer are aligned in directions at substantially 45° relative to the scanning directions A and B when the TFT array substrate 1 is exposed and the scanning directions A and B when the CF substrate 2 is exposed. According to the present Embodiment, the order of the 1st shot and the 2nd shot and the order of the A shot and the B shot are not limited to the above-mentioned order, and it may be appropriately determined. As shown in FIG. 24, if the scanning exposure is performed using the photomask having neither the overlapping region nor the halftone part, the joint line attributed to the discontinuous position and width of the dark line is observed.

A way of forming the halftone in the photomask 200 in the present Embodiment is mentioned below. The photomask 200 in the present Embodiment basically has a stripe pattern for dividing each pixel into four domains (for example, a pattern including transmissive parts S and shielding parts L each having a width of ½ or ¼ of the pixel pitch), as shown in FIG. 4. Further, the photomask 200 has a specific region as the overlapping region near the joint line. The overlapping region near the joint line includes the halftone part where a specific graduation is provided for the transmissive parts S in a stripe pattern. The aperture ratio in the transmissive part S in the halftone part is gradually changed. Accordingly, the photomask having the same pattern as in the photomask in Embodiment 1, specifically, the photomask having the pattern shown in FIG. 9, 10, or 27 may be also used in the present Embodiment. With regard to other advantages of the screen joint shot process in the present Embodiment, it is easy to control the total irradiation amount in the overlapping exposure region (the region which is exposed twice or more through a plurality of photomasks). If the total irradiation amount in the overlapping region 11 is not so increased, specifically, the length of the transmissive part S in the overlapping region 11 is gradually decreased, as shown in FIG. 25. As a result, the total irradiation amount can be easily controlled. In the overlapping region of the photomask 200 in the present Embodiment, the length y of the transmissive part may be changed in accordance with a linear function, as mentioned in Embodiment 1, but more preferably, it is changed in accordance with a trigonometric function. The employed trigonometric function is not especially limited. For example, a function which satisfies the followings: at the 1st shot, the length y of the transmissive part is 100(%) when $0 \leq x \leq \Delta x$ is satisfied and the length y of the transmissive part satisfies the following formula (1) when $\Delta x \leq x \leq 45$ is satisfied; at the 2nd shot, the length y of the transmissive part is 100(%) when $45 - \Delta x \leq x \leq 45$ is satisfied and the length y of the transmissive part satisfies the following formula when $0 \leq x \leq 45 - \Delta x$ is satisfied; and a function that is the same as the above function except that the formula (1) in the above-mentioned function is replaced with the following formula (3) and the formula (2) is replaced with the following formula (4), and the like, are preferable. As shown in FIG. 11, x represents a position (mm) of the overlapping region; $\Delta x$ represents a length (mm) of a region that is not the halftone part in the overlapping region, that is, a region where the aperture ratio is 100%. The 100% of the length y of the transmissive part means that the length y in the transmissive part is the same as the length of the transmissive part where the aperture ratio is 100%.

[Equation 1]

$$y = 100\cos^4\left(\frac{x - \Delta x}{90 - 2\Delta x}\pi\right) \quad (1)$$

[Equation 2]

$$y = 100\sin^4\left(\frac{x}{90 - 2\Delta x}\pi\right) \quad (2)$$

[Equation 3]

$$y = 100\cos^2\left(\frac{x - \Delta x}{90 - 2\Delta x}\pi\right) \quad (3)$$

[Equation 4]

$$y = 100\sin^2\left(\frac{x}{90 - 2\Delta x}\pi\right) \quad (4)$$

FIGS. 12 and 13 show calculation results of the change in the aperture ratio from the above-mentioned formulae (1) to (4). FIG. 12(a) shows results obtained when $\Delta x$ is 0 (mm) based on the formulae (1) and (2). In the overlapping region, the total irradiation amount in the region which is exposed twice in the 1st and 2nd shots can be the maximum 50%. FIG. 12(b) shows results obtained when $\Delta x$ is 0 (mm) based on the formulae (3) and (4). In the overlapping region, the total irradiation amount can be the maximum 100%. FIG. 13(a) shows results obtained when the $\Delta x$ is 11.25(mm) based on the formulae (3) and (4), and the total irradiation amount in the overlapping region can be the maximum 150%. FIG. 13(b) shows results obtained when $\Delta x$ is 22.5 (mm) based on the formulae (3) and (4). In the overlapping region, the total irradiation amount can be the maximum 200%. Thus, according to the present Embodiment, the employed trigonometric function formula and the $\Delta x$ value can be appropriately determined, and thereby a desired total irradiation amount can be obtained. In addition, the lengths y of the transmissive parts, that is, the aperture ratio in the transmissive part is changed in accordance with a trigonometric function, and thereby the differential coefficient of change in the aperture ratio between both ends of the halftone part can be substantially zero, and the position of the dark line can be more smoothly connected in comparison to the linear function. As a result, generation of defects attributed to the recognition of the joint line can be more suppressed. If the number of the joint part might be increased in the screen joint shot process in the present Embodiment, the trigonometric functions shown in FIGS. 12 and 13 are more preferably adopted as a function of the change in the aperture ratio of the photomask 200.

The reason why the joint line becomes invisible by controlling the total irradiation amount is mentioned below with reference to FIG. 29. FIG. 29 is a view showing regions which are exposed by scanning exposure using the photomasks shown in FIG. 25. Similarly to FIG. 8(b) and the like, in FIG. 29, the upper line shows a state where the exposure is performed without misaligning of the photomasks, and the lower line shows a state where the exposure is performed under the state where the photomasks are misaligned to opposed sides. The aperture ratio in each transmissive part is shown above and below the upper line. As shown in the lower line in FIG. 29, the total irradiation amount in each pixel is gradually changed, and therefore the position where the dark line is formed (the position of the arrow in FIG. 29) is also gradually changed. Accordingly, it is shown that the joint line is invisible even if the scanning exposure is performed using the photomasks shown in FIG. 25.

If the total irradiation amount in the overlapping region is not increased, a photomask shown in FIG. 30(a) is preferably used. According to the photomask shown in FIG. 30, the alignment accuracy of the photomask is ±3 μm. The pattern of the photomask is designed on the assumption that a difference between the 1st shot and the 2nd shot, caused by the misalignment, is the maximum 6 μm. The upper line in FIG. 30(b) shows that the substrate is exposed in the 1st and 2nd shots without misalignment of the photomasks. The middle line in FIG. 30(b) shows that the substrate is exposed under the state where the photomask is shifted to the right by about 6 μm in 1st shot. The lower line in FIG. 30(b) shows that the substrate is exposed under the state where the photomask is shifted to the left by about 6 μm in the 1st shot. This photomask has a halftone part shown in FIG. 30, in the overlapping region near the joint line. In the halftone part, as shown in FIG. 30(a), transmissive parts S having a step shape are formed and the transmissive parts S are arranged in descending order toward the end of the halftone part. More specifically, each of the transmissive parts positioned near the center of the halftone part has a step part having a length substantially half the length of the transmissive part. The transmissive parts S in the halftone part include a transmissive part S having a shape which is axial symmetry to the centerline which bisects the width of the transmissive part-arranged region. A transmissive part S which is divided from the center of the transmissive part-arranged region to both sides is arranged on the end side of the photomask in the halftone part. In the transmissive parts S on the end side of the photomask in the halftone part, the length of the transmissive part S gradually becomes shorter toward the end of the photomask. In the transmissive parts S on the side opposed to the end of the photomask in the halftone part, the length at the both ends of the transmissive part S gradually becomes longer toward the side opposed to the end of the photomask. Each transmissive part S which is formed by being divided from the center of the transmissive part-arranged region to both sides has a shape which is axial symmetry to the center line which bisects the width of the transmissive part S itself. More specifically, a shape formed by a plurality of quadrangles is preferable as a shape of the entire transmissive part having a step shape. Among these, as shown in FIG. 30(a), a shape formed by a plurality of quadrangles in a pyramid pattern is more preferable. The aperture ratio in the halftone part of the photomask shown in FIG. 30 is changed in accordance with the trigonometric function shown in FIG. 12(b). Further, the transmissive part is also formed between the transmissive parts S shown in FIG. 30. The aperture ratio is changed at a ratio as small as possible and thereby continuously changed. That is, the aperture ratio in the transmissive part S in the halftone part is smoothly changed in accordance with a trigonometric function such that the total aperture ratio in the transmissive part S in the overlapping region is 100%. The size of each transmissive part S in the photomasks shown in FIG. 30 is as shown in FIG. 31. In FIG. 31, the grid pitch is 6 μm. Due to use of such a photomask, as in the case where the photomask shown in FIG. 9, 10, 25, or 27 is used, the position of the dark line can be continuously changed between the right and left sides of the joint line. Further, the total irradiation amount in the overlapping region can be effectively suppressed. More specifically, the total irradiation amount in the overlapping region is 100% if the photomask is not misaligned as shown in the upper line in FIG. 30(b). In the case where the photomask is misaligned, as shown in the middle and lower lines in FIG. 30(b), if the mask is misaligned by a distance smaller than the width of the step part formed on the both sides of the transmissive part S (the photomask in FIG. 30 is misaligned by 6 μm or less), a shift from 100% of the total irradiation amount can be suppressed to 50 to 150% which is a relatively small sift in all of the pixels positioned in the overlapping region.

Using this photomask, the same test as the evaluation test in Embodiment 1 was performed. The joint line was not observed in the front direction and oblique directions (in the entire azimuth). In the entire grading value of black, white and intermediate scales, the joint line was not observed.

In the present invention, as the difference between 100% and the total irradiation amount in the region which is exposed twice or more through different photomasks becomes larger, the asymmetry of a pretilt angle becomes remarkable, and the overlapping region is visible as a line. Further, if the exposure step is performed by scanning exposure as in the present Embodiment, the scanning direction on the TFT array substrate and the scanning direction on the CF substrate are substantially perpendicular to each other generally, when the substrates are attached. Therefore, a difference in this asymmetry of the pretilt angle is very small. Accordingly, the photomasks shown in FIG. 30 which can suppress the difference between 100% and the total irradiation amount in the overlapping region to be a relatively small value can be particularly effectively used when the exposure step is performed by scanning exposure as in the present Embodiment.

The total irradiation amount when the scanning exposure is performed using the respective photomasks in Embodiments 1 and 2 is mentioned below. If the scanning exposure is performed using the photomasks shown in FIGS. 9 and 10, the total irradiation amount in the overlapping region is 100% or 200% regardless of whether or not the photomasks are misaligned. Particularly in the overlapping exposure region, the alignment film is exposed at the maximum 200% that is twice as large as a general irradiation amount. If the scanning exposure is performed using the photomasks shown in FIG. 27, in the overlapping region, particularly in the region where the length of the transmissive part is gradually decreased, the total irradiation amount can be 150% or less.

The patterns of the photomasks used for the 1st and 2nd shots, shown in FIG. 30, have the following relationship: in each transmissive part-arranged region in the halftone part, the shape of the transmissive part and that of the shielding part do not have an inverted relationship but an opposite relationship relative to the center line of the transmissive part-arranged region in the scanning direction. However, the photomasks for the 1st and 2nd shots in accordance with the present Embodiment may be in the following relationship as shown in FIG. 32(a): in each transmissive part-arranged region in the halftone part, the transmissive part and the shielding part are opposed; but the shape of the transmissive part and the shape of the shielding part are not symmetry to the center line in the transmissive part-arranged region in the scanning direction. Also using such photomasks, as shown in FIG. 32(b), similarly to the photomasks in FIG. 30, the total irradiation amount in the overlapping region can be within 50 to 150%, and the joint line can become invisible. The pattern shown in FIG. 32 also can be applied for a photomask used in the simultaneous scanning as in Embodiment 1. That is, if the photomask shown in FIG. 32 is used in the simultaneous exposure, as shown in FIG. 33, as each of the photomasks used in the 1st and 2nd shots, a photomask in which slits are formed in a step pattern, in a plurality of columns corresponding to the number of arrays of the exposed pixel, may be used. In FIG. 32, the transmissive parts corresponding to the pixels in different columns are partitioned with a solid line, but practically, the transmissive parts are connected in the column direction, generally.

The present application claims priority under the Paris Convention and the domestic law in the country to be entered into national phase on Patent Application No. 2006-17755 filed in Japan on Jan. 26, 2006, the entire contents of which are hereby incorporated by reference.

The terms "or more" and "or less" in the present description mean that the described value is included.

Figure 1:
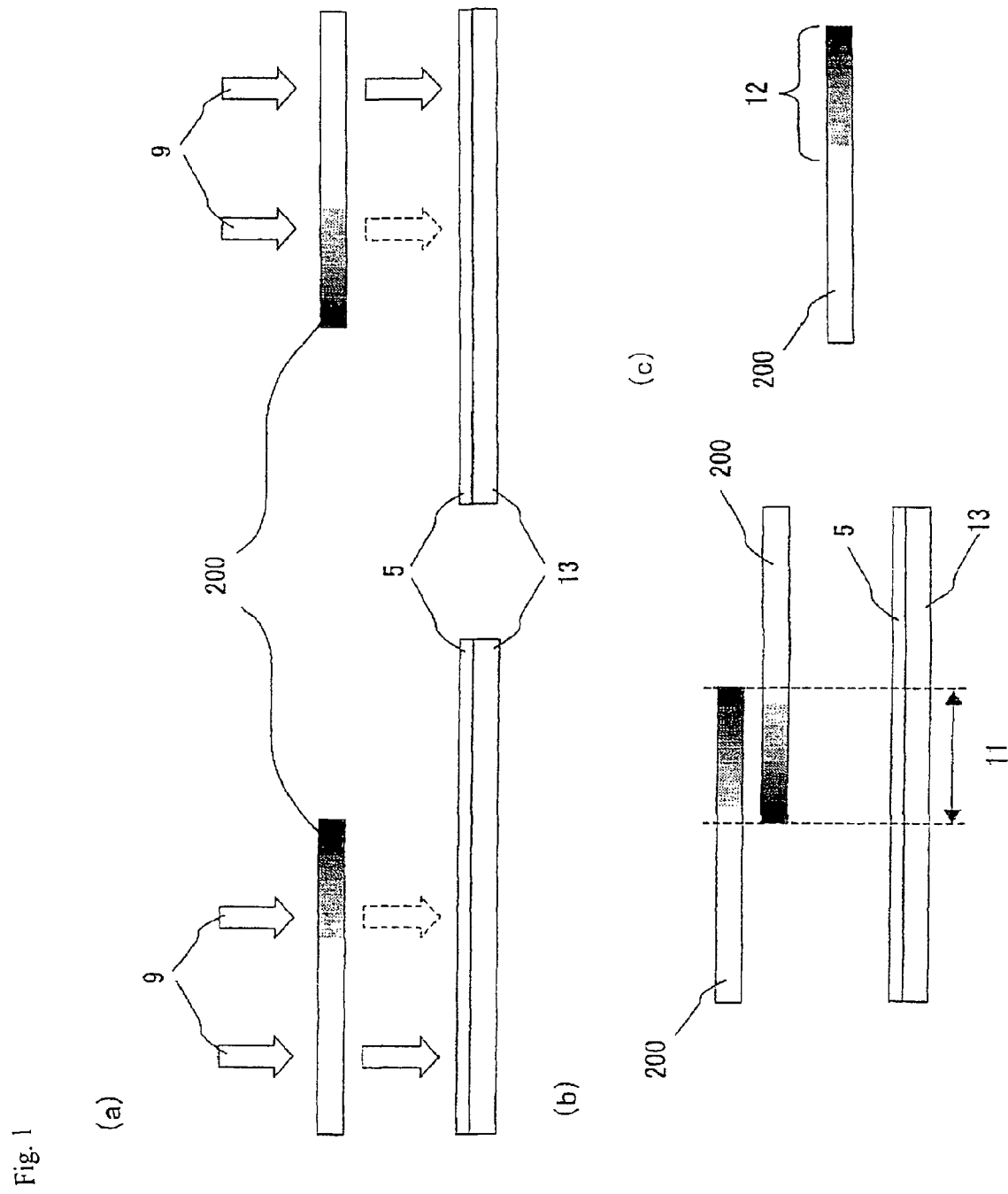
FIG. 1 is a cross-sectional view schematically showing the screen joint shot process in accordance with Embodiment 1.
Figure 2:
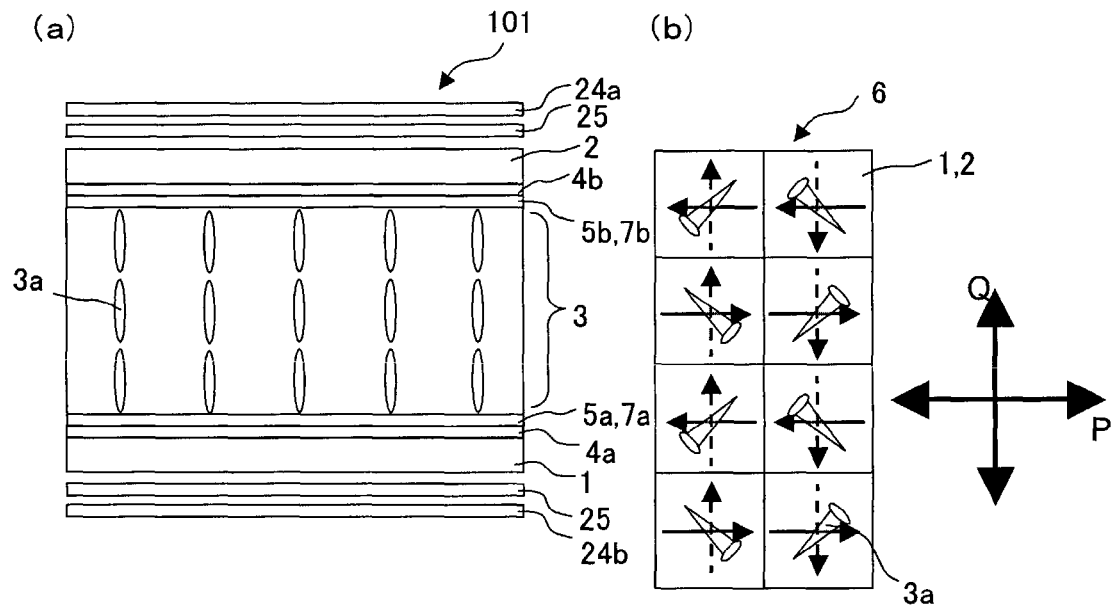
FIG. 2(a) is a cross-sectional view schematically showing a configuration of the liquid crystal display device in accordance with Embodiment 1.

The left figure in FIG. 2(b) is a planar view schematically showing, in one pixel, a direction of the UV irradiation treatment which is provided for the vertical alignment films each formed on the surface of the TFT array substrate that is the first substrate and on the surface of the CF substrate that is the second substrate, and an alignment azimuth of liquid crystal molecules near the middle layer in the liquid crystal layer when a voltage not lower than a threshold is applied.

The right figure in FIG. 2(b) is a planar view schematically showing a polarization axis direction P of the upper polarizer 24a and a polarization axis direction Q of the lower polarizer 24b.

Figure 3:
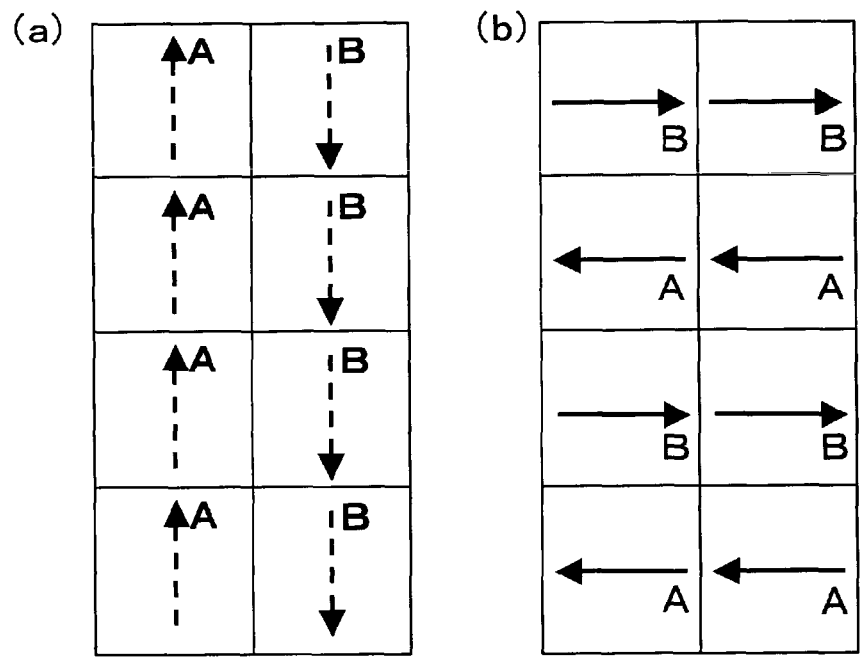

FIG. 3(a) is a planar view schematically showing, in one pixel, a direction of the UV irradiation treatment which is provided for the surface of the vertical alignment film formed on the surface of the TFT array substrate that is the first substrate.

FIG. 3(b) is a planar view schematically showing, in one pixel, a direction of the UV irradiation treatment which is provided for the surface of the vertical alignment film formed on the surface of the CF substrate that is the second substrate.

Figure 4:
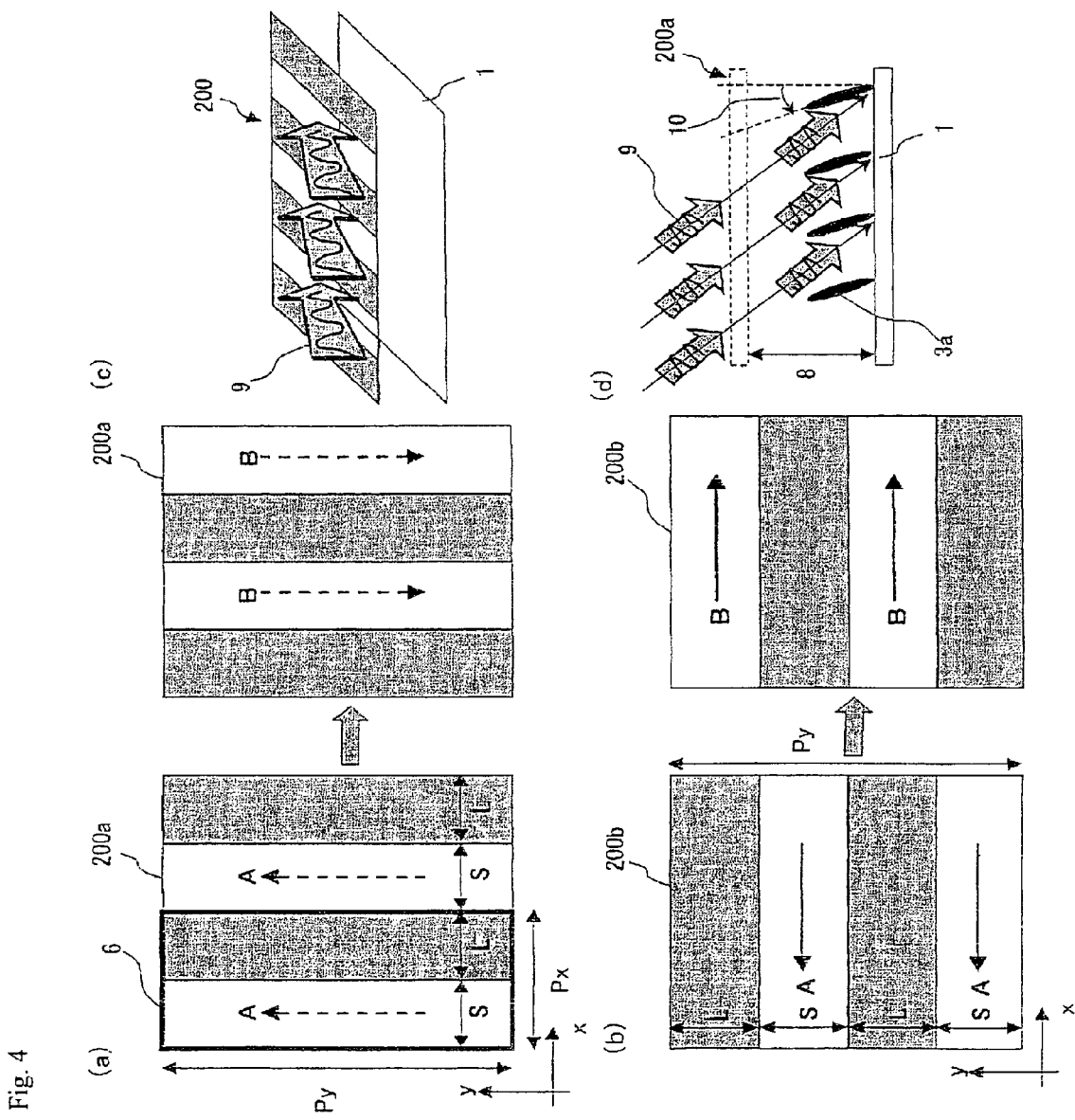

FIG. 4 is a schematic view explaining the UV irradiation direction for the four-domain alignment division.

FIG. 4(a) is a planer view schematically showing a direction of the UV irradiation treatment for the TFT array substrate.

FIG. 4(b) is a planar view schematically showing a direction of the UV irradiation treatment for the CF substrate.

FIG. 4(c) is a perspective view schematically showing an embodiment of the UV irradiation treatment for the TFT array substrate or the CF substrate.

FIG. 4(d) is a cross-sectional view schematically showing an embodiment of the UV irradiation treatment for the TFT array substrate or the CF substrate.

Figure 5:
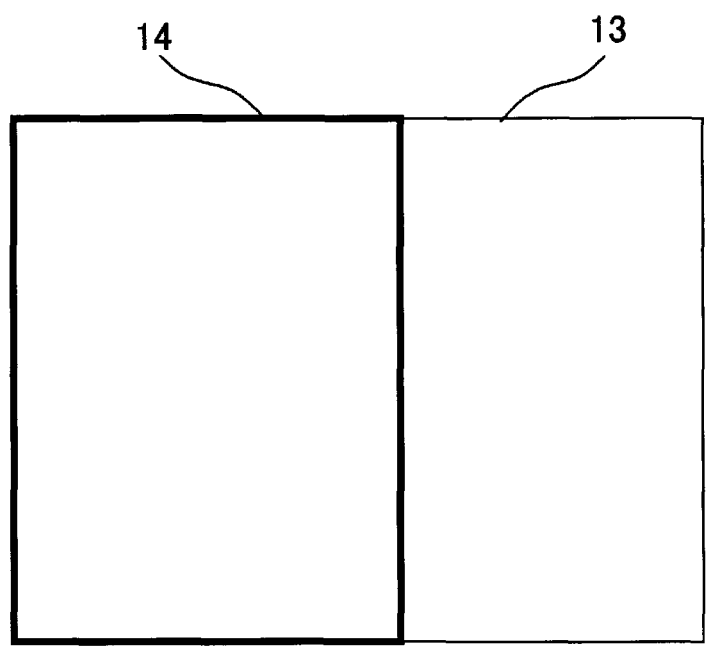

FIG. 5 is a planar view schematically showing the screen joint shot method in Embodiment 1.

Figure 6:
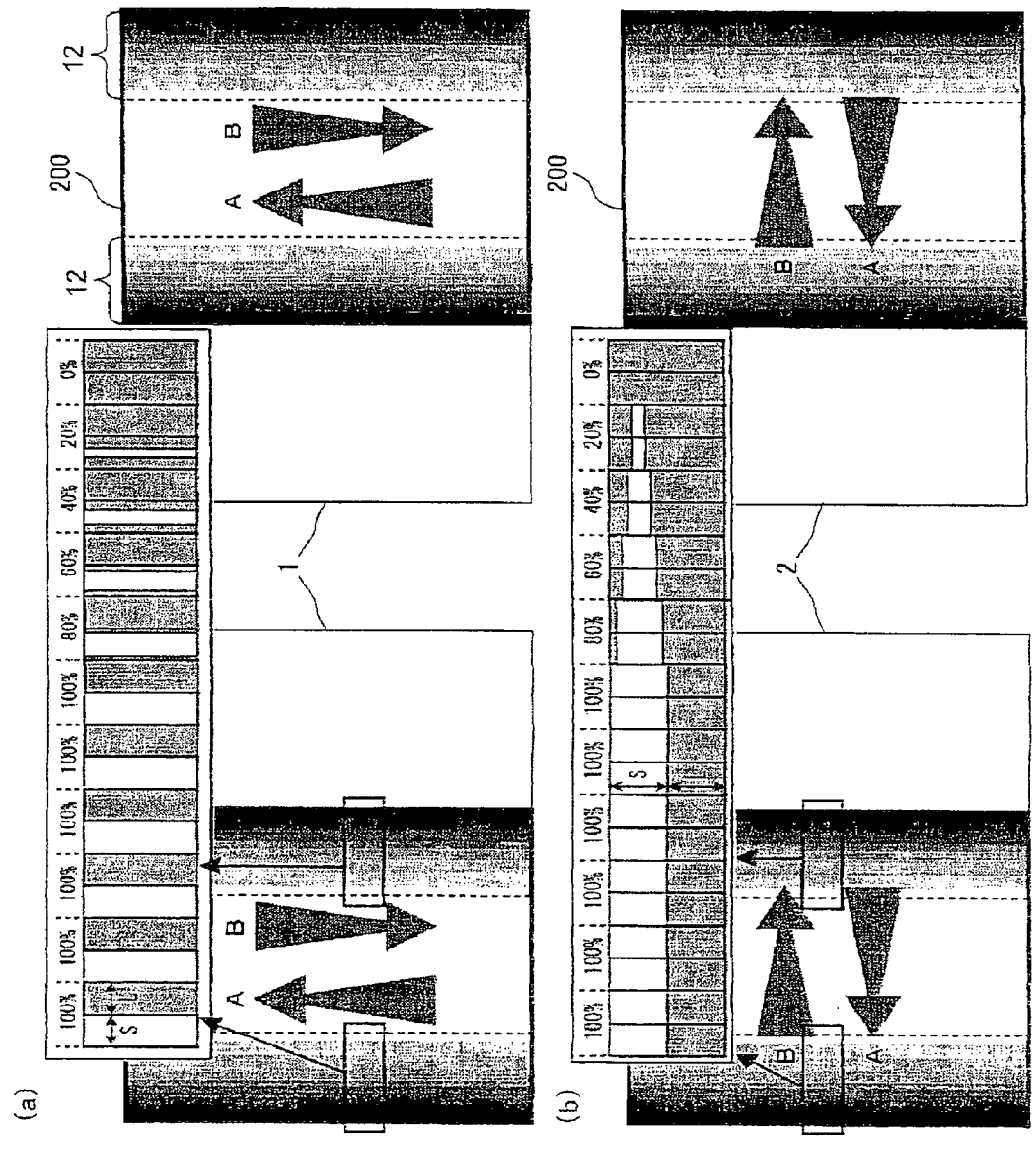

FIG. 6 is a top view schematically showing the screen joint shot method in Embodiment 1 in which the measures for eliminating the joint line are taken and an enlarged schematic view showing the mask pattern in the overlapping region.

FIG. 6(a) is a top view schematically showing the embodiments of the 1st and 2nd shots for the TFT array substrate and an enlarged schematic view showing the photomask pattern in the overlapping region of the photomasks used for exposing the TFT array substrate.

FIG. 6(b) is a top view schematically showing the embodiments of the 1st and 2nd shots for the CF substrate 2 and an enlarged schematic view showing the photomask pattern in the overlapping region of the photomasks used for exposing the CF substrate.

Figure 7:
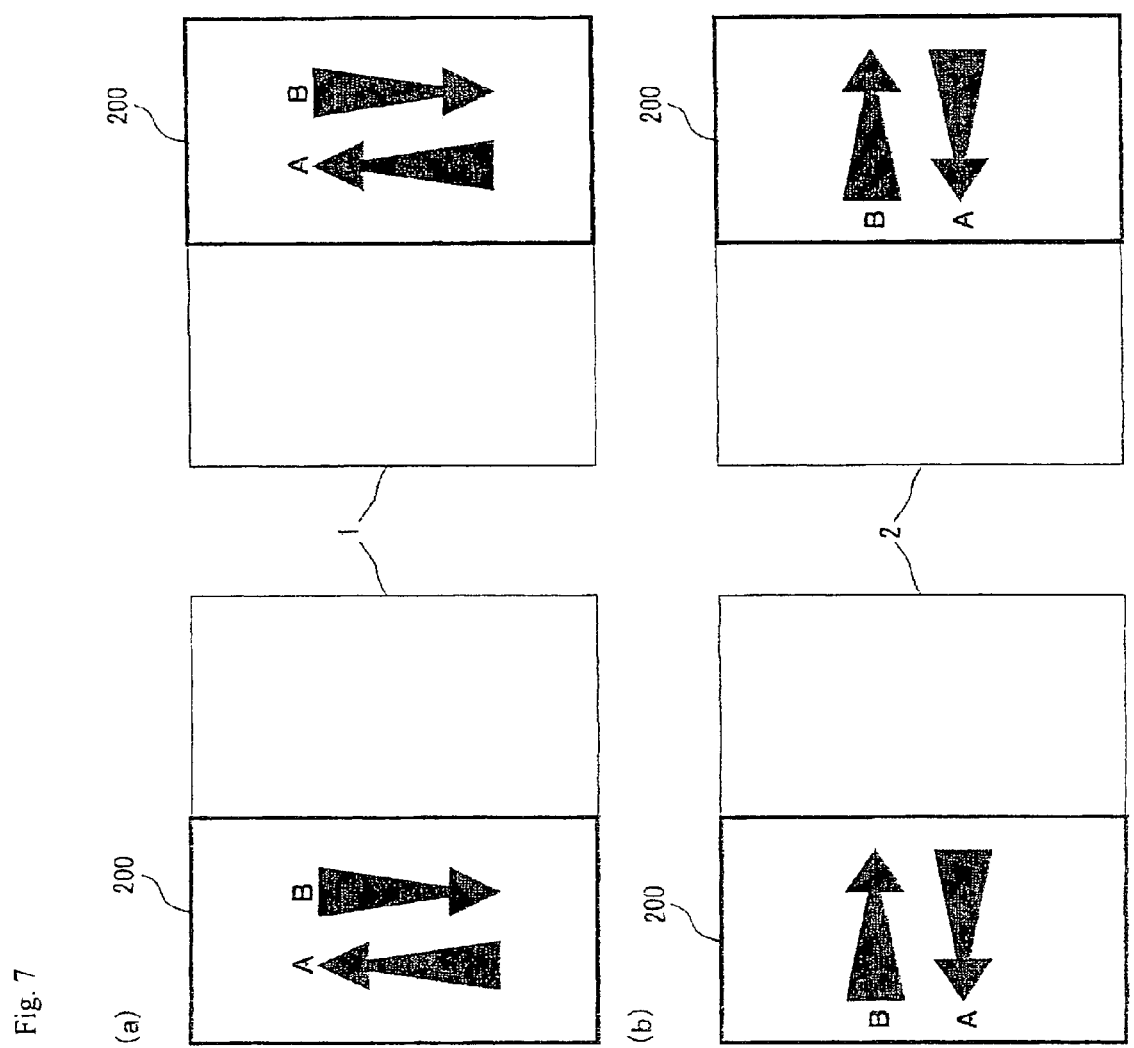

FIG. 7 is a top view schematically showing the screen joint shot method in the comparative Embodiment in which the measures for eliminating the joint line are not taken.

FIG. 7(a) is a top view schematically showing embodiments of the 1st and 2nd shots for the TFT array substrate.

FIG. 7(b) is a top view schematically showing embodiments of the 1st and 2nd shots for the CF substrate.

Figure 8:
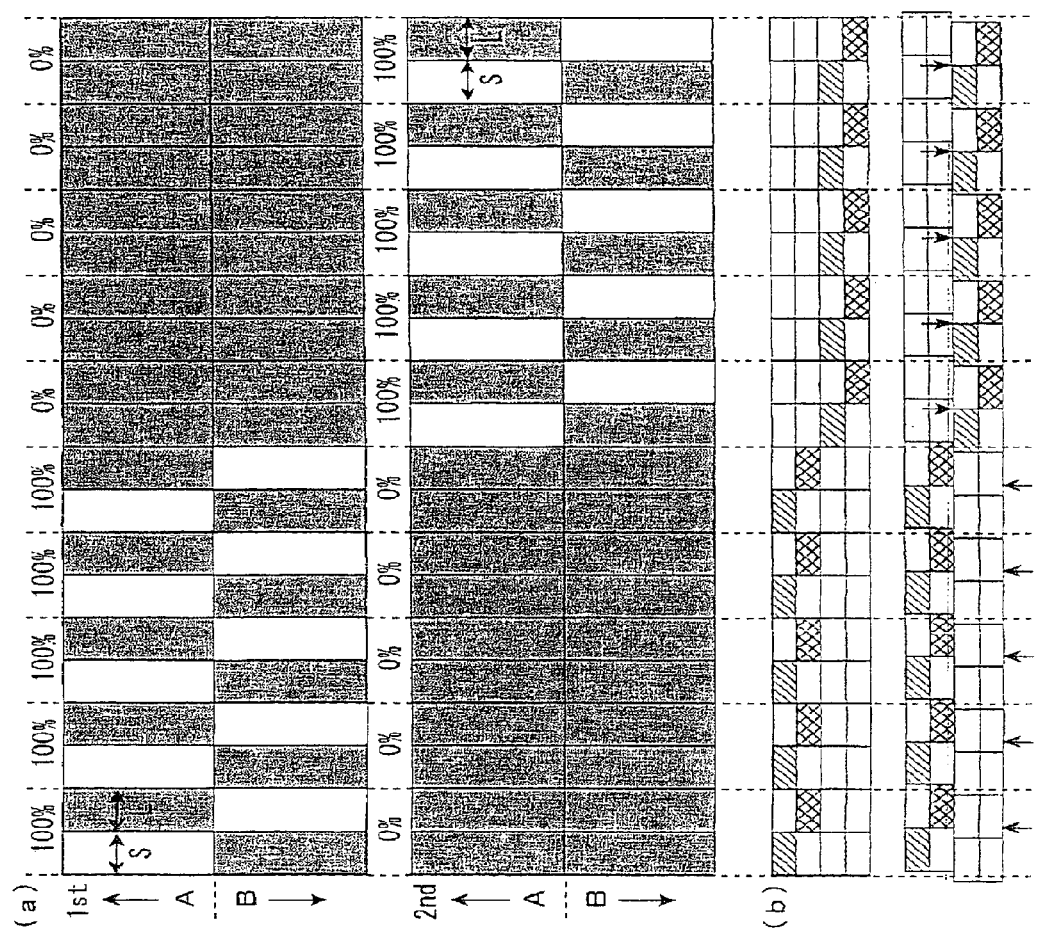

FIG. 8 is a schematic view explaining the photomask used in the screen joint shot process in the comparative embodiment in which the measures for eliminating the joint line are not taken.

FIG. 8(a) is a planar view schematically showing the pattern and arrangement of the photomasks.

FIG. 8(b) is a schematic view showing a region which is exposed using the photomasks shown in FIG. 8(a).

Figure 9:
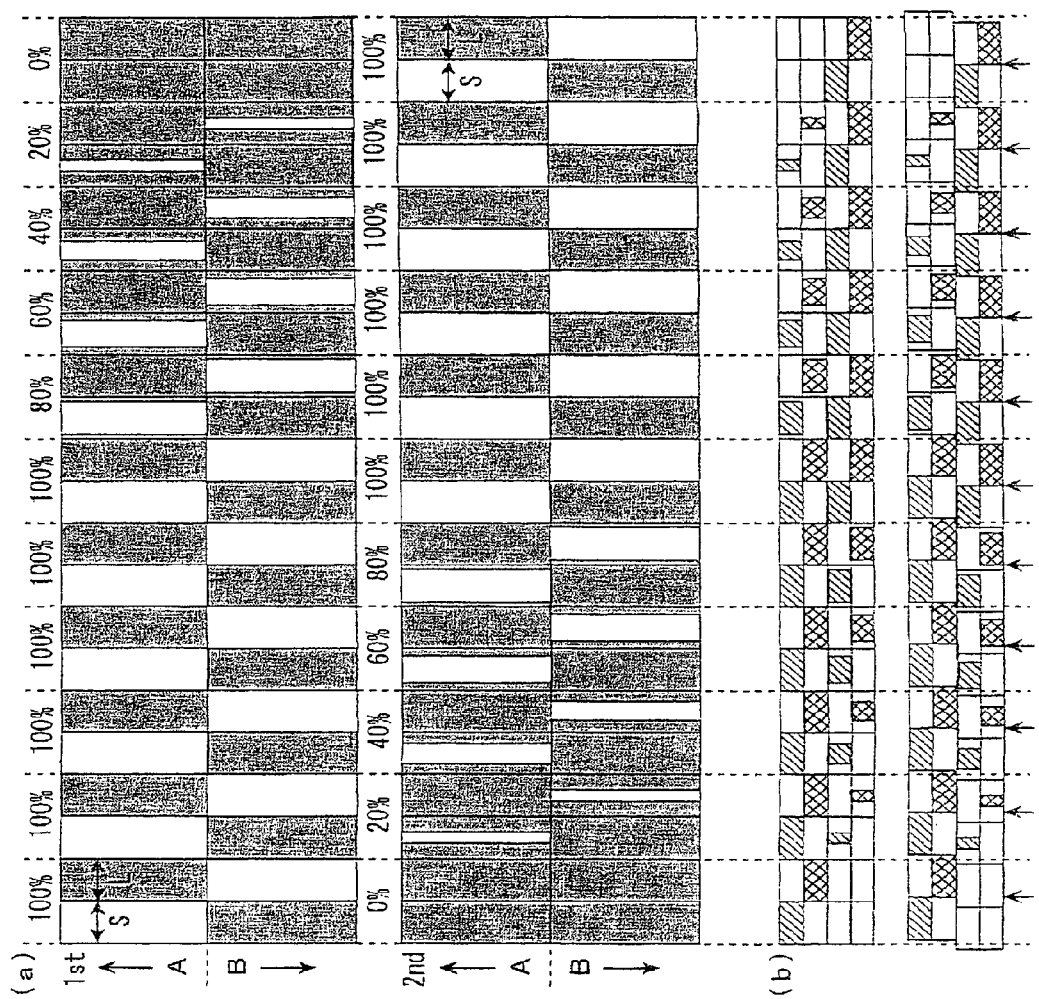

FIG. 9 is a schematic view explaining the photomask used in the screen joint shot process in accordance with Embodiment 1 in which the measures for eliminating the joint line are taken.

FIG. 9(a) is a planar view schematically showing the pattern and arrangement of the photomasks in the overlapping region.

FIG. 9(b) is a schematic view showing the region which is exposed using the photomasks shown in FIG. 9(a).

Figure 10:
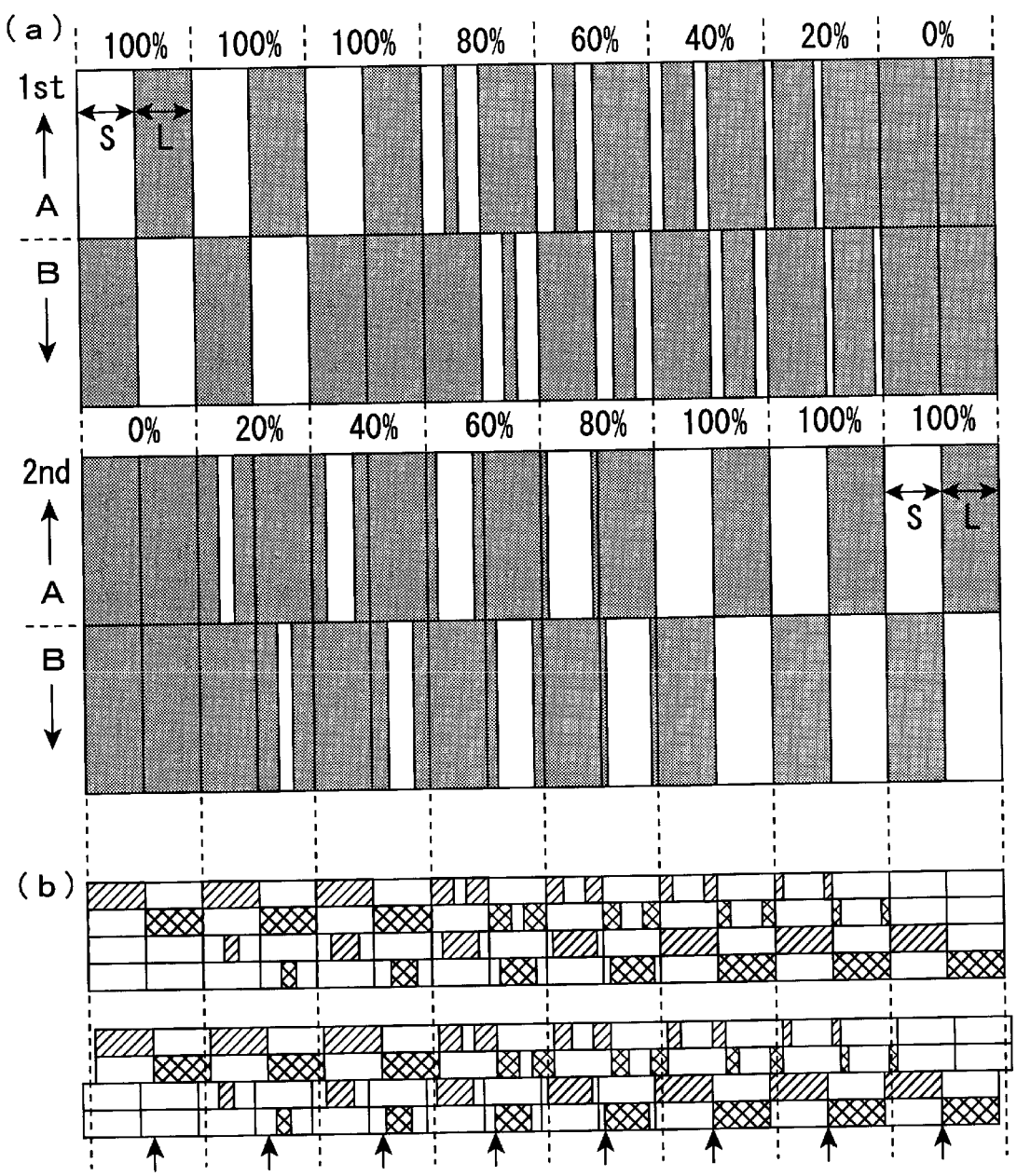

FIG. 10 is a schematic view showing another photomask used in the screen joint shot process in Embodiment 1 in which the measures for eliminating the joint line are taken.

FIG. 10(a) is a planar view schematically showing the pattern and arrangement of the photomasks in the overlapping region.

FIG. 10(b) is a schematic view showing the region which is exposed using the photomasks shown in FIG. 10(a).

Figure 11:
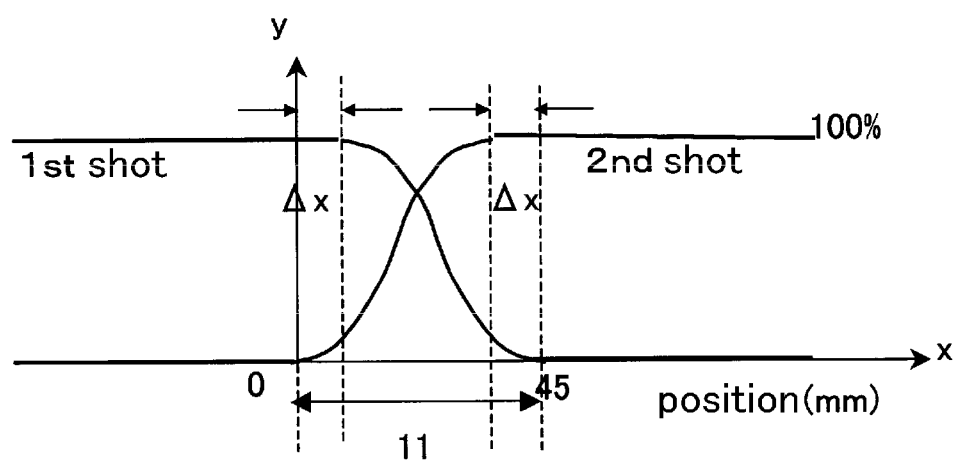

FIG. 11 is a schematic view explaining a parameter in the overlapping region of the photomasks in Embodiment 1 used in the screen joint shot process.

FIG. 12 is a graph showing a change in aperture ratio in the transmissive part in the overlapping region of the photomask used in the screen joint shot process in accordance with Embodiment 2.

FIG. 12(a) is a graph showing a trigonometric function and the total irradiation amount is the maximum 50%.

FIG. 12(b) is a graph showing a trigonometric function and the total irradiation amount is the maximum 100%.

FIG. 13 is another graph showing a change in aperture ratio in the transmissive part in the overlapping region of the photomask used in the screen joint shot process in accordance with Embodiment 2.

FIG. 13(a) is a graph showing a trigonometric function and the total irradiation amount is the maximum 150%.

FIG. 13(b) is a graph showing a trigonometric function and the total irradiation amount is the maximum 200%.

Figure 14:
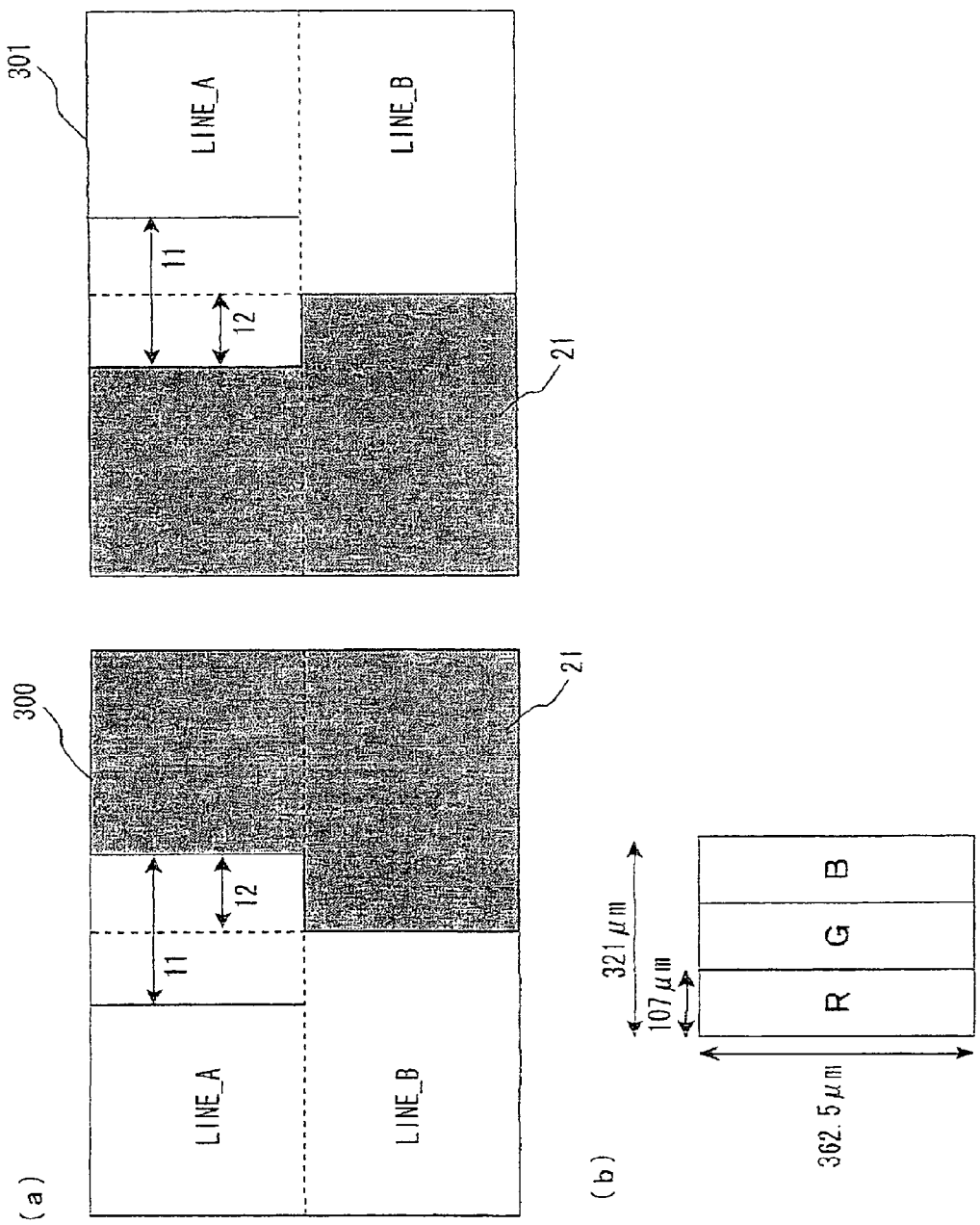

FIG. 14(a) is a top view schematically showing the photomasks for the TFT array substrate, used in the joint line-verified experiment the screen joint shot process, in accordance with Embodiment 1.

FIG. 14(b) is a schematic view showing a unit of three pixels (one unit of RGB).

Figure 15:
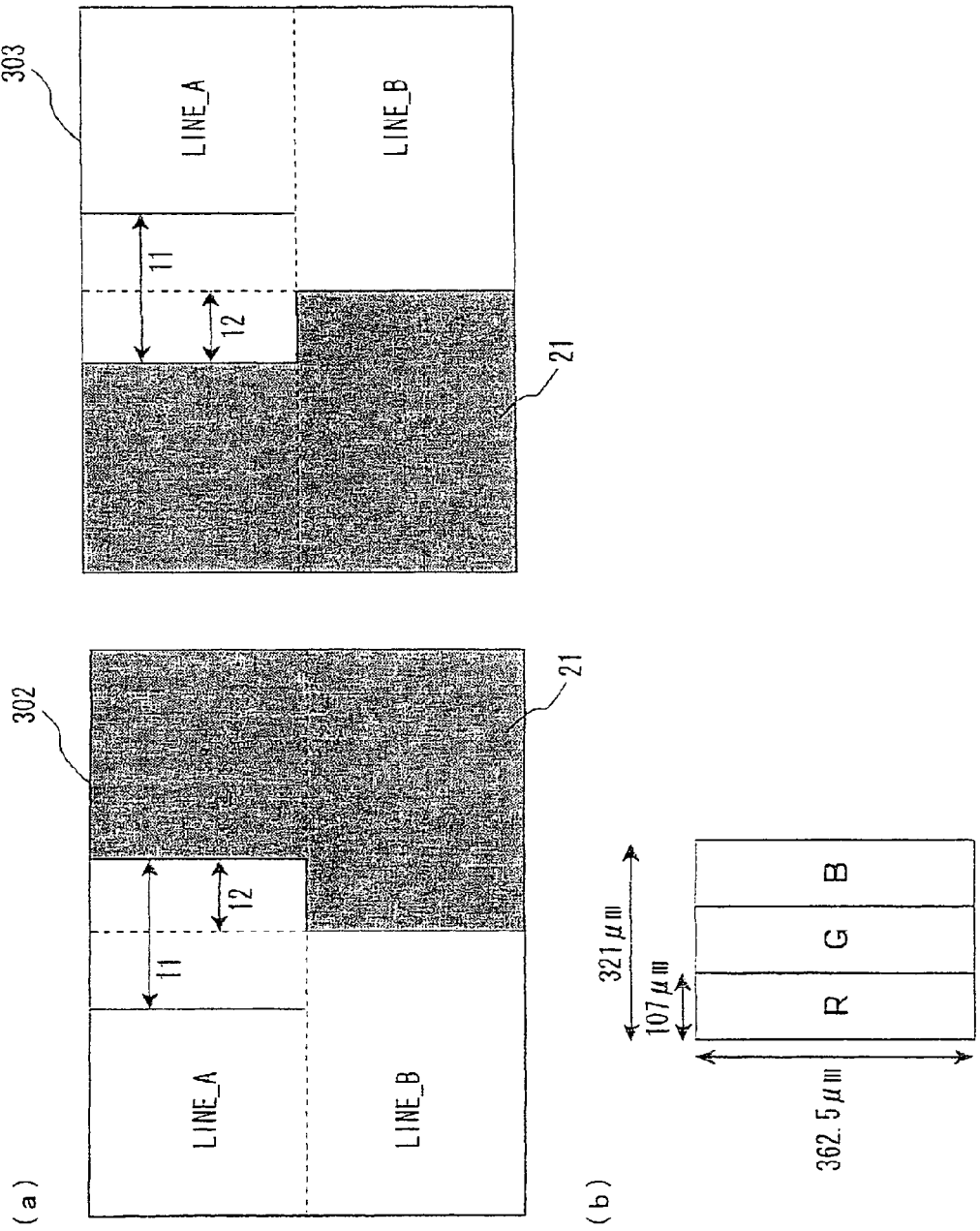

FIG. 15(a) is a top view schematically showing the photomasks for the CF substrate, used the joint line-verified experiment, in accordance with Embodiment 1.

FIG. 15(b) is a schematic view showing a unit of three pixels (one unit of RGB).

Figure 16:
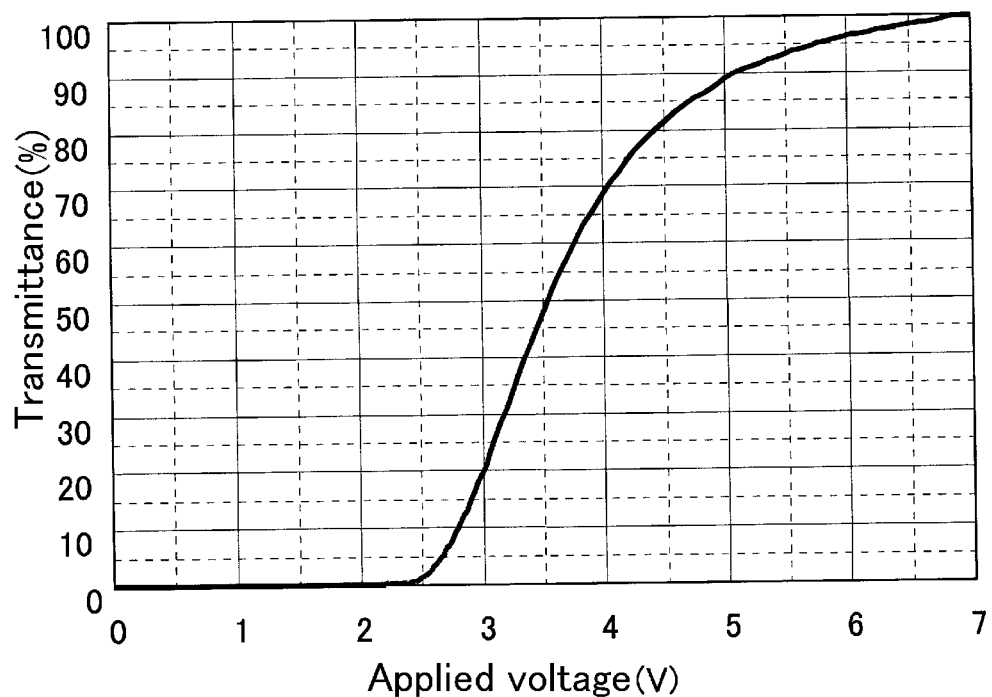

FIG. 16 is a graph showing applied voltage-transmittance characteristics in the panel used for the joint line-verified experiment.

Figure 17:
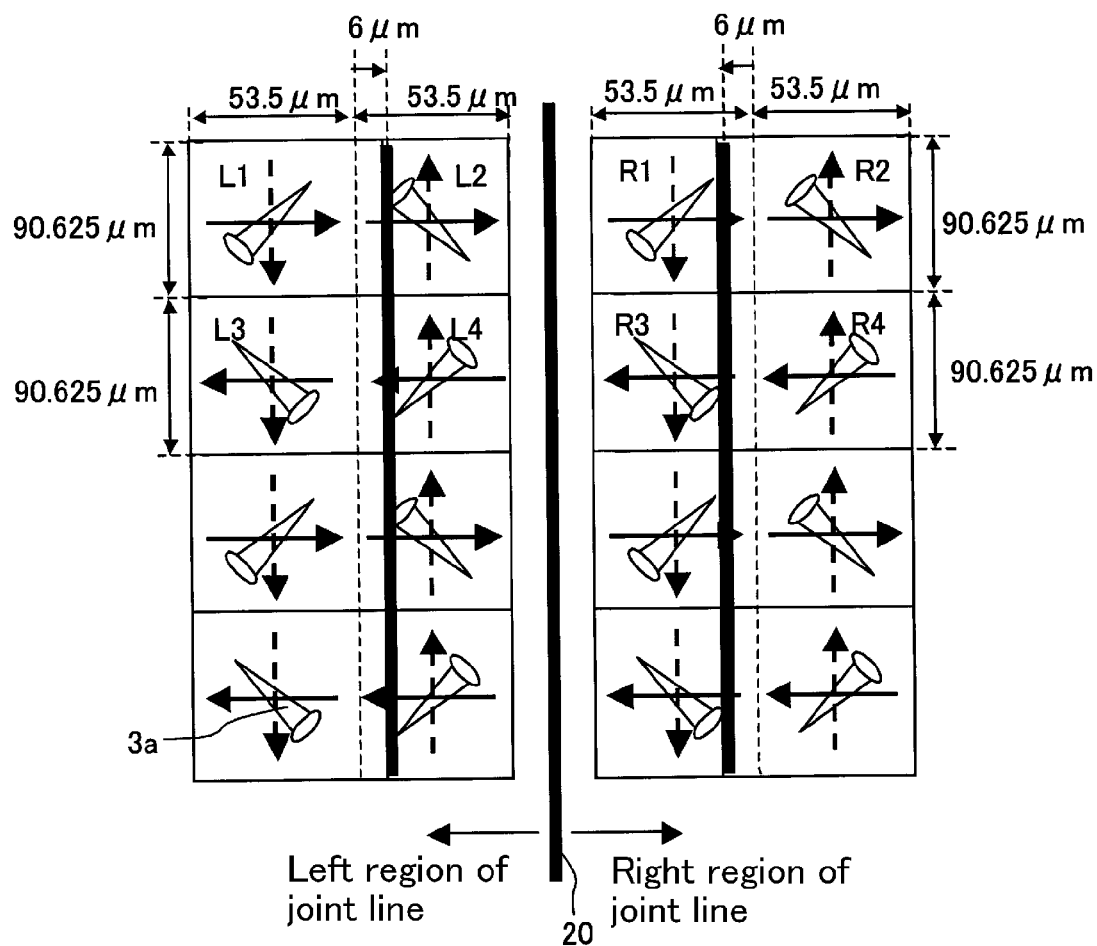

FIG. 17 is a planar view schematically explaining one pixel in the panel including the substrate which is exposed under the state where the patterns of the photomasks are previously misaligned.

Figure 18:
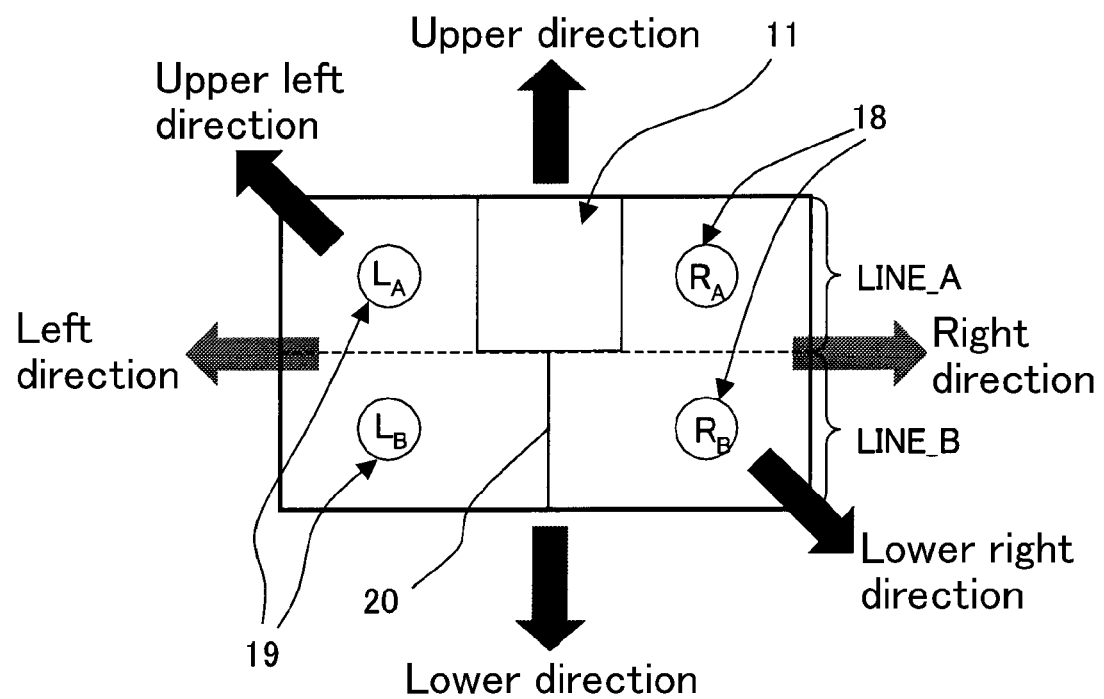

FIG. 18 is a planar view schematically explaining each exposure region and the observation direction in the joint line-verified experiment in the panel produced as a sample for the joint line-verified experiment.

Figure 19:
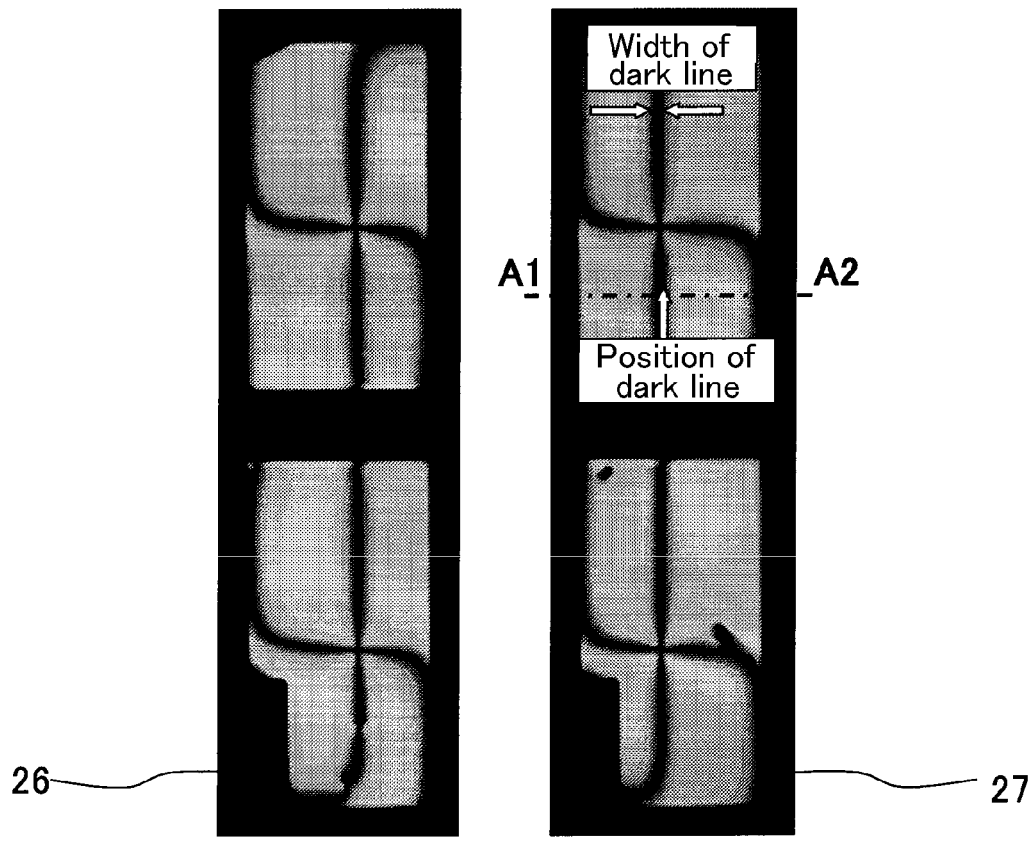

FIG. 19 are pictures of pixels, which are a picture showing a right region and a picture showing a left region of the joint line in the panel including the substrate which is exposed under the state where the patterns of the photomasks are previously misaligned.

Figure 20:
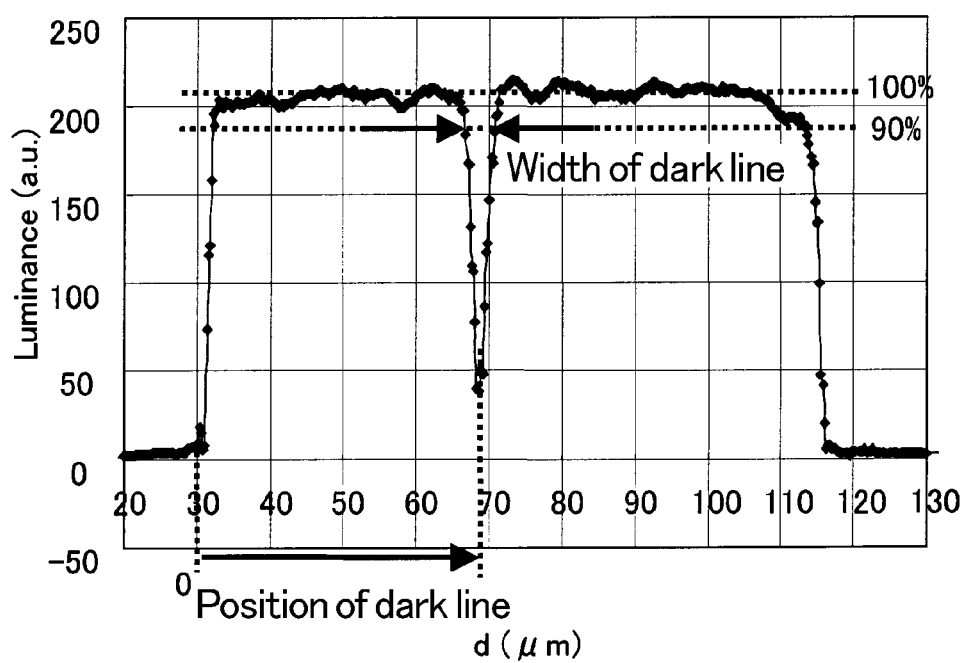

FIG. 20 is a view showing luminance characteristics (luminance cross-section curve) for explaining the position and width of the dark line in the panel including the substrate which is exposed under the state where the patterns of the photomasks are previously misaligned, in the joint line-verified experiment.

FIG. 21 is a graph showing analysis results of the position and width of the dark line in the panel including the substrate which is exposed under the state where the patterns of the photomasks are previously misaligned.

FIG. 21(a) shows the position of the dark line in the overlapping region.

FIG. 21(b) shows the width of the dark line in the overlapping region.

Figure 22:
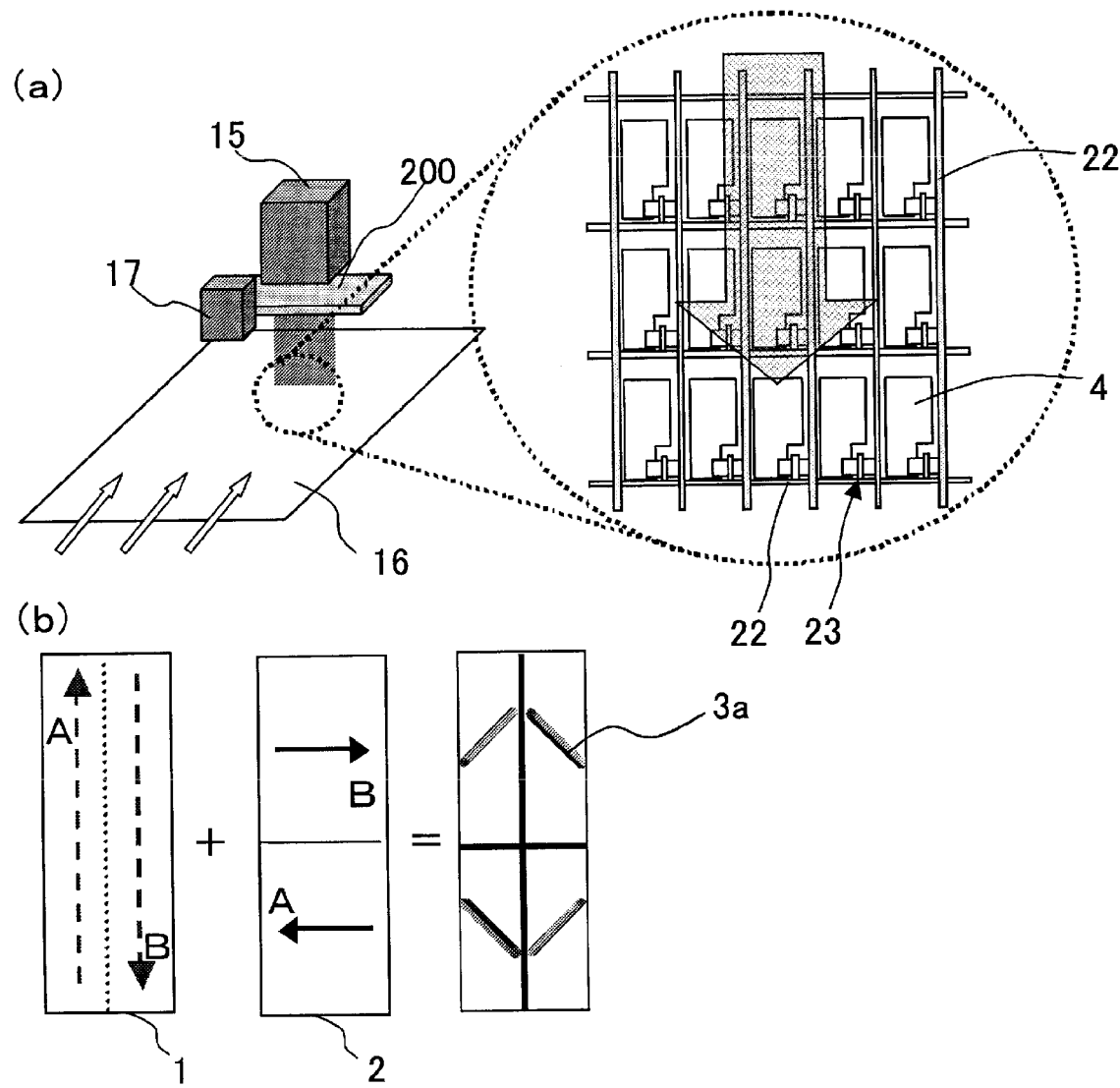

FIG. 22 is a schematic view showing an embodiment of the screen joint shot process in accordance with Embodiment 2.

FIG. 22(a) is a perspective view schematically showing a scanning exposure device and a planar view schematically showing a configuration of a TFT array substrate.

FIG. 22(b) is a planar view schematically showing, in one pixel, a direction of the UV irradiation treatment which is provided for the vertical alignment films each formed on the surface of the TFT array substrate that is the first substrate and on the surface of the CF substrate that is the second substrate, and an alignment azimuth of liquid crystal molecules near the middle layer in the liquid crystal layer when a voltage not lower than a threshold is applied.

Figure 23:
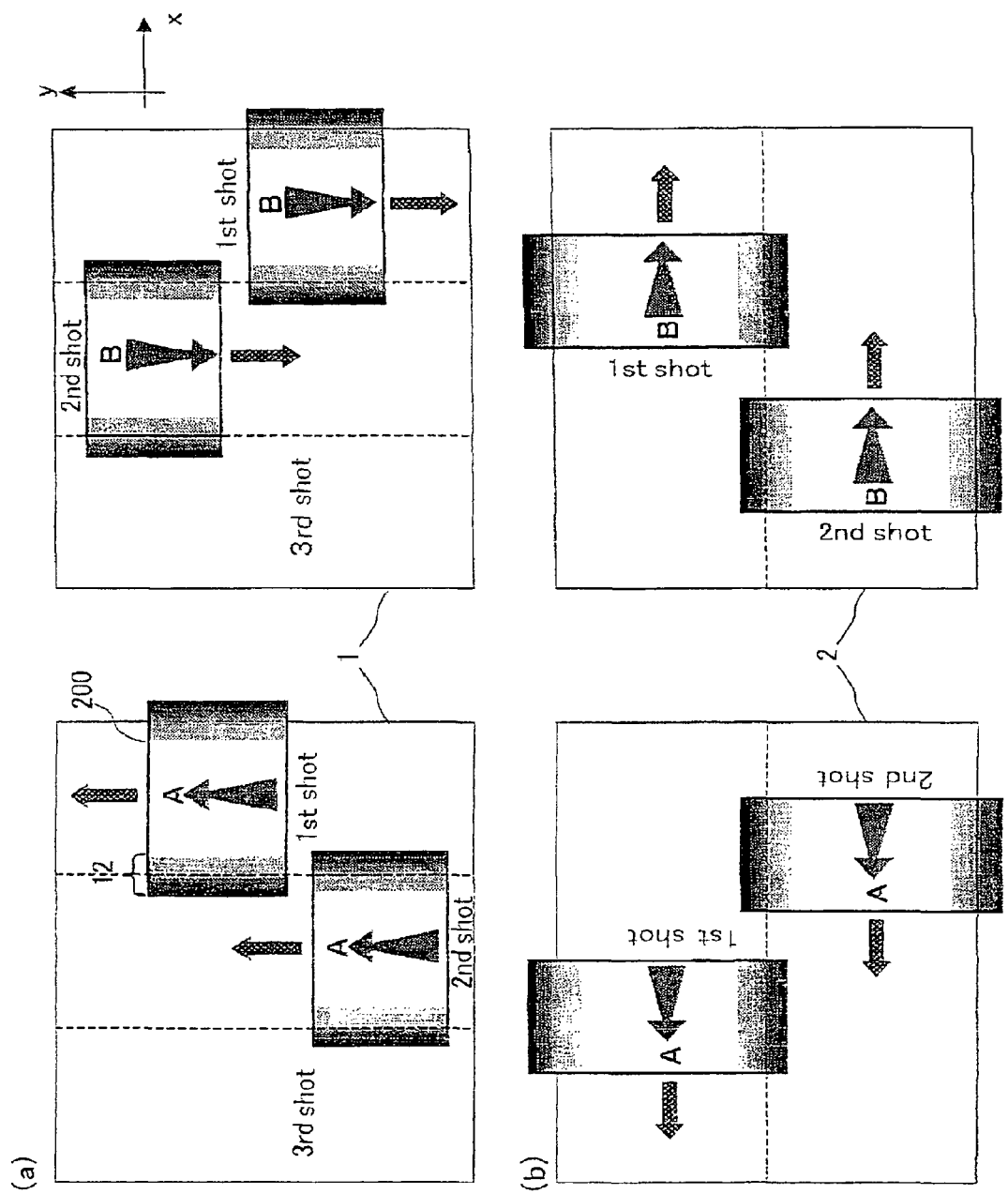

FIG. 23 is a top view schematically showing the screen joint shot method in Embodiment 2 in which the measures for eliminating the joint line are taken.

FIG. 23(a) is a top view schematically showing the embodiments of the 1st and 2nd shots for the TFT array substrate.

FIG. 23(b) is a top view schematically showing embodiments of the 1st and 2nd shots for the CF substrate.

Figure 24:
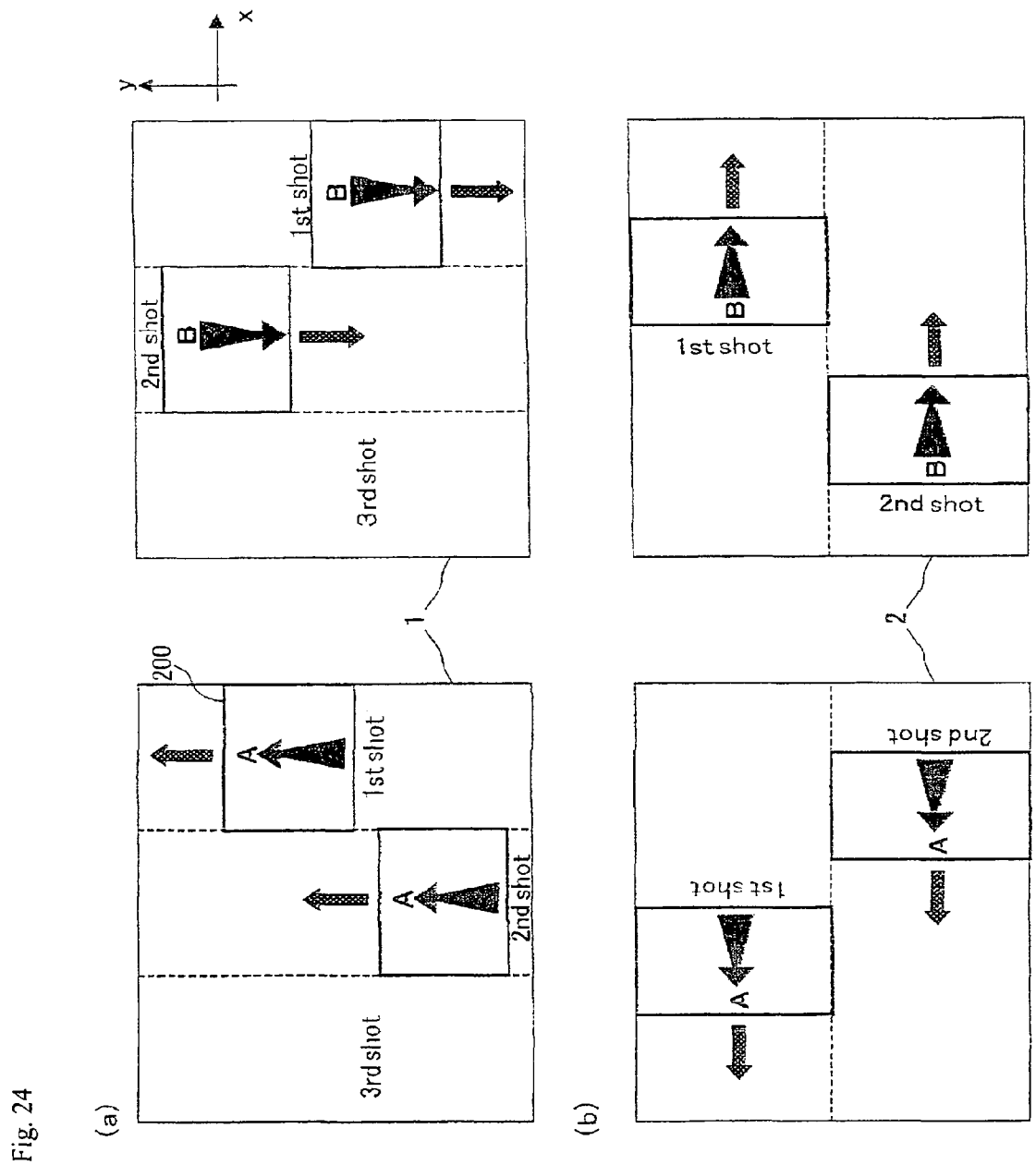

FIG. 24 is a top view schematically showing the screen joint shot method in the comparative Embodiment in which the measures for eliminating the joint line are not taken.

FIG. 24(a) is a top view schematically showing the embodiments of the 1st and 2nd shots for the TFT array substrate.

FIG. 24(b) is a top view schematically showing the embodiments of the 1st and 2nd shots for the CF substrate.

Figure 25:
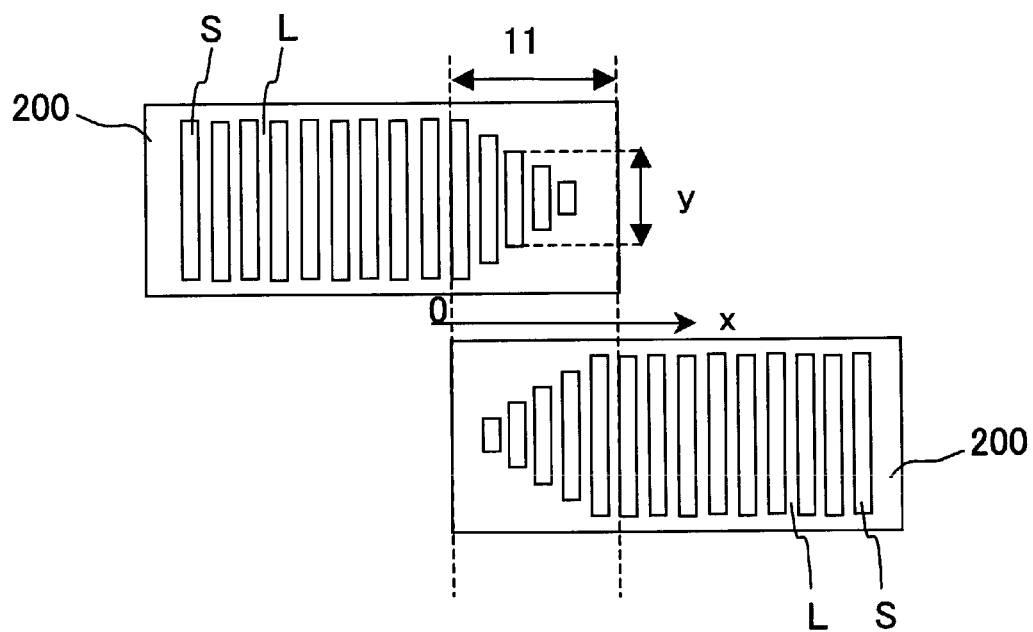

FIG. 25 is a planar view schematically showing the patterns of the photomasks used in the screen joint shot process in accordance with Embodiment 2 in which the measures for eliminating the joint line are taken.

Figure 26:
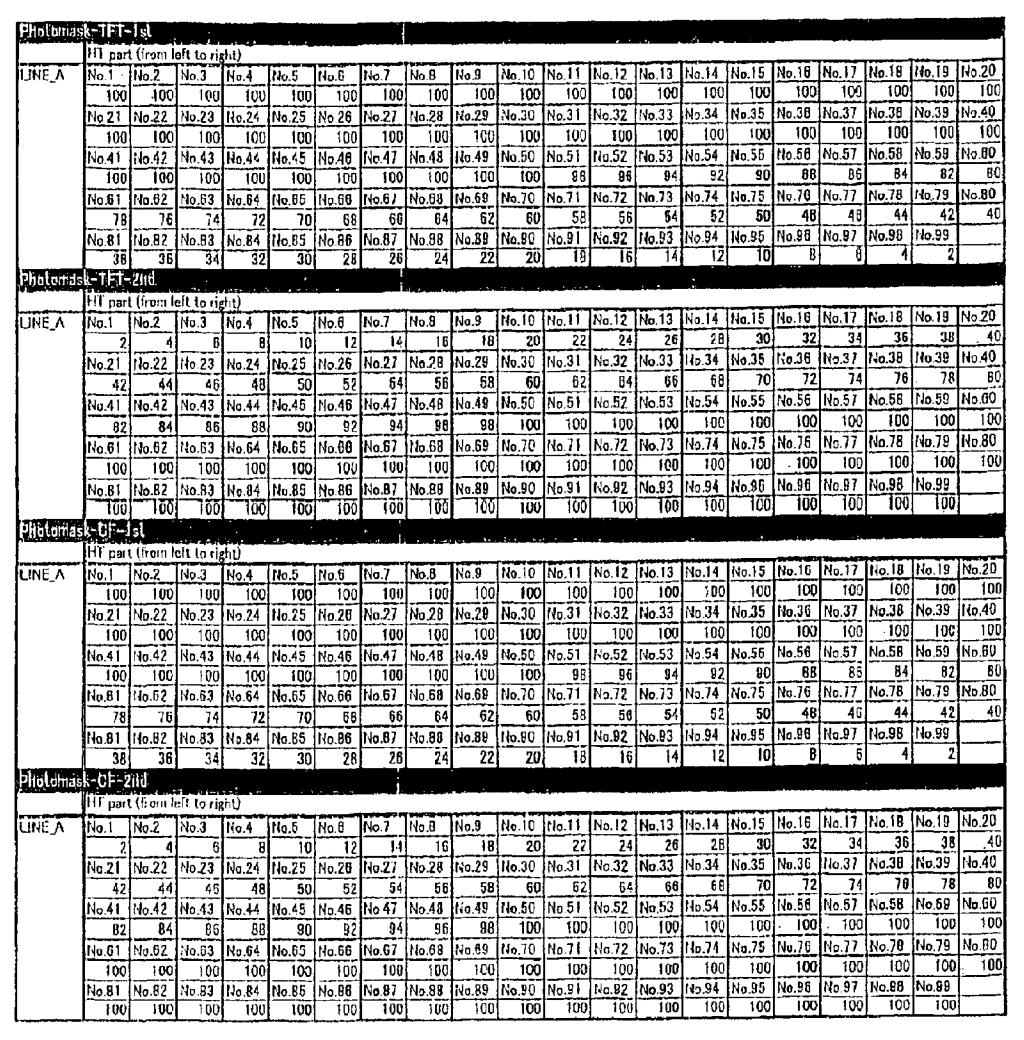

FIG. 26 is a diagram showing an aperture ratio of the transmissive part in each position in the overlapping region of the photomasks for the joint line-verified experiment.

Figure 27:
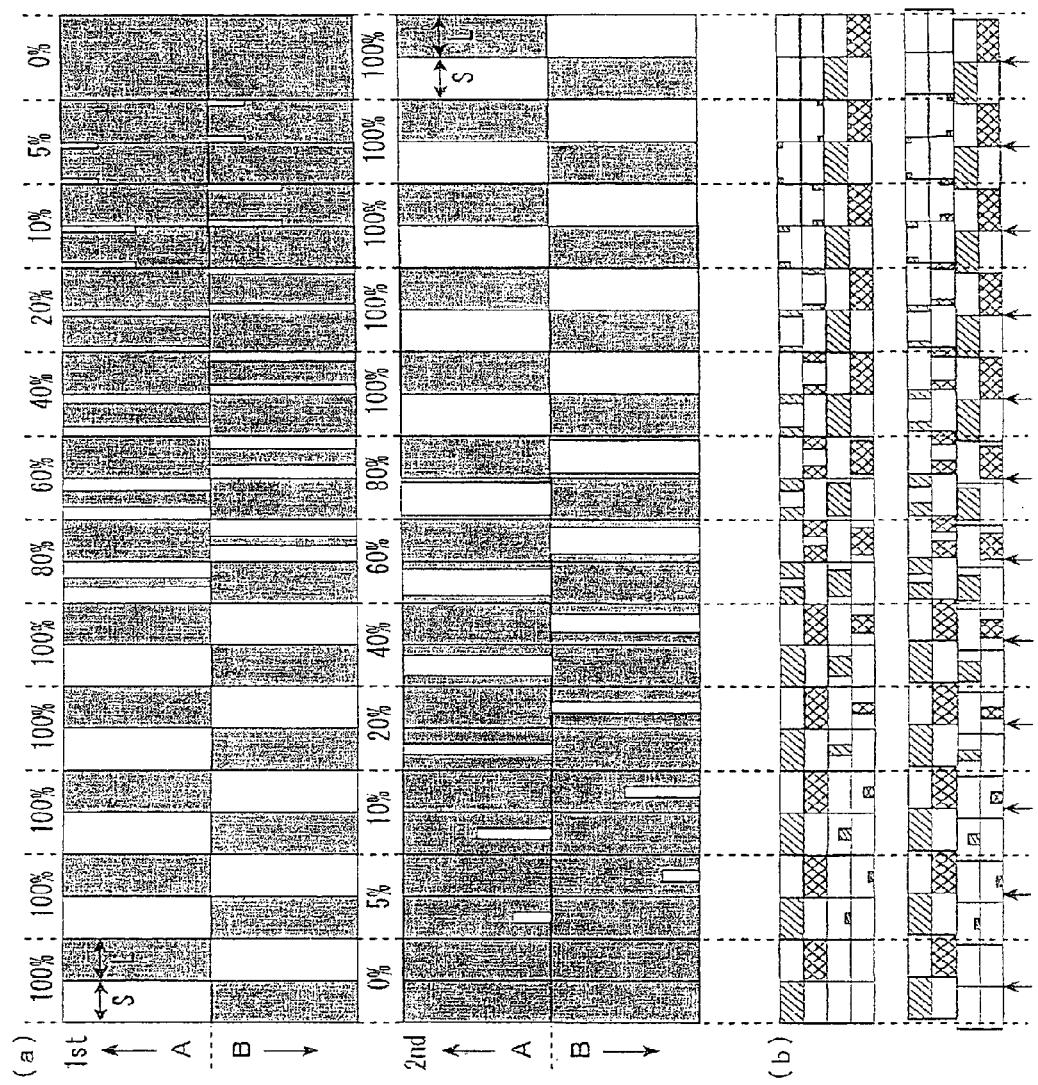

FIG. 27 is a schematic view showing another photomask used in the screen joint shot process in accordance with Embodiment 1 in which the measures for eliminating the joint line are taken.

FIG. 27(a) is a planar view schematically showing the pattern and arrangement of the photomasks in the overlapping region.

FIG. 27(b) is a schematic view showing the region which is exposed using the photomasks shown in FIG. 27(a).

Figure 28:
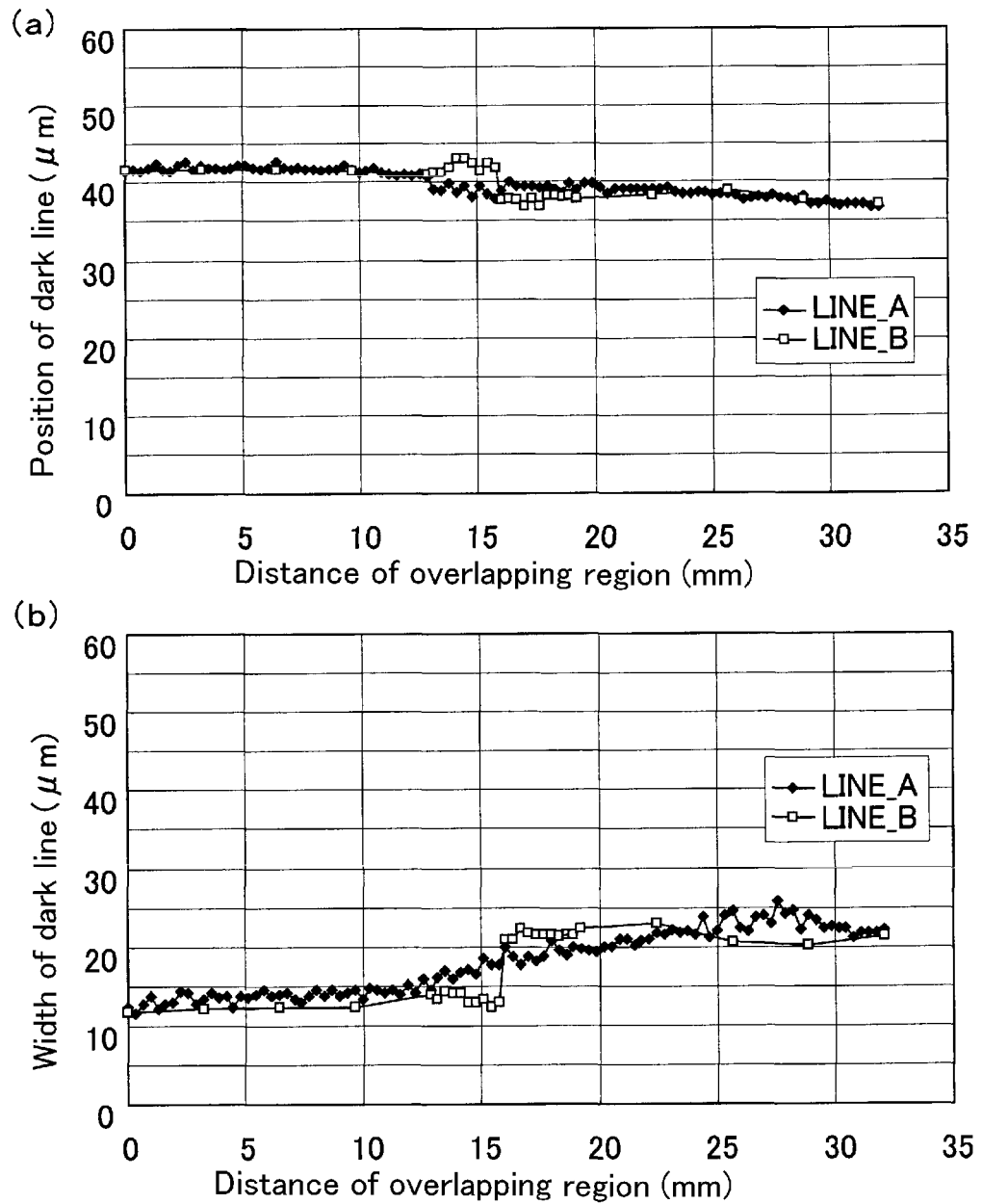

FIG. 28 is a graph showing analysis results of the position and width of the dark line of the panel including the substrate which is exposed under the state where the proximity gap of the photomasks is previously different, in the joint line-verified experiment.

FIG. 28(a) shows the position of the dark line in the overlapping region.

FIG. 28(b) shows the width of the dark line in the overlapping region.

Figure 29:
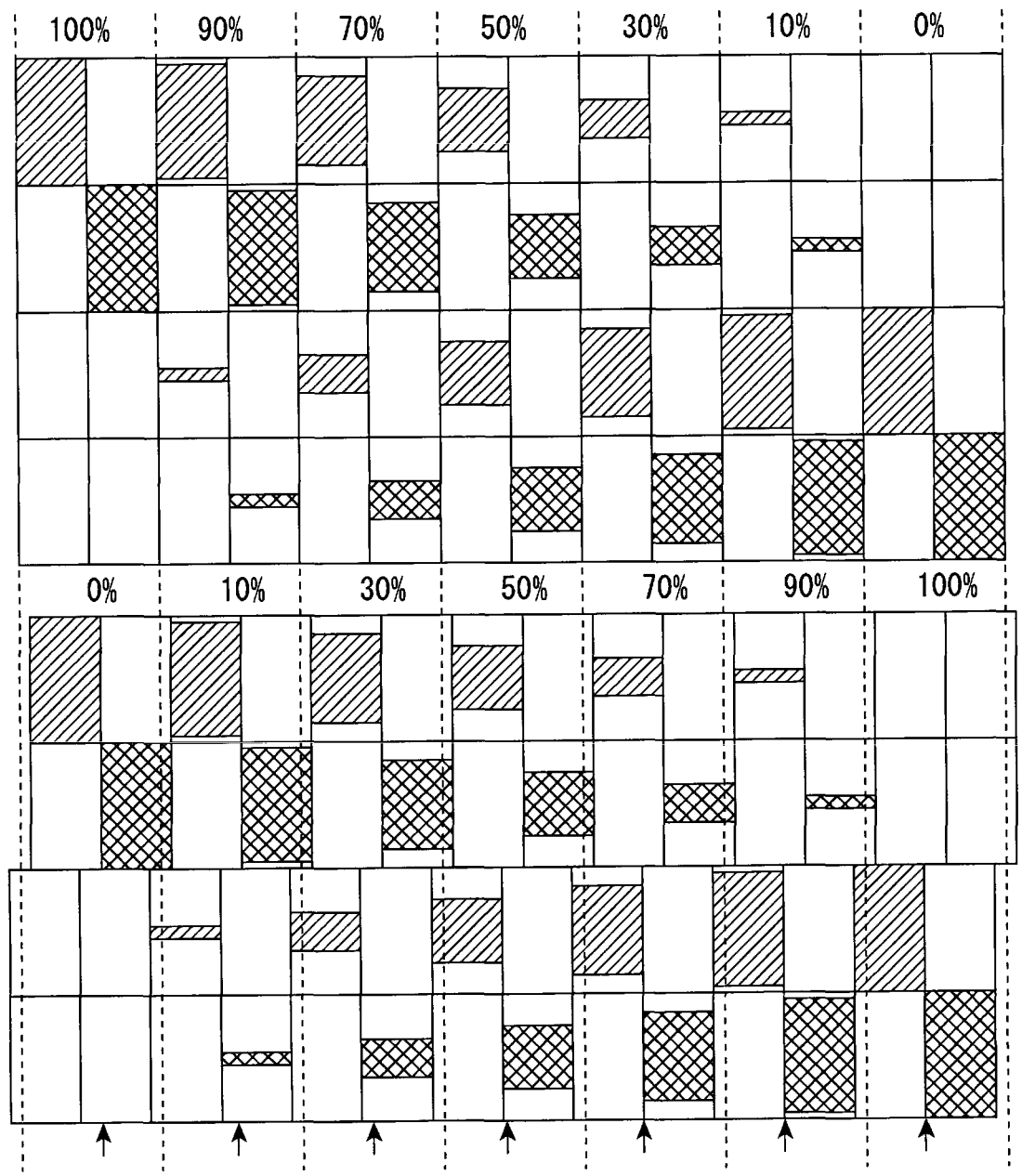

FIG. 29 is a schematic view showing a region which is provided with the scanning exposure using the photomasks shown in FIG. 25.

Figure 30:
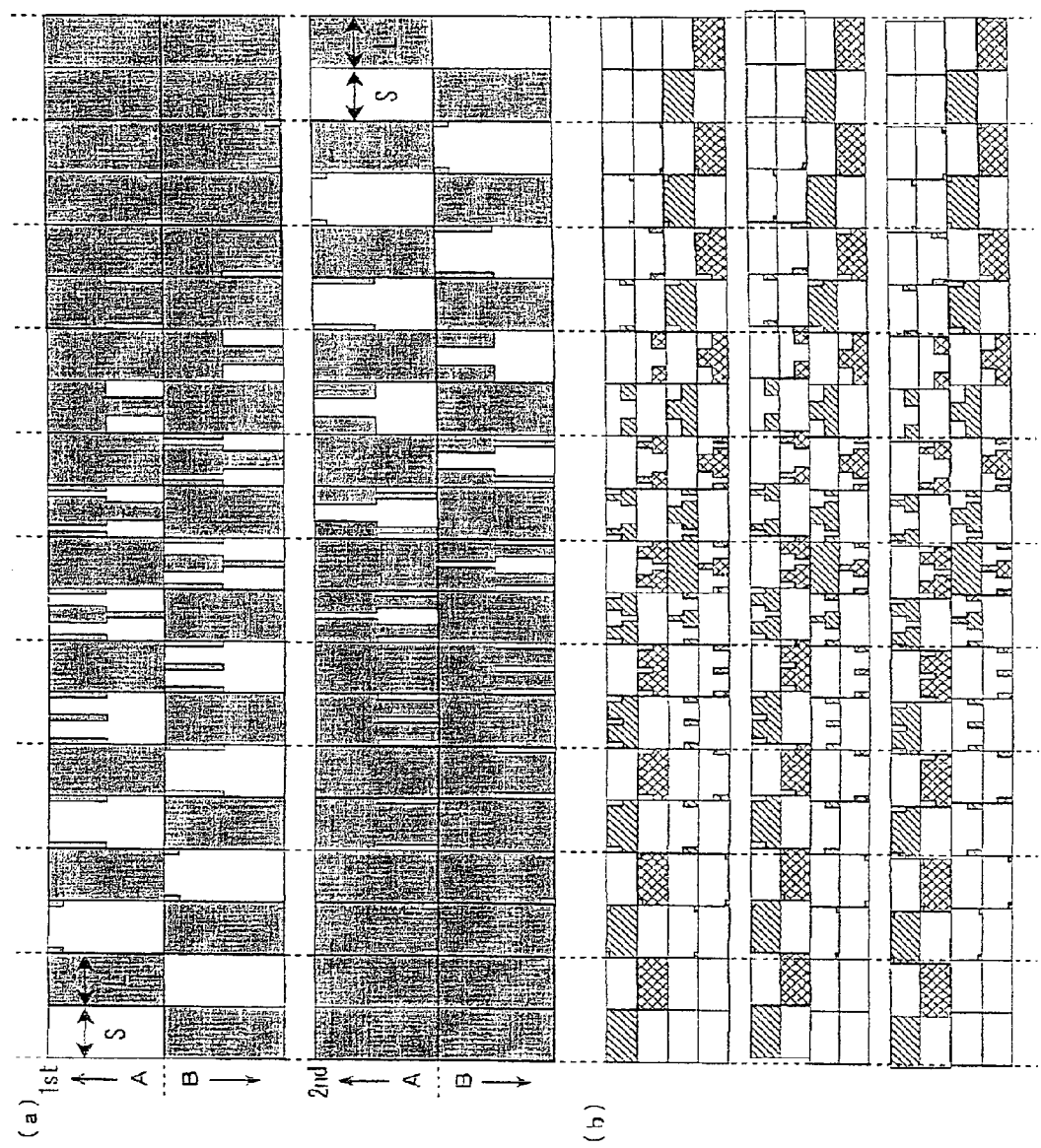

FIG. 30 is a schematic view showing the photomasks used in the screen joint shot process in accordance with Embodiment 2 in which the measures for eliminating the joint line are taken.

FIG. 30(a) is a planar view schematically showing the pattern and arrangement of the photomasks in the overlapping region.

FIG. 30(b) is a schematic view showing the region which is exposed using the photomasks shown in FIG. 30(a).

Figure 31:
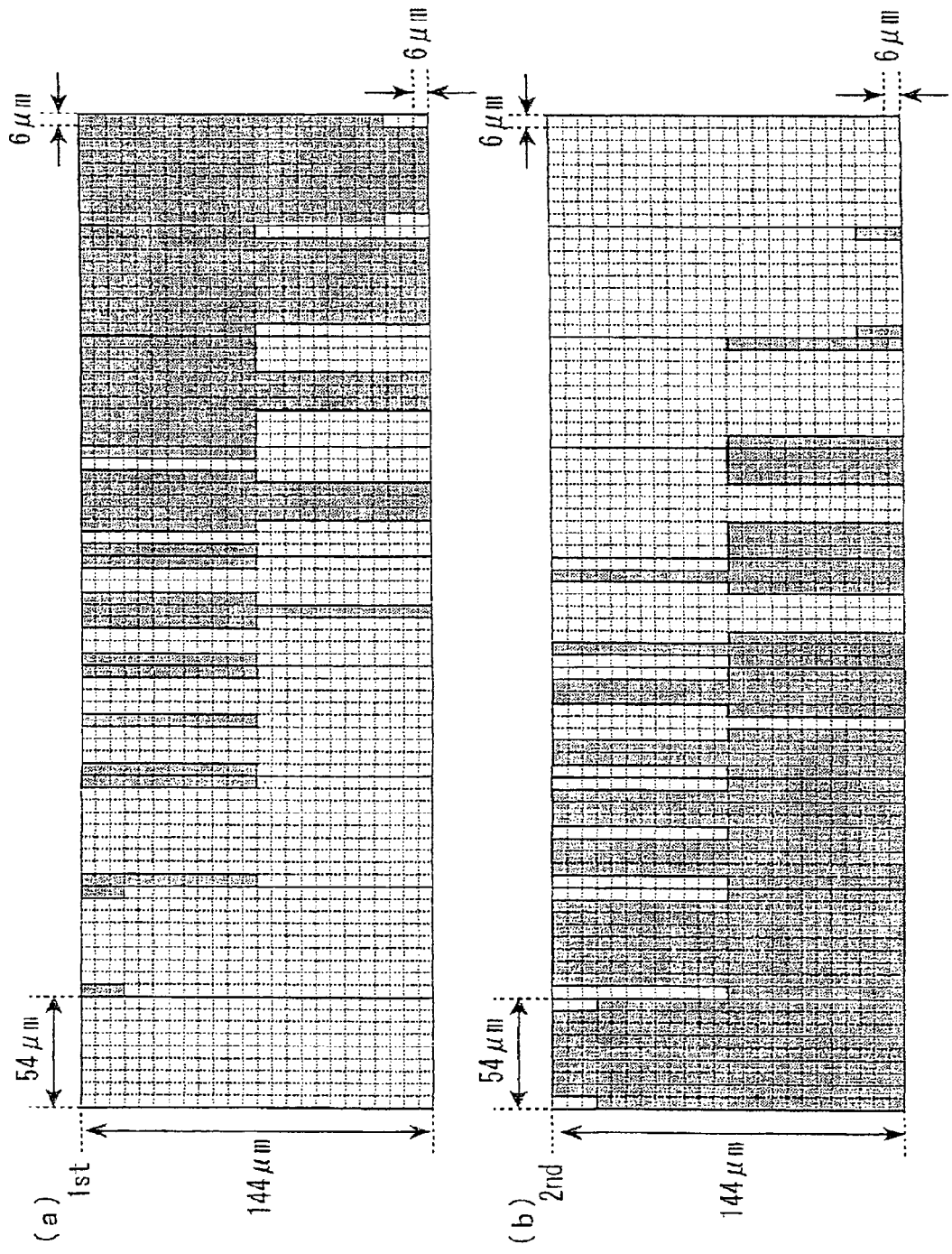

FIG. 31 is a planar view schematically showing the transmissive parts and explaining the size of each transmissive part in the overlapping region of the photomasks in FIG. 30.

FIG. 31(a) shows each transmissive part in the overlapping region of the photomask for the TFT array substrate. FIG. 31(b) shows each transmissive part in the overlapping region of the photomask for the CF substrate.

Figure 32:
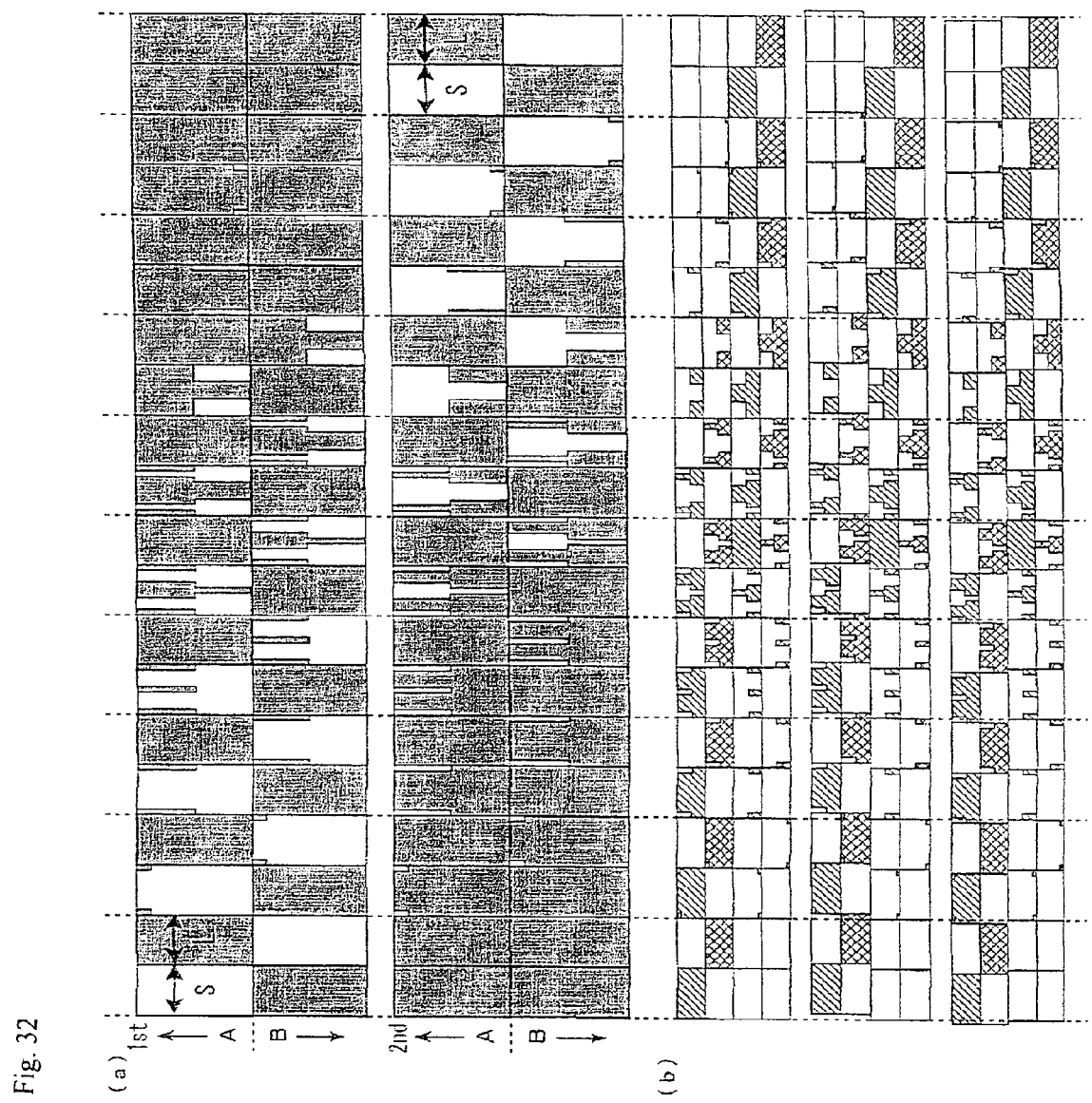

FIG. 32 is a schematic view showing another photomask used in the screen joint shot process in accordance with Embodiment 2 in which the measures for eliminating the joint line are taken.

FIG. 32(a) is a planar view schematically showing the pattern and arrangement of the photomasks in the overlapping region.

FIG. 32(b) is a schematic view showing the region which is exposed using the photomasks shown in FIG. 32(a).

Figure 33:
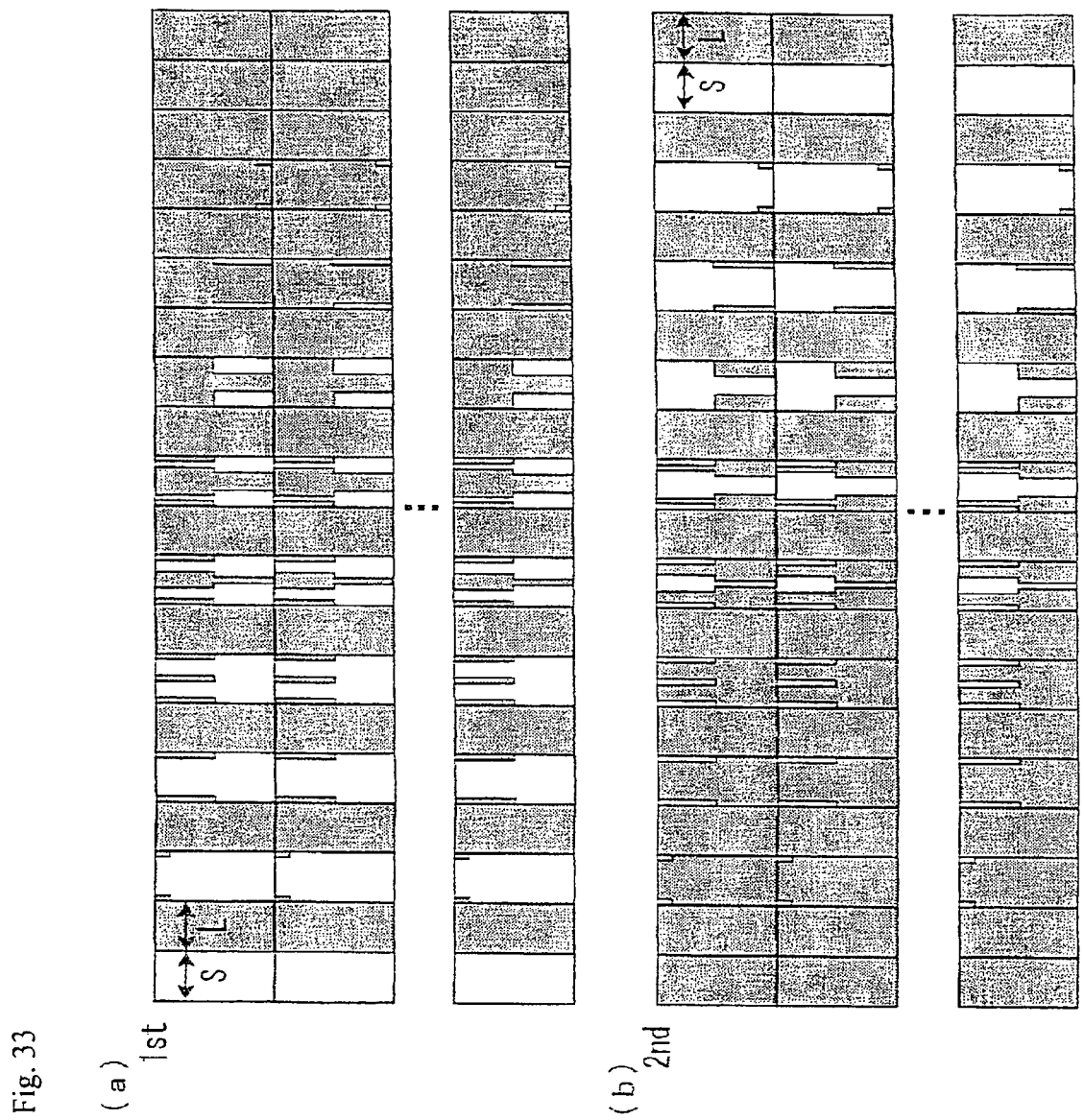

FIG. 33 is a planar view schematically showing another photomasks used in the screen joint shot process in accordance with Embodiment 2 in which the measures for eliminating the joint line are taken.

FIG. 33(a) shows the pattern in the overlapping region of the photomasks for the TFT array substrate.

FIG. 33(b) shows the pattern in the overlapping region of the photomasks for the CF substrate.

EXPLANATION OF NUMERALS AND SYMBOLS

1: The first substrate (TFT array substrate)
2: The second substrate (CF substrate)
3: Liquid crystal layer
3a: Liquid crystal molecule
4, 4a, 4b: Transparent electrode
5: Alignment film
5a, 5b: Vertical alignment film
6: Pixel
7a, 7b: Horizontal alignment film
8: Proximity gap
9: Polarized UV
10: Pretilt angle
11: Overlapping region
12: Halftone part
13: Large substrate
14: region exposed in one shot
15: Light source
16: Substrate
17: Camera for image detection
18: Right region of joint line
19: Left region of joint line
20: Joint line
21: Shielding region
22: Bus line
23: TFT
24: Polarizer
24a: Upper polarizer
24b: Lower polarizer
25: Retarder
26: Pixel in region $L_A$ (region $L_B$)
27: Pixel in region $R_A$ (region $R_B$)
101: Liquid crystal display device
200, 200a, 200b, 300, 301, 302, 303: Photomask
P: Polarization axis direction of upper polarizer
Q: Polarization axis direction of lower polarizer
S: Transmissive part
L: Shielding part Px: Pixel pitch in x direction
Py: Pixel pitch in y direction
y: Length of transmissive part
L1, L2, L3, L4, R1, R2, R3, R4: Domain
$L_A$, $R_B$, $L_B$, $R_B$: Region

The invention claimed is:

1. A production method of a liquid crystal display device, the liquid crystal display device comprising:
a pair of opposed substrates;
a liquid crystal layer formed between the pair of opposed substrates; and
a horizontal alignment film arranged on a liquid crystal layer side surface of at least one of the pair of opposed substrates,
wherein the production method comprises an exposure step of exposing the horizontal alignment film in such a way that a substrate plane is divided into two or more exposure regions and each of the exposure regions is exposed through a photomask having transmissive parts and a shielding part,
in the exposure step, exposure is performed while scanning a combination of a light source and the photomask and/or the substrate to be exposed in such a way that adjacent two exposure regions have an overlapping exposure region where the adjacent two exposure regions partly overlap with each other,
the photomask has a halftone part,
the halftone part includes a transmissive part having an aperture ratio smaller than that of a transmissive part in a part other than the halftone part, and
the halftone part is arranged corresponding to the overlapping exposure region.

2. The production method of the liquid crystal display device according to claim 1,
wherein in the liquid crystal display device has two or more regions which differ in alignment azimuth in a pixel.

3. The production method of the liquid crystal display device according to claim 1,
wherein the liquid crystal layer includes a nematic liquid crystal material with positive dielectric anisotropy.

* * * * *